(12) United States Patent
Mahmoodi

(10) Patent No.: US 11,378,163 B2
(45) Date of Patent: Jul. 5, 2022

(54) MULTISTAGE PERICYCLIC GEAR REDUCER

(71) Applicant: Ali Mahmoodi, Tehran (IR)

(72) Inventor: Ali Mahmoodi, Tehran (IR)

(*) Notice: Subject to any disclaimer, the term of this patent is extended or adjusted under 35 U.S.C. 154(b) by 0 days.

(21) Appl. No.: 17/468,154

(22) Filed: Sep. 7, 2021

(65) Prior Publication Data
US 2021/0404533 A1 Dec. 30, 2021

Related U.S. Application Data

(60) Provisional application No. 63/075,207, filed on Sep. 7, 2020.

(51) Int. Cl.
*F16H 1/32* (2006.01)
*F16D 3/26* (2006.01)

(52) U.S. Cl.
CPC .............. *F16H 1/32* (2013.01); *F16D 3/265* (2013.01); *F16H 2001/326* (2013.01); *F16H 2001/327* (2013.01)

(58) Field of Classification Search
CPC . F16H 1/32; F16H 2001/327; F16H 2001/326
See application file for complete search history.

(56) References Cited

U.S. PATENT DOCUMENTS

| | | | | |
|---|---|---|---|---|
| 1,455,360 A | * | 5/1923 | Sharkey | F16H 1/32 464/103 |
| 1,470,559 A | * | 10/1923 | Hall | F16H 61/0293 475/16 |
| 1,658,767 A | * | 2/1928 | Hall | F16H 1/32 475/171 |
| 2,748,610 A | * | 6/1956 | De Wolf | F16H 21/14 74/69 |
| 3,077,125 A | * | 2/1963 | Louton, Jr. | F16H 1/32 74/665 S |
| 7,410,028 B2 | * | 8/2008 | Chikaraishi | B62D 5/006 180/444 |
| 9,267,583 B2 | * | 2/2016 | Narovlansky | E05B 47/0012 |
| 2019/0331170 A1 | * | 10/2019 | Tsujimoto | F16H 1/32 |

FOREIGN PATENT DOCUMENTS

GB         1220192 A  *  1/1971

* cited by examiner

*Primary Examiner* — Sherry L Estremsky
(74) *Attorney, Agent, or Firm* — Bajwa IP Law Firm; Haris Zaheer Bajwa

(57) ABSTRACT

A multistage pericyclic gear reducer includes an input shaft, an input external-teeth gear coaxially coupled to and rotatable with the input shaft, a first middle planet ring gear coupled between a first driver ring gear and a first driven wheel. The first driver ring gear meshed with the input external-teeth gear. The multistage pericyclic gear reducer further includes a second middle planet ring gear coupled between the first driven wheel and a second driven wheel, an output external-teeth gear extended through and meshed with both the first middle planet ring gear and the second middle planet ring gear, and a central output shaft coupled to the output external-teeth gear.

13 Claims, 28 Drawing Sheets

| Reducer Type | Ratio Range | 1 | 2 | 4 | 10 | 20 | 40 | 100 | 200 | 400 |
|---|---|---|---|---|---|---|---|---|---|---|
| PGT | | ↔ | ←――→ | | | | | | | |
| CSR | | | | | ←―――――→ | | | | | |
| HD | | | | | | | | ←―――→ | | |
| PGR | | ↔ | ←――――――――――→ | | | | | | | |

FIG. 8A

MULTISTAGE PERICYCLIC GEAR REDUCER

CROSS-REFERENCE TO RELATED APPLICATION

This application claims the benefit of priority from CU.S. Provisional Patent Application Ser. No. 63/075,207, filed on Sep. 7, 2020, and entitled "PERICYCLIC GEAR REDUCER," which is incorporated herein by reference in its entirety.

TECHNICAL FIELD

The present disclosure relates to gear reducers and particularly to epicycloidal high-ratio gear reducers. More particularly, the present invention relates to a compact pericycloidal high-ratio gear reducer.

BACKGROUND

A fundamental requirement of majority of devices that utilize mechanical power is transmission of the rotational movement of a power source, such as an electric motor or an internal combustion engine to a low speed power consumer or end effector. One way to address this requirement may be utilization of conventional gear boxes with multistage gear trains. However, such multistage gear boxes may be relatively large and heavy for applications where high reduction ratios are required.

To obtain higher reduction ratios while maintaining the compactness of power transmission systems, gear reducers may be utilized instead of conventional multistage gear boxes. Planetary gear transmissions (PGTs), cycloidal speed reducers (CSRs), worm and gears (WGs), and harmonic drives (HDs) are among the well-known gear reducers that may provide high gear reduction ratios and maintain the compactness of the transmission systems.

In comparison with conventional gearboxes with simple gear trains, single-stage PGTs have several advantages and some disadvantages. Coaxial input and output, as well as two degrees of freedom are important benefits which enable the PGTs to provide several gear ratios when several stages of PGTs are mounted consecutively. In short, the advantages of PGTs in comparison with ordinary gear boxes may include compact structure, light weight, small moment of inertia, high power density, high efficiency, coaxial input-output shafts, low backlash, low pitch line velocity in gears, multiplicity in reduction ratios, and multiple degrees of freedom. However, PGTs may have disadvantages, such as having a large number of elements which makes the system overly complex, requiring an exceedingly high precision manufacturing process which makes PGTs expensive, having indeterminate load distribution on gears, high fatigue due to high repetition of loading on teeth of sun gear and bidirectional bending loads on teeth of planet gears, having weak heat transfer capabilities, and finally a narrow range of reduction ratios per stage.

In comparison with conventional gearboxes, a CSR may have all the above-mentioned advantages of a PGT, except having multiplicity in reduction ratios, and multi degrees of freedom. A CSR may further have drawbacks, such as non-involute-cut gears, load alternation on gears and bearings and internal speed fluctuation as well as centrifugal forces which altogether increase internal vibrations and probability of fatigue failure. Additionally, it can offer reduction ratios only in a range of 10 to 100, which are limited to integer numbers and getting decimal ratios is impossible. A CSR may also require high precisions and high technology level in production due to complexity in its components' shape and their accurate assembly. The advantages of a CSR may include a high reduction ratio in a single stage, a very compact design, smooth running with moderate noise, low backlash, high shock absorbance, smaller number of parts, high reliability and long life. However, a CSR may have disadvantages, such as internal vibrations and non-steady output velocity, requiring balancing, expensive manufacturing process, limited range and numbers of possible reduction ratios, and indeterminate load distribution on rollers.

Compared to PGTs, HDs may have advantages, such as considerably larger reduction ratios per stage, high torque capacity per weight, excellent positioning accuracy and repeatability, compact design, near zero backlash, self-locking property, and high torsion stiffness. On the other hand, HDs may have drawbacks, such as high elasticity requirement in its flex spline, together with nonlinear stiffness damping resulting in a low efficiency, a restricted reduction range: i.e. 30:1 up to 320:1 in normal applications. Furthermore, HDs cannot be back driven. HDs may further require high technology level both in gear production and bearing production. In addition, HDs may be applicable only in small sizes since for larger sizes, larger deflections and stresses may occur, which might go beyond the resistance margins of materials.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description and the drawings.

According to one or more exemplary embodiments, the present disclosure is directed to a multistage pericyclic gear reducer. An exemplary multistage pericyclic gear reducer may include an input shaft that may be rotatable about a longitudinal axis of an exemplary input shaft, an input external-teeth gear that may be coaxially coupled to and rotatable with an exemplary input shaft, a first middle planet ring gear, and a first driver ring gear that may be meshed with an exemplary input external-teeth gear and rotatable with an exemplary input shaft about a first rotational axis coinciding with an exemplary longitudinal axis of an exemplary input shaft.

An exemplary first driver ring gear may be coupled to an exemplary first middle planet ring gear from a first side of an exemplary first middle planet ring gear utilizing a first prismatic joint. An exemplary first rotational axis may be parallel with a first central normal axis of an exemplary first middle planet ring gear. An exemplary first prismatic joint may be disposed on a plane perpendicular to an exemplary first rotational axis. An exemplary first driver ring gear may be configured to transfer the rotational movement of an exemplary input shaft to an exemplary first middle planet ring gear.

An exemplary multistage pericyclic gear reducer may further include a first driven wheel, where a first side of the first driven wheel may be coupled to an exemplary first middle planet ring gear from a second side of an exemplary first middle planet ring gear utilizing a second prismatic joint. An exemplary second prismatic joint may be disposed on a plane perpendicular to an exemplary first rotational axis. An exemplary second prismatic joint may be perpendicular to an exemplary first prismatic joint. An exemplary first driven wheel may be rotatable about a second rotational axis, where an exemplary second rotational axis may be parallel with an exemplary first rotational axis.

An exemplary multistage pericyclic gear reducer may further include a second middle planet ring gear, where a first side of the second middle planet ring gear may be coupled to a second side of an exemplary first driven wheel utilizing a third prismatic joint. An exemplary third prismatic joint may be disposed on a plane perpendicular to an exemplary first rotational axis. An exemplary multistage pericyclic gear reducer may further include a second driven wheel that may be coupled from a first side of an exemplary second driven wheel to a second side of an exemplary second middle planet ring gear utilizing a fourth prismatic joint. An exemplary fourth prismatic joint may be disposed on a plane perpendicular to an exemplary first rotational axis. An exemplary fourth prismatic joint may be perpendicular to an exemplary third prismatic joint. An exemplary second driven wheel may be rotatable about a third rotational axis, where an exemplary third rotational axis may be parallel with an exemplary second rotational axis.

An exemplary multistage pericyclic gear reducer may further include an output external-teeth gear that may extend through and mesh with both an exemplary first middle planet ring gear and an exemplary second middle planet ring gear, and a central output shaft that may be coupled to an exemplary output external-teeth gear. An exemplary central output shaft may be rotatable with an exemplary output external-teeth gear about a central axis. An exemplary central axis may be along and parallel with a longitudinal axis of an exemplary central output shaft, where an exemplary output external-teeth gear may be extended along an exemplary central axis.

BRIEF DESCRIPTION OF THE DRAWINGS

The novel features which are believed to be characteristic of the present disclosure, as to its structure, organization, use and method of operation, together with further objectives and advantages thereof, will be better understood from the following drawings in which a presently exemplary embodiment of the present disclosure will now be illustrated by way of example. It is expressly understood, however, that the drawings are for illustration and description only and are not intended as a definition of the limits of the present disclosure. Embodiments of the present disclosure will now be described by way of example in association with the accompanying drawings in which:

FIG. 8A illustrates a graphical chart of gear reduction ratio ranges of exemplary gear reducers, consistent with one or more exemplary embodiments of the present disclosure;

DETAILED DESCRIPTION

Figure 1A:
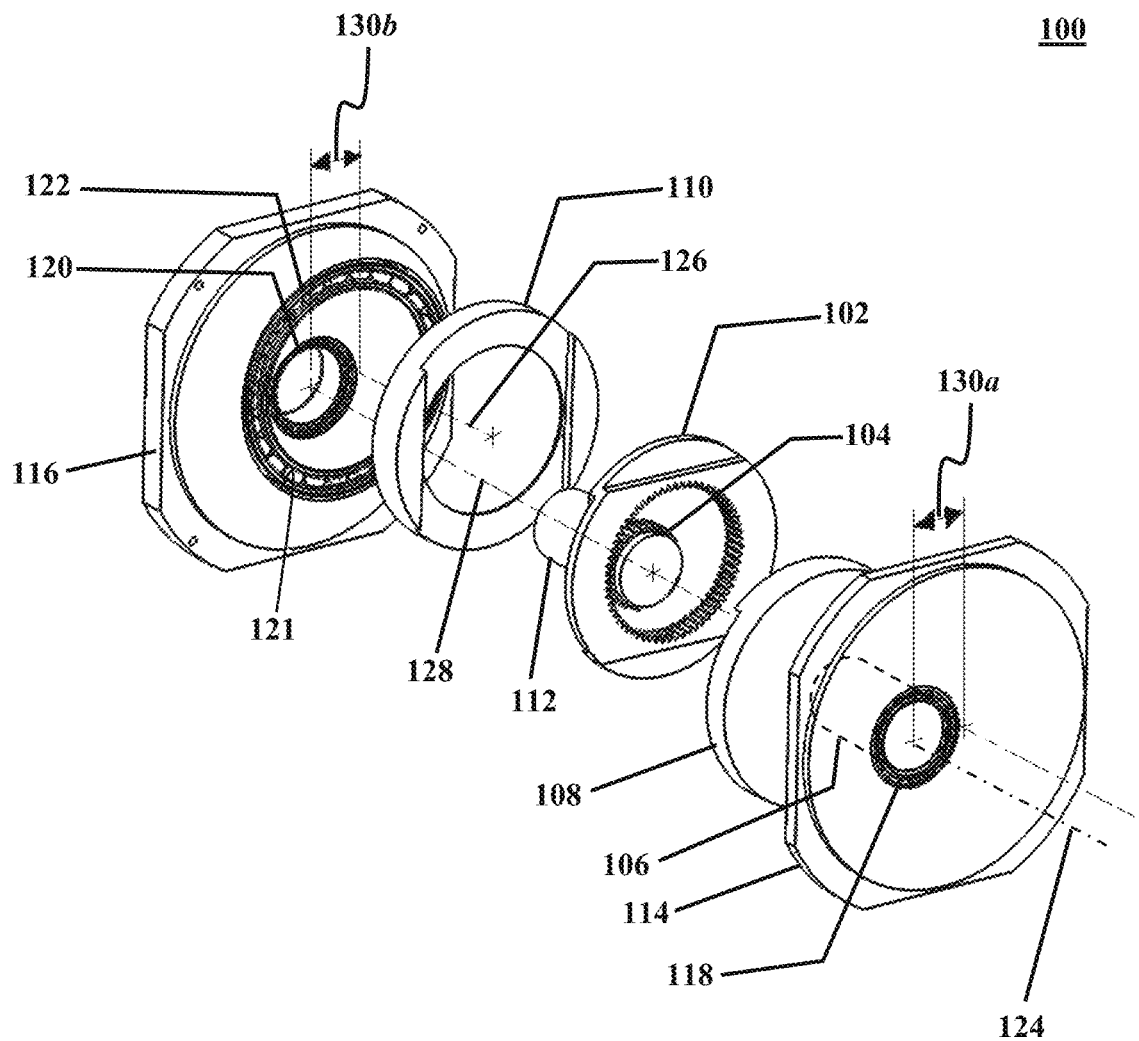
FIG. 1A illustrates a right-side exploded view of a pericyclic gear reducer, consistent with one or more exemplary embodiments of the present disclosure.

The novel features which are believed to be characteristic of the present disclosure, as to its structure, organization, use and method of operation, together with further objectives and advantages thereof, will be better understood from the following discussion.

The present disclosure is directed to exemplary embodiments of a pericyclic gear reducer. An exemplary pericyclic reducer may include a driver ring gear coupled to or integrally formed with an input shaft, a middle wheel disposed between an exemplary driver ring gear and a driven wheel, and an output sun gear disposed within and meshed with an exemplary middle planet ring gear. An exemplary output sun gear may be coupled to or integrally formed with an output shaft. An exemplary driver ring gear and an exemplary driven wheel may be mounted with an offset relative to a central axis of an exemplary pericyclic gear reducer, while respective rotational axes of an exemplary driver ring gear and an exemplary driven wheel may be parallel with offsets in opposite sides of the central axis. An exemplary driver ring gear and an exemplary driven wheel may be coupled at either sides of an exemplary middle planet ring gear utilizing a prismatic joint. A first prismatic joint that may be utilized for coupling an exemplary driver ring gear at a first side of middle planet ring gear may be perpendicular to a second prismatic joint that may be utilized for coupling an exemplary driven wheel at an opposing second side of middle planet ring gear. Such coupling of an exemplary driver ring gear and an exemplary driven wheel may allow for converting a rotational movement of an exemplary input shaft to a spinning and revolving motion of an exemplary middle planet ring gear.

An exemplary middle planet ring gear may spin about a normal central axis of an exemplary middle planet ring gear and may further revolve around a longitudinal axis of an exemplary output sun gear on a circular path. In response to such spinning and revolving motion of an exemplary middle planet ring gear, an exemplary output sun gear may rotate about the longitudinal axis of an exemplary output sun gear and may transfer such rotational movement to an output shaft. An exemplary middle planet ring gear may revolve around an exemplary output sun gear on a circular path and every point on a pitch diameter of an exemplary middle planet ring gear may trace a pericycloid curve on an exemplary output sun gear, hence the name pericyclic gear reducer.

An exemplary pericyclic gear reducer may be a coaxial pericyclic gear reducer, in which an exemplary input shaft may be coupled or integrally formed with an input external-teeth gear. An exemplary input external-teeth gear may be disposed within and meshed with a driver ring gear. An exemplary driver ring gear may be coupled to an exemplary middle planet ring gear utilizing a prismatic joint from a first side of an exemplary middle planet ring gear. An exemplary middle planet ring gear may be coupled to a driven wheel utilizing a prismatic joint from a second opposing side of an exemplary middle planet ring gear. An exemplary output sun gear may be disposed within and meshed with an exemplary middle planet ring gear and may be rotatable with an exemplary middle planet ring gear. An exemplary output sun gear may further be coupled or integrally formed with an output shaft. An exemplary driver ring gear and an exemplary driven wheel may have parallel axes of rotation with an offset with respect to a central axis of an exemplary coaxial gear reducer. However, the two exemplary offsets may be equal and on opposite sides of an exemplary central axis. In this configuration, an exemplary input shaft and an exemplary output shaft may be parallel and aligned with each other without any offset with respect to central axis of an exemplary coaxial gear reducer. Hence, a distance between axes of an exemplary input shaft and an exemplary driver ring gear may be equal to offset of an exemplary driver ring gear and also equal to offset of an exemplary driven wheel from an exemplary central axis.

Figure 1B:
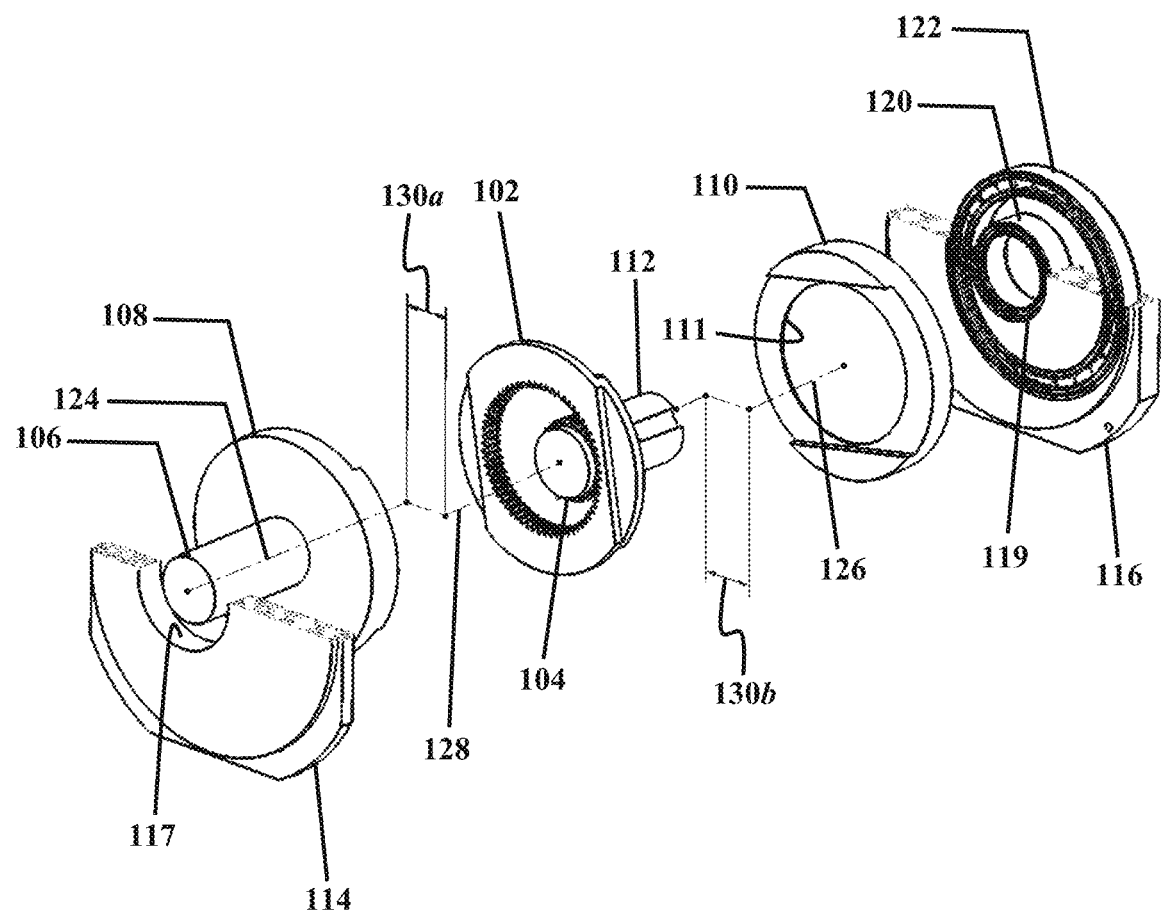
FIG. 1B illustrates a left-side exploded view of a pericyclic gear reducer, consistent with one or more exemplary embodiments of the present disclosure.

FIG. 1A illustrates a right-side exploded view of a pericyclic gear reducer 100, consistent with one or more exemplary embodiments of the present disclosure. FIG. 1B illustrates a left-side exploded view of pericyclic gear reducer 100, consistent with one or more exemplary embodiments of the present disclosure. In an exemplary embodiment, pericyclic gear reducer 100 may include an input shaft 106 that may be rotatable about a first rotational axis 124, a middle planet ring gear 102 that may include an internal-teeth gear, an output sun gear 104 that may be positioned inside and meshed with middle planet ring gear 102.

In an exemplary embodiment, input shaft 106 may be an elongated cylindrical shaft extended along the longitudinal axis of input shaft 106. In an exemplary embodiment, input shaft 106 may be coupled to an external motor, such as an internal combustion engine or an electric motor. In an exemplary embodiment, output sun gear 104 may be an external-teeth gear that may have a smaller diameter in comparison with middle planet ring gear 102. In an exemplary embodiment, output sun gear 104 may be disposed within a central opening of middle planet ring gear 102, such that external teeth of output sun gear 104 may mesh with internal teeth of middle planet ring gear 102.

In an exemplary embodiment, pericyclic gear reducer 100 may further include a driver ring gear 108 that may be structured as a first flange coupled or integrally formed with input shaft 106 and rotatable with input shaft 106 about first rotational axis 124 along and parallel with a longitudinal axis of input shaft 106. In an exemplary embodiment, driver ring gear 108 may be coupled to middle planet ring gear 102 from a first side of middle planet ring gear 102 utilizing a first prismatic joint. In an exemplary embodiment, driver ring gear 108 may assume a rotational motion in response to rotational motion of input shaft 106. Since driver ring gear 108 is coupled to middle planet ring gear 102 utilizing the first prismatic joint, rotational motion of driver ring gear 108 may urge middle planet ring gear 102 to rotate, as well. In other words, driver ring gear 108 may be configured to transfer the rotational motion of input shaft 106 to middle planet ring gear 102.

In an exemplary embodiment, pericyclic gear reducer 100 may further include a driven wheel 110 that may be structured as a second flange coupled to middle planet ring gear 102 from a second side of middle planet ring gear 102 utilizing a second prismatic joint. In an exemplary embodiment, driven wheel 110 may be rotatable about a second rotational axis 126. In an exemplary embodiment, the first prismatic joint and the second prismatic joint are perpendicular to each other.

In an exemplary embodiment, pericyclic gear reducer 100 may further include a central output shaft 112 that may be coupled or integrally formed with output sun gear 104. In an exemplary embodiment, central output shaft 112 may be rotatable with output sun gear 104 about a longitudinal axis of central output shaft 112, which is hereinafter referred to as a central axis 128 of pericyclic gear reducer 100. In an exemplary embodiment, a plane of rotation of middle planet ring gear may be perpendicular to central axis 128 and the first side and the second side of middle planet ring gear 102 may be opposite each other along central axis 128. In an exemplary embodiment, driven wheel 110 may include a central hole 111 that may be configured to allow passage of central output shaft 112 through driven wheel 110.

In an exemplary embodiment, first rotational axis 124, second rotational axis 126, and central axis 128 may lay on a common plane. Furthermore, in an exemplary embodiment, first rotational axis 124 and central axis 128 may be misaligned or offset by a first distance 130a and second rotational axis 126 and central axis 128 may be misaligned or offset by a second distance 130b. In an exemplary embodiment, first distance 130a and second distance 130b may be equal, meaning that first rotational axis 124 and second rotational axis 126 may be symmetrically positioned on opposite lateral sides of central axis 128. In other words, first rotational axis 124 and second rotational axis 126 may have a misalignment by a distance equal to sum of first distance 130a and second distance 130b.

In an exemplary embodiment, pericyclic gear reducer 100 may further include a first wall 114 that may include a first hole 117 that may be fitted with a rolling contact bearing, such as first ball bearing 118. In an exemplary embodiment, first ball bearing 118 may include an inner ring and an outer ring that may be utilized to contain the balls of first ball bearing 118. In an exemplary embodiment, first hole 117 may be configured to allow input shaft 106 to rotatably pass through first wall 114 while input shaft 106 may lean on first ball bearing 118. As used herein, input shaft 106 rotatably passing through first wall 114 leaning on first ball bearing 118 may refer to a configuration, where an outer ring of first ball bearing 118 is fixed to first hole 117 and an inner ring of first ball bearing 118 is fixed to input shaft 106.

In an exemplary embodiment, pericyclic gear reducer 100 may further include a second wall 116 that may include a second hole 119 fitted with a rolling contact bearing, such as second ball bearing 120. In an exemplary embodiment, second hole 119 may be a through-all or open hole that may be configured to allow central output shaft 112 to rotatably pass through second wall 116 while central output shaft 112 may be coupled to second ball bearing 120. In an exemplary embodiment, second wall 116 may further include a third ball bearing 122 that may be coupled to driven wheel 110. In an exemplary embodiment, third ball bearing 122 may be housed in a third hole 121 in second wall 116. In an exemplary embodiment, third hole 121 may be a closed-end hole, in which an inner ring of third ball bearing 122 may be fixed relative to second wall 116 and an outer ring of third ball bearing 122 may be fixed relative to driven wheel 110. Hence, third ball bearing 122 may rotatably couple driven wheel 110 with second wall 116 and may allow driven wheel 110 to rotate about second rotational axis 126. In an exemplary embodiment, first wall 114 and second wall 116 may be parallel with each other. In an exemplary embodiment, such parallel configuration and the fixed distance and orientation of first wall 114 and second wall 116 with respect to each other may be maintained by fastening or securing first wall 114 and second wall 116 to a shell (not illustrated for simplicity) that may house pericyclic gear reducer 100.

Figure 2A:
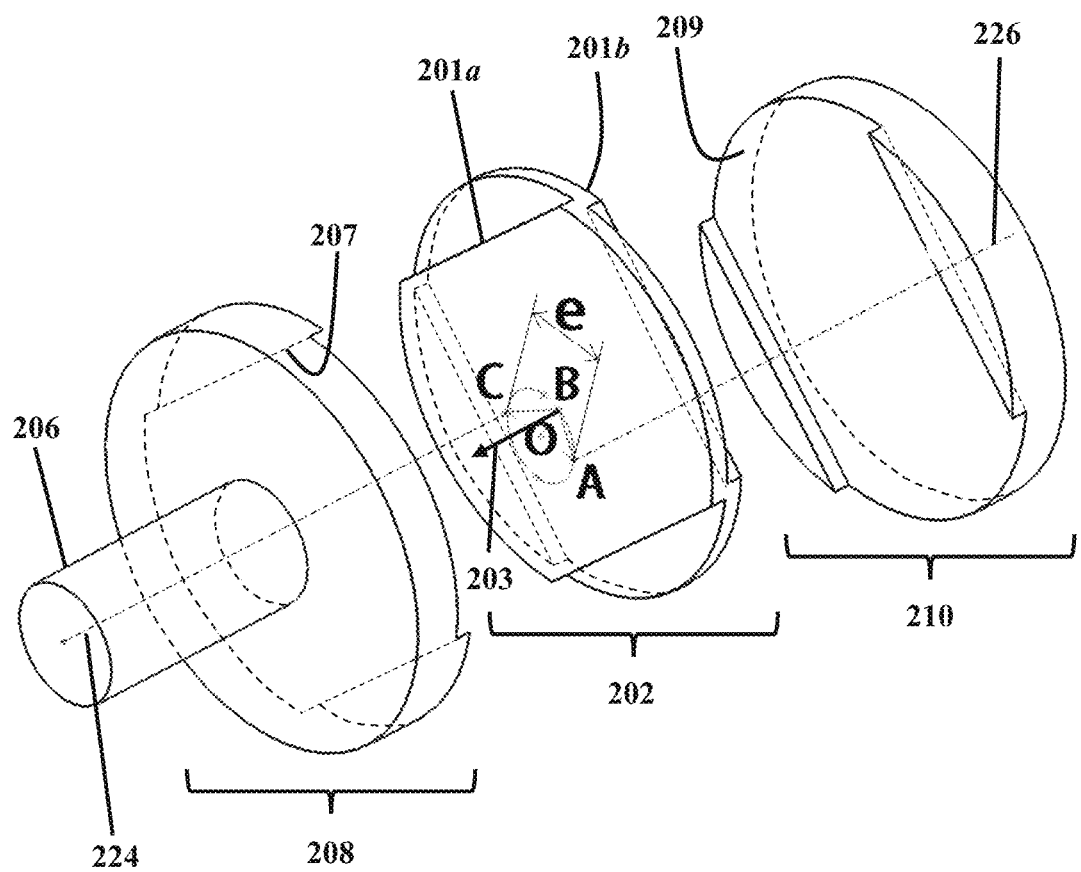
FIG. 2A illustrates a perspective view of a middle planet ring gear coupled between a driver ring gear and a driven wheel, consistent with one or more exemplary embodiments of the present disclosure.
Figure 2B:
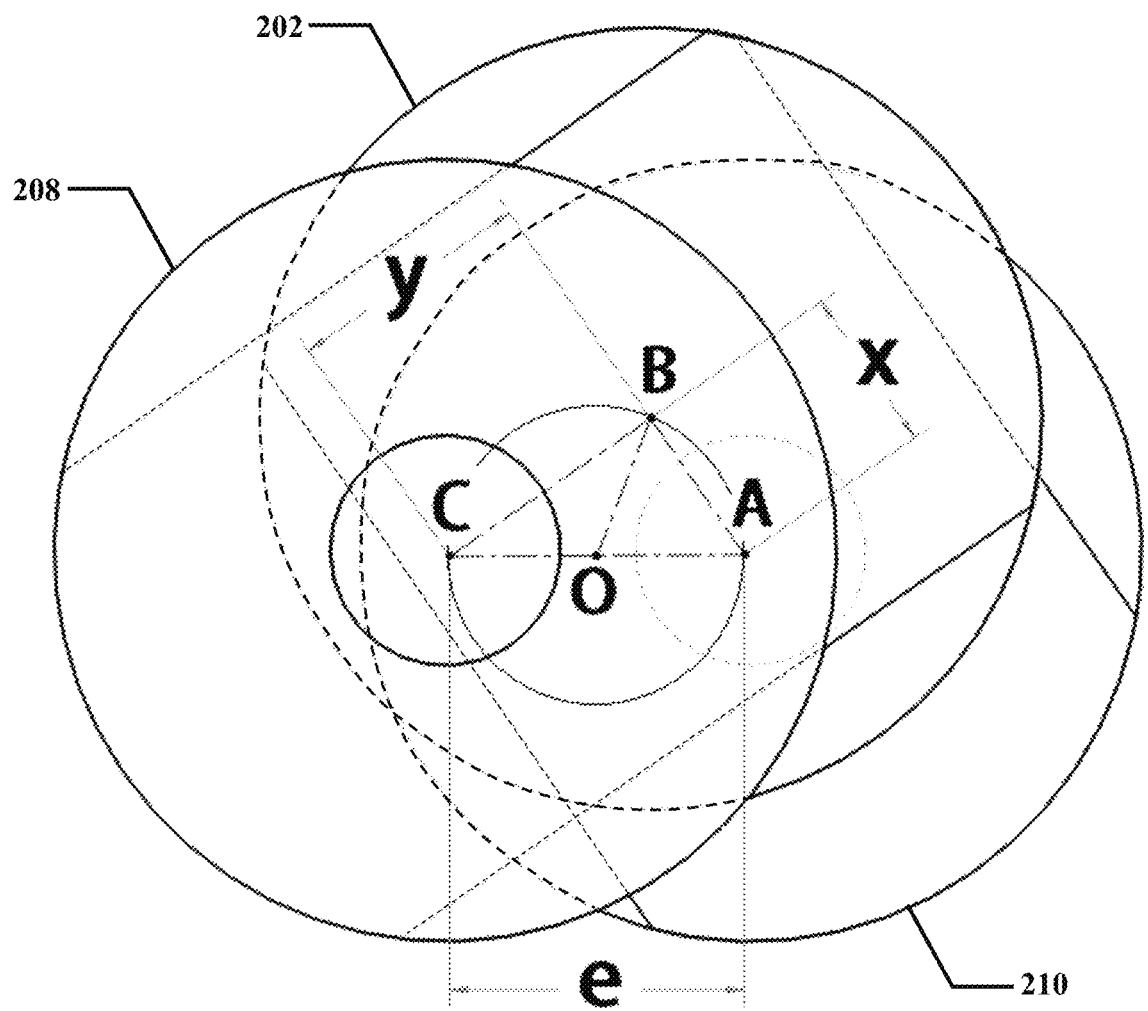
FIGS. 2B and 2C illustrate front views of a middle planet ring gear coupled between a driver ring gear and a driven wheel, consistent with one or more exemplary embodiments of the present disclosure.

FIG. 2A illustrates a perspective view of a middle planet ring gear 202 coupled between a driver ring gear 208 and a driven wheel 210, consistent with one or more exemplary embodiments of the present disclosure. FIG. 2B illustrates a front view of middle planet ring gear 202 coupled between driver ring gear 208 and driven wheel 210, consistent with one or more exemplary embodiments of the present disclosure.

For simplicity and for purpose of describing prismatic joints between middle planet ring gear 202 and driver and driven wheels (208, 210), internal gear teeth of middle planet ring gear 202 are not illustrated in FIGS. 2A and 2B. In an exemplary embodiment, middle planet ring gear 202 may be structurally similar to middle planet ring gear 102. Similarly, for simplicity, a central hole of driven wheel 210 is not illustrated in FIGS. 2A and 2B. In an exemplary embodiment, driven wheel 210 may be structurally similar to driven wheel 110. In an exemplary embodiment, driver ring gear 208 may be structurally similar to driver ring gear 108 and driver ring gear 208 may be rotatably coupled to an input shaft 206 similar to input shaft 106. In an exemplary embodiment, input shaft 206 may be configured to transfer a rotational movement of an external rotary actuator, such as an electric motor or an internal combustion engine to driver ring gear 208.

In an exemplary embodiment, driver ring gear 208 may be rotatable about a first rotational axis 224 and driven wheel may rotate about a second rotational axis 226. In an exemplary embodiment, first rotational axis 224 and second rotational axis 226 may have a parallel misalignment by a distance labeled as "e." In an exemplary embodiment, middle planet ring gear 202 may include a bulge or protuberance or tongue at either side of middle planet ring gear 202, namely, a first protuberance 201a and a second protuberance 201b. In an exemplary embodiment, driver ring gear 208 may include a slot or groove, such as a first slot 207 and driven wheel 210 may include a respective slot or groove, such as a second slot 209. In an exemplary embodiment, first protuberance 201a may be slidably coupled to first slot 207 to form a first prismatic joint between middle planet ring gear 202 and driver ring gear 208. Similarly, second protuberance 201b may be slidably coupled to second slot 209 to form a second prismatic joint between middle planet ring gear 202 and driven wheel 210. In an exemplary embodiment, first protuberance 201a may slide within first slot 207 along a first direction, and second protuberance 201b may slide within second slot 209 along a second direction. In an exemplary embodiment, the first direction may be perpendicular to the second direction and both the first direction and the second direction are perpendicular to normal central axis 203.

In an exemplary embodiment, due to the eccentricity of driver ring gear 208 and driven wheel 210 with an offset of "e" between their respective rotational axes (224, 226), in response to the rotational movement of input shaft 206, middle planet ring gear 202 may assume a combined rotational movement that may include a spinning element and a revolving element, as will be discussed. In an exemplary embodiment, the first and second prismatic joints may allow for such combined rotational movement of middle planet ring gear 202 by allowing middle planet ring gear 202 to slide within first slot 207 and second slot 209 as middle planet ring gear 202 rotates.

In an exemplary embodiment, a distance between a normal central axis 203 of middle planet ring gear 202 from first rotational axis 224 is labeled as "y" and a distance between normal central axis 203 of middle planet ring gear 202 from second rotational axis 226 is labeled as "x." In an exemplary embodiment, normal central axis 203 is an axis perpendicular to a plane of middle planet ring gear 202 passing through a central point, the position of which is shown by letter "B." In an exemplary embodiment, first rotational axis 224 may intersect middle planet ring gear 202 at a point labeled as "C" and second rotational axis 226 may intersect middle planet ring gear 202 at a point labeled as "A." In an exemplary embodiment, responsive to driver ring gear 208 rotating about first rotational axis 224, middle planet ring gear 202 may spin about normal central axis 203 while revolving around a point labeled as "O," such that point "B" may have a circular locus with the origin of point "O" and a diameter of "e." In an exemplary embodiment, since points C and A are stationary and a triangle CBA has a right angle at point B, the angle at B may be inscribed within a circle with diameter CA. In other words, point B may trace a circle with a diameter of CA in response to a rotational motion of line CB with driver ring gear 208.

Figure 2C:
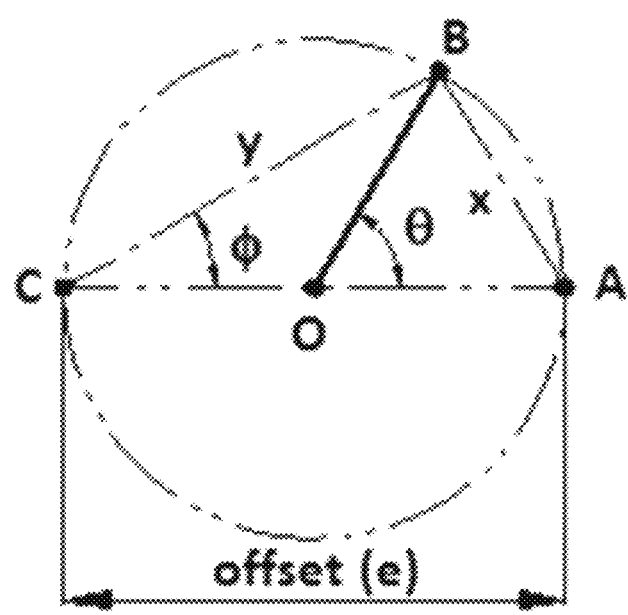

FIG. 2C illustrates a geometrical relationship among center points of middle planet ring gear 202, driver ring gear 208, and driven wheel 210, consistent with one or more exemplary embodiments of the present disclosure. In an exemplary embodiment, angular velocity of revolving motion of middle planet ring gear 202 may be defined as equation (1) below:

$$\dot{\theta} = \frac{d\theta}{dt} \qquad \text{Equation (1)}$$

In an exemplary embodiment, angular velocity of spinning motion of middle planet ring gear 202 may be defined as equation (2) below:

$$\dot{\varphi} = \frac{d\varphi}{dt} \qquad \text{Equation (2)}$$

Based on the geometry illustrated in FIG. 2C, since θ=2φ at any given moment, angular velocity of revolving motion of middle planet ring gear 202 may be twice as angular velocity of the spinning motion of middle planet ring gear 202. In an exemplary embodiment, both revolving motion and spinning motion of middle planet ring gear 202 may be in same direction.

Similarly, in an exemplary embodiment, middle planet ring gear 102 may revolve around central axis 128 which coincides with the longitudinal axis of output sun gear 104. In other words, middle planet ring gear 102 may revolve around output sun gear 104 and since middle planet ring gear 102 and output sun gear 104 are meshed together, rotational movement of middle planet ring gear 102 may be transferred to output sun gear 104. Based on the geometry discussed above, in response to a rotational movement of input shaft 106 with a given angular velocity, middle planet ring gear 102 may revolve around output sun gear 104 at an angular velocity twice the given angular velocity of input shaft 106.

Figure 3A:
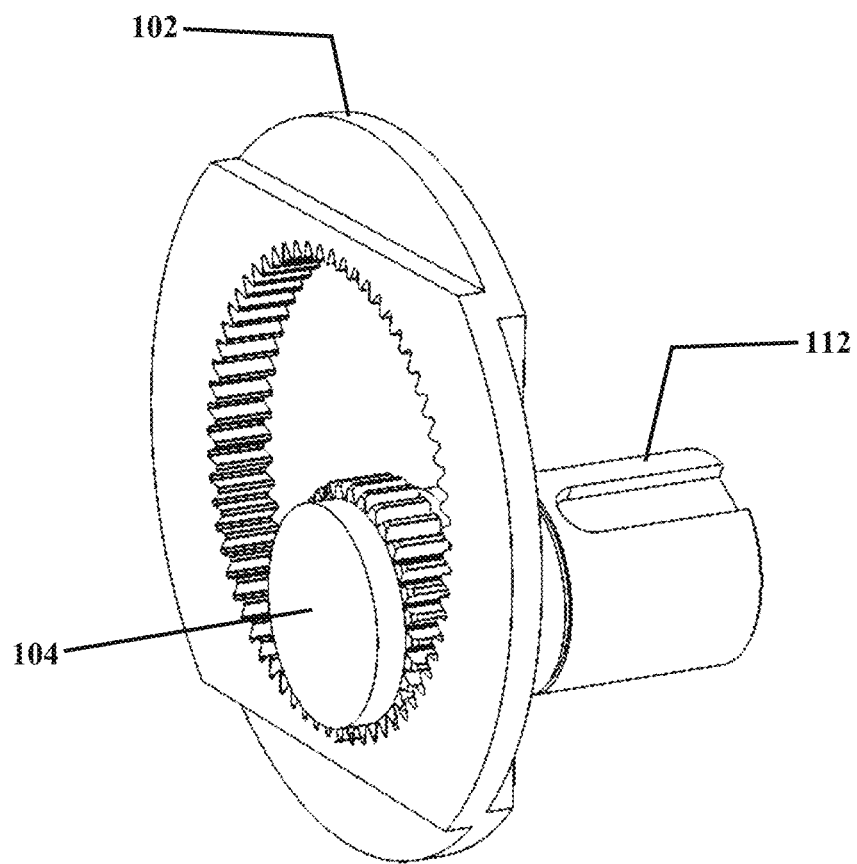
FIG. 3A illustrates a perspective view of a middle planet ring gear meshed with an output sun gear, consistent with one or more exemplary embodiments of the present disclosure.
Figure 3B:
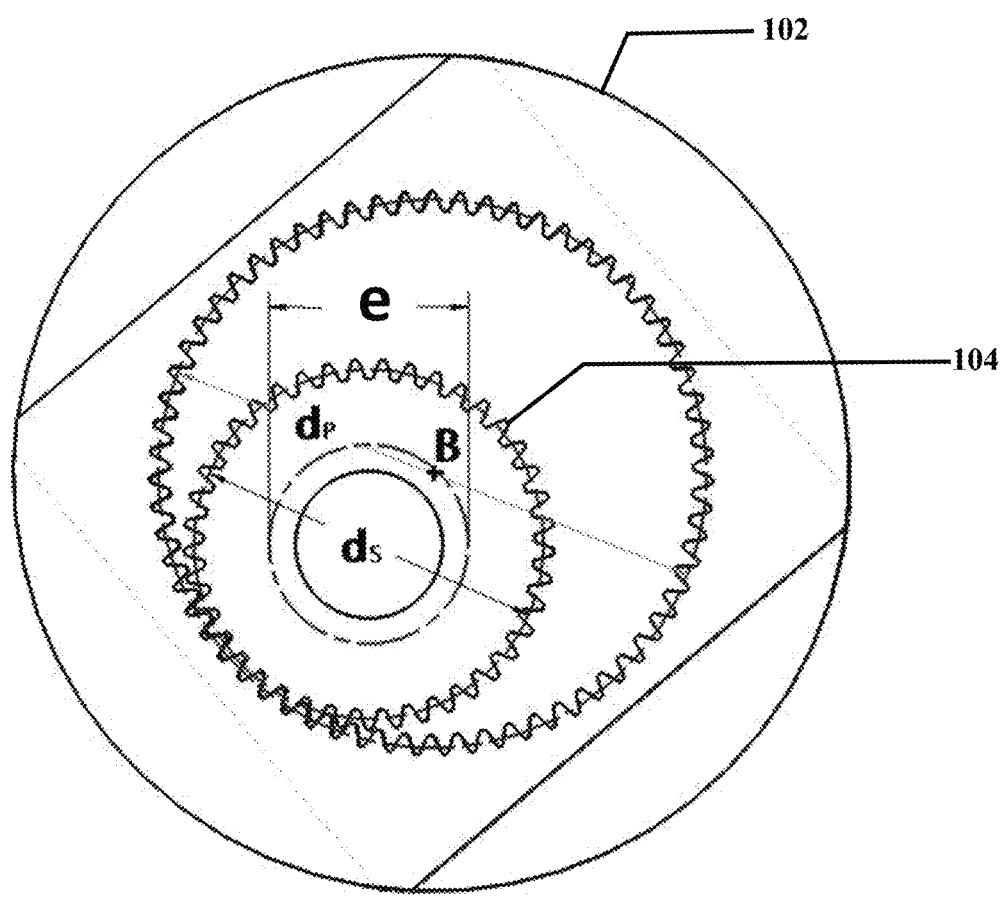
FIGS. 3B and 3C illustrate front views of a middle planet ring gear meshed with an output sun gear, consistent with one or more exemplary embodiments of the present disclosure.
Figure 3C:
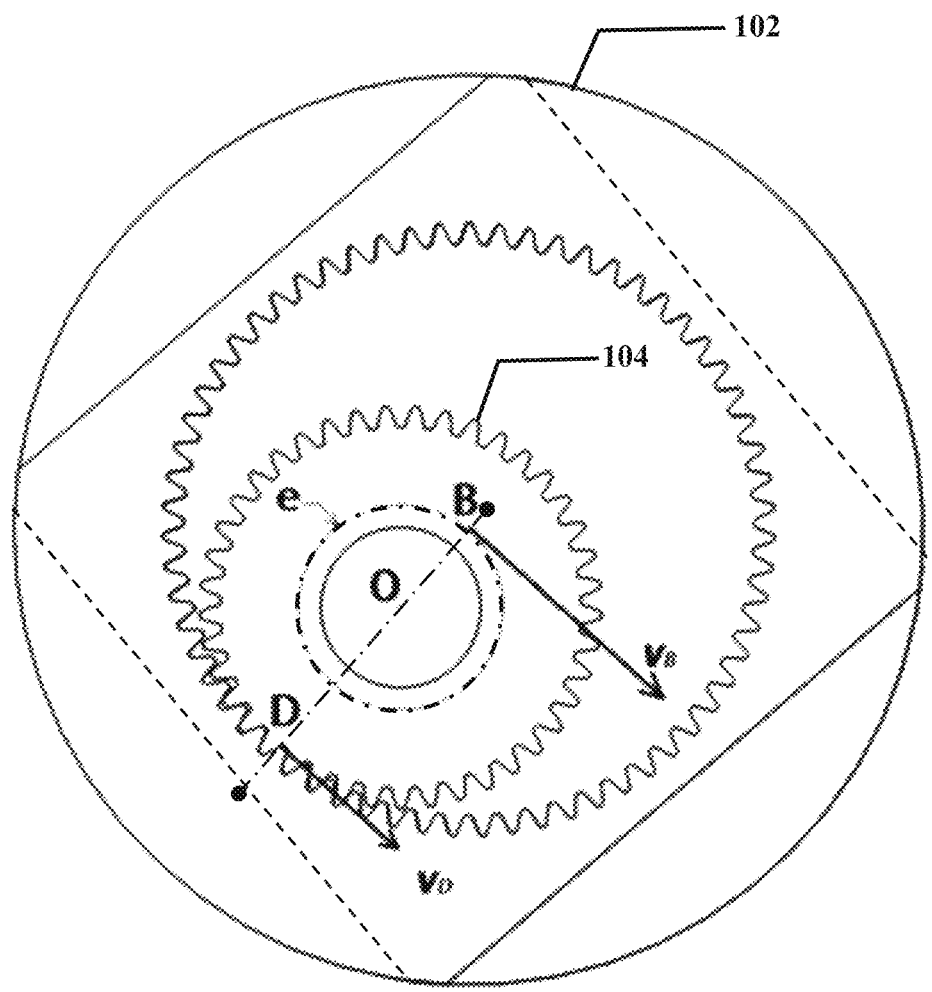

FIG. 3A illustrates a perspective view of middle planet ring gear 102 meshed with output sun gear 104, consistent with one or more exemplary embodiments of the present disclosure. FIGS. 3B and 3C illustrate front views of middle planet ring gear 102 meshed with output sun gear 104, consistent with one or more exemplary embodiments of the present disclosure.

In an exemplary embodiment, the power received via input shaft 106 may be transferred to central output shaft 112 through middle planet ring gear 102. In an exemplary embodiment, to maintain the contact between middle planet ring gear 102 and output sun gear 104, as middle planet ring gear 102 is revolving around output sun gear 104, pitch diameters of middle planet ring gear 102 and output sun gear 104 must follow a relationship defined by equation (3) below:

$$d_P = d_S + e \qquad \text{Equation (3)}$$

In equation (3) above, $d_P$ denotes the pitch diameter of middle planet ring gear 102, $d_S$ denotes the pitch diameter of output sun gear 104, and e denotes the offset between driver ring gear 108 and driven wheel 110. Since, a pitch diameter of an exemplary gear is equal to teeth number of an exemplary gear multiplied by a module of an exemplary gear, equation (3) may be rewritten as equation (4) below:

$$N_P - N_S = \frac{e}{m} \qquad \text{Equation (4)}$$

In equation (4) above, $N_P$ denotes teeth number of middle planet ring gear 102, $N_S$ denotes teeth number of output sun gear 104, and m denotes gear module. Referring to equation (4), it may be understood that the amounts of e and m should be chosen, such that the fraction $$\frac{e}{m}$$

may be a natural number.

In an exemplary embodiment, as middle planet ring gear 102 revolves around output sun gear 104, a central point of middle planet ring gear 102 that may be labeled as point B may revolve around a point, the position of which is labeled as point O on a circular path with a diameter of e. As mentioned before, e denotes an amount of offset between driver ring gear 108 and driven wheel 110 or as illustrated in FIGS. 1A and 1B, e denotes the sum of first distance 130a and second distance 130b. As discussed before, in an example, when middle planet ring gear rotates about point B in a clockwise manner at a rotational speed of $\omega_P$, its revolving speed around point O may be $2\omega_P$. Consequently, an absolute velocity of point B may be described by equation (5), below:

$$v_B = 2\omega_P \times \frac{e}{2} = \omega_P e \qquad \text{Equation (5)}$$

An absolute velocity of a contact point of middle planet ring gear 102 and output sun gear 104, which is designated by point D, may be obtained by equation (6) below:

$$v_D = v_B + v_{D/B} \qquad \text{Equation (6)}$$

In equation (6) above, $v_{D/B}$ denotes the velocity of point D relative to point B, which may be defined by equation (7) below:

$$v_{D/B} = -\omega_P \left( \frac{e}{2} + \frac{d_S}{2} \right) \quad \text{Equation (7)}$$

By incorporating equations (5) and (7) in equation (6), the velocity of point D may be obtained by equation (8) below:

$$v_D = \omega_P \left( \frac{e}{2} - \frac{d_S}{2} \right) \quad \text{Equation (8)}$$

In an exemplary embodiment, if the clockwise rotation is considered as a positive direction, the angular velocity of central output shaft 112 may be obtained by equation (9) below:

$$\omega_S = \frac{-v_D}{(d_S/2)} = -\omega_P \left( \frac{e}{d_S} - 1 \right) \quad \text{Equation (9)}$$

By replacing e in equation (9) above from equation (4) and by further replacing the pitch diameter, $d_s$ with m×$N_S$, a velocity ratio of output sun gear 104 to spinning velocity of middle planet ring gear 102, i, may be obtained as described by equation (10) below:

$$i = \frac{\omega_S}{\omega_P} = 1 - \frac{m(N_P - N_S)}{mN_S} = 2 - \frac{N_P}{N_S} \quad \text{Equation (10)}$$

The spinning velocity of middle planet ring gear 102 is equal to rotational speed of input shaft 106, consequently, "i" in equation (10) above denotes the output-input ratio of pericyclic gear reducer 100. As evident from equation (10) above, input shaft 106 and output sun gear 104 may rotate in the same direction responsive to $N_P<2N_S$, output sun gear 104 may stop responsive to $N_P=2N_S$, and input shaft 106 and output sun gear 104 may rotate in opposite directions responsive to $N_P>2N_S$. Consequently, for $$\frac{N_P}{N_S}$$

close to 2, high reduction ratios may be attained. In an exemplary embodiment, higher teeth numbers for middle planet ring gear 102 and output sun gear 104 may allow for attaining higher reduction ratios. For example, for a teeth number of 49 for middle planet ring gear 102 and a teeth number of 25 for output sun gear 104, the velocity ratio will be 1:25. In another example, for a teeth number of 99 for middle planet ring gear 102 and a teeth number of 50 for output sun gear 104, the velocity ratio will be 1:50. In another example, for a teeth number of 101 for middle planet ring gear 102 and a teeth number of 50 for sun gear 104, the velocity ratio will be −1:50 which signifies reverse rotation of output shaft 112 with respect to input shaft 106 while keeping high reduction ratio.

As is further evident from equation (10) above, $$\frac{N_P}{N_S}$$

is greater than unity since output sun gear 104 is encircled by middle planet ring gear 102. Consequently, it may be implied that i is less than 1 or in other words, pericyclic gear reducer 100 may be considered as an absolute speed reducer. In an exemplary embodiment, for a pressure angle of 20° for gears of middle planet ring gear 102 and output sun gear 104, the maximum value for i must be approximately 0.6 to avoid trimming interference for output sun gear 104 and middle planet ring gear 102. In an exemplary embodiment, for higher pressure angles of output sun gear 104 and middle planet ring gear 102, i may slightly increase beyond this limit of 0.6, however, the value of 0.6 may be considered as the upper limit of the output-to-input velocity ratio for gear reducers similar in type with pericyclic gear reducer 100.

Figure 4A:
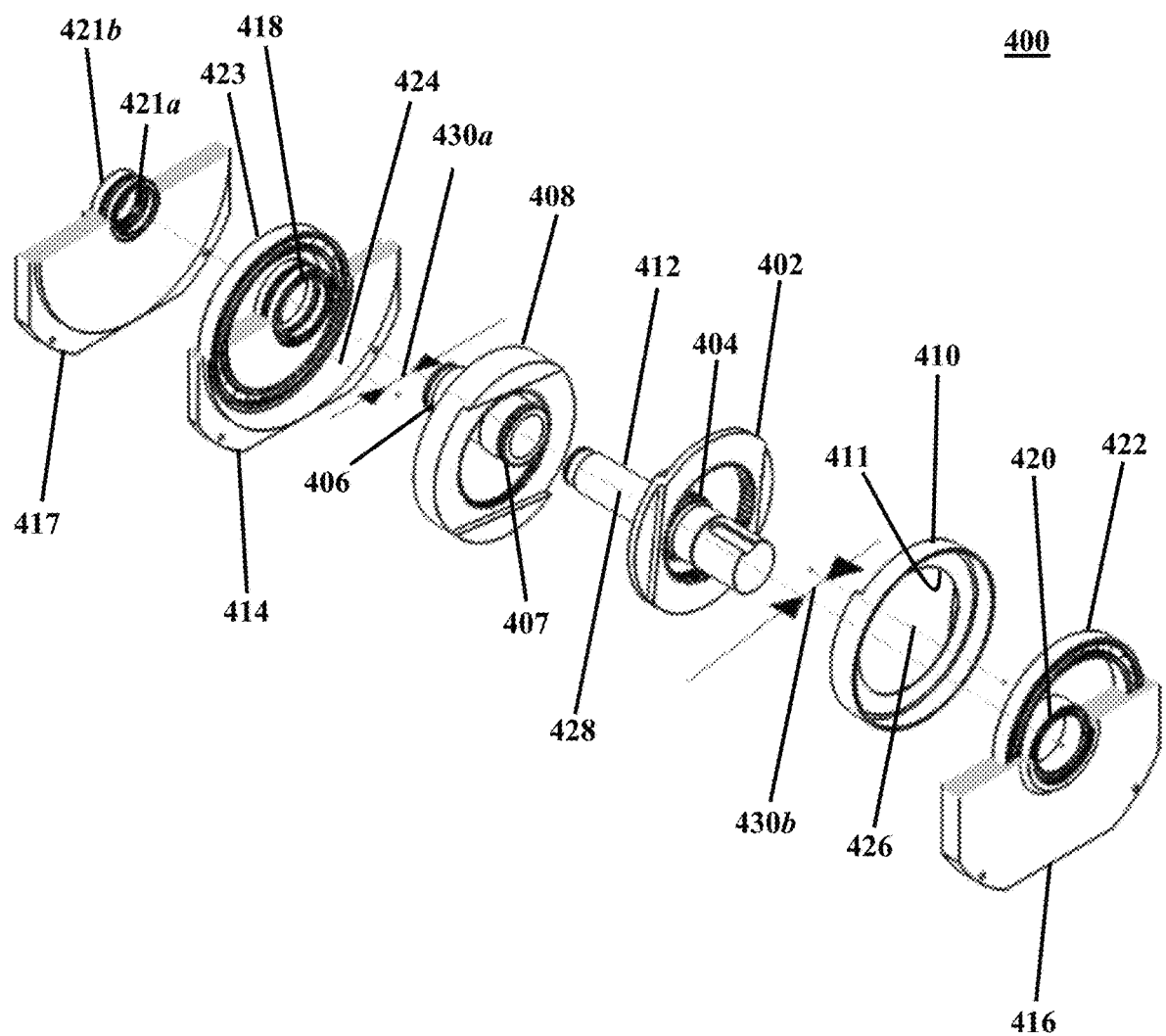
FIG. 4A illustrates an exploded view of a coaxial pericyclic gear reducer, consistent with one or more exemplary embodiments of the present disclosure.

FIG. 4A illustrates an exploded view of a coaxial pericyclic gear reducer 400, consistent with one or more exemplary embodiments of the present disclosure. In an exemplary embodiment, coaxial pericyclic gear reducer 400 may include an input shaft 406 that may be rotatable about a central axis 428, a middle planet ring gear 402 similar to middle planet ring gear 102 that may include a central annular gear with teeth cut in an internal surface of the annular gear, an output sun gear 404 similar to output sun gear 104 that may be positioned inside and meshed with middle planet ring gear 402.

In an exemplary embodiment, coaxial pericyclic gear reducer 400 may further include a driver ring gear 408 that may be configured to be coupled to input shaft 406 via an input external-teeth gear 407. In an exemplary embodiment, driver ring gear 408 may be similar to driver ring gear 108 however with teeth cut in an internal cylindrical surface of driver ring gear 408. In an exemplary embodiment, input shaft 406 may be coupled to or integrally formed with input external-teeth gear 407. In an exemplary embodiment, input external-teeth gear 407 may be disposed within driver ring gear 408 and may mesh with driver ring gear 408. In an exemplary embodiment, such coupling of input external-teeth gear 407 and driver ring gear 408 may allow for converting the rotational movement of input shaft 406 about central axis 428 to a rotational movement of driver ring gear 408 about a first rotational axis 424. In an exemplary embodiment, driver ring gear 408 may be coupled to middle planet ring gear 402 from a first side of middle planet ring gear 402 utilizing a first prismatic joint. In an exemplary embodiment, middle planet ring gear 402 may be rotatable with driver ring gear 408 utilizing the first prismatic joint.

In an exemplary embodiment, coaxial pericyclic gear reducer 400 may further include a driven wheel 410 structurally similar to driven wheel 110 that may be a flange coupled to middle planet ring gear 402 from a second side of middle planet ring gear 402 utilizing a second prismatic joint. In an exemplary embodiment, driven wheel 410 may be rotatable with middle planet ring gear 402 utilizing the second prismatic joint about a second rotational axis 426. In an exemplary embodiment, first prismatic joint and the second prismatic joint may make a right angle relative to each other, as described in connection with the embodiment shown in FIG. 2A.

In an exemplary embodiment, coaxial pericyclic gear reducer 400 may further include an output shaft 412 that may be coupled or integrally formed with output sun gear 404. In an exemplary embodiment, output shaft 412 may be rotatable with output sun gear 404 about central axis 428 of coaxial pericyclic gear reducer 400. In an exemplary embodiment, the first side and the second side of middle planet ring gear 402 may be opposite each other along central axis 428. In an exemplary embodiment, driven wheel 410 may include a central hole 411 that may be configured to allow passage of output shaft 412 through driven wheel 410.

In an exemplary embodiment, first rotational axis 424 and central axis 428 may have a first distance 430a and second rotational axis 426 and central axis 428 may have a second distance 430b. In an exemplary embodiment, first distance 430a and second distance 430b may be equal and opposite to each other, meaning that first rotational axis 424 and second rotational axis 426 may be symmetrically positioned on opposite lateral sides of central axis 428. In other words, first rotational axis 424 and second rotational axis 426 may have an offset equal to sum of first distance 430a and second distance 430b.

In an exemplary embodiment, coaxial pericyclic gear reducer 400 may further include a first wall 414 that may include a first hole that may be fitted with a first ball bearing 418. In an exemplary embodiment, the first hole may be configured to allow input shaft 406 to rotatably pass through first wall 414 while input shaft 406 may lean on first ball bearing 418. In an exemplary embodiment, first ball bearing 418 may be aligned with a centerline of first wall 414 and may be coaxial with central axis 428. In an exemplary embodiment, first wall 414 may further include a fourth ball bearing 423 that may be coupled to driver ring gear 408. In an exemplary embodiment, fourth ball bearing 423 may be housed in a fourth hole, which may be a blind or closed-end hole, in first wall 414. In an exemplary embodiment, an inner ring of fourth ball bearing 423 may be fixed to first wall 414 and an outer ring of fourth ball bearing 423 may be fixed to driver ring gear 408, hence fourth ball bearing 423 may be configured to rotatably couple driver ring gear 408 with first wall 414 and to allow driver ring gear 408 to rotate about first rotational axis 424 while leaning on fourth ball bearing 423.

In an exemplary embodiment, coaxial pericyclic gear reducer 400 may further include a second wall 416 that may include a second hole fitted with a second ball bearing 420. In an exemplary embodiment, a central normal axis of second ball bearing 420 may be coaxial with central axis 428. In an exemplary embodiment, the second hole may be configured to allow output shaft 412 to rotatably pass through second wall 416 while output shaft 412 may leaning on second ball bearing 420. In an exemplary embodiment, second wall 416 may further include a third ball bearing 422 that may be coupled to driven wheel 410. In an exemplary embodiment, third ball bearing 422 may be housed in a third hole, which may be a blind or closed-end hole, in second wall 416. In an exemplary embodiment, third ball bearing 422 may facilitate rotatable coupling of driven wheel 410 to second wall 416. An inner ring of third ball bearing 422 may be fixed to second wall 416 and an outer ring of third ball bearing 422 may be coupled to driven wheel 410 allowing driven wheel 410 to rotate about second rotational axis 426 while being mounted onto second wall 416. In an exemplary embodiment, first wall 414 and second wall 416 may be parallel with each other. In an exemplary embodiment, such parallel configuration and the fixed distance and orientation of first wall 414 and second wall 416 with respect to each other may be maintained by fastening or securing first wall 414 and second wall 416 to a shell (not illustrated for simplicity) that may house pericyclic gear reducer 400.

In an exemplary embodiment, input shaft 406 may be a hollow shaft configured to allow coaxial passage of output shaft 412 through input shaft 406. Such hollow configuration of input shaft 406 may allow for output shaft 412 to pass through input shaft 406 such that a first end of output shaft 412 may extend beyond first wall 414 and lean on a fifth ball bearing 421b mounted on third sidewall 417. In an exemplary embodiment, input shaft 406 may further extend beyond first sidewall 414 and may be coupled to a ball bearing 421a mounted on third wall 417 adjacent fifth ball bearing 421b. In an exemplary embodiment, a second opposing end of output shaft 412 may pass through central hole 411 of driven wheel 410 and may lean on second ball bearing 420 on second wall 416. In an exemplary embodiment, input shaft 406 may pass through walls 414 and 417 along central axis 428 leaning on ball bearings 418 and 421a.

In an exemplary embodiment, such hollow configuration of input shaft 406 and coupling of input shaft 406 with driver ring gear 408 via input external-teeth gear 407 may allow for mounting input shaft 406 and output shaft 412 in a coaxial arrangement, where output shaft 412 may coaxially pass through input shaft 406 and be rotatable within input shaft 406 independent from input shaft 406.

As mentioned before, in an exemplary embodiment, first rotational axis 424 of driver ring gear 408 may have offset 430a from central axis 428 and second rotational axis 426 of driven wheel 410 may have offset 430b from central axis 428 from an opposite lateral direction. Such offset between first and second rotational axes (424, 426) means that driver ring gear 408 and driven wheel 410 may be mounted in an eccentric and symmetric relationship relative to central axis 428.

In an exemplary embodiment, such eccentricity of driver ring gear 408 from central axis 428 by first distance 430a and eccentricity of driven wheel 410 from central axis 428 by second distance 430b on an opposite lateral side of central axis 428 and how driver ring gear 408 and driven wheel 410 may be coupled on either sides of middle planet ring gear 402 utilizing mutually perpendicular prismatic joints may urge middle planet ring gear 402 to assume a spinning motion about a normal central axis of middle planet ring gear 402 and a revolving motion about central axis 428 in response to rotational movement of input shaft 406. As used herein, a normal central axis of middle planet ring gear 402 may refer to as an axis perpendicular to the largest surface of middle planet ring gear 402 passing through center of middle planet ring gear 402. In an exemplary embodiment, such spinning motion and revolving motion of middle planet ring gear 402 may then be transferred to output sun gear 404.

In an exemplary embodiment, speed reduction ratio of coaxial pericyclic gear reducer 400 may be calculated by equation (11) below:

$$i = \frac{N_{DR}}{N_{IE}}\left(2 - \frac{N_P}{N_S}\right) \qquad \text{Equation (11)}$$

In equation (11) above, $N_{DR}$ stands for teeth number of driver ring gear 408, $N_{IE}$ stands for teeth number of input external-teeth gear 407, $N_P$ stands for teeth number of middle planet ring gear 402, and $N_S$ stands for teeth number of output sun gear 404. In an exemplary embodiment, $$\frac{N_{DR}}{N_{IE}}$$

may be less than 0.7 for avoiding interference and consequently the overall reduction limit for coaxial pericyclic gear reducer 400 may be about 0.4 since it was previously discussed in equation (10) that the maximum value of $$2 - \frac{N_P}{N_S}$$

in equation (10) is almost equal to 0.6. In an exemplary embodiment, a practical minimum limit for i in equation (11) may be considered to be 1:200. However, the lower limit of i can converge to zero, theoretically but it will result in very small teeth. In an exemplary embodiment, $$\frac{N_{DR}}{N_{IE}}$$

being less than 0.7 may guarantee avoidance of trimming interface.

Figure 4B:
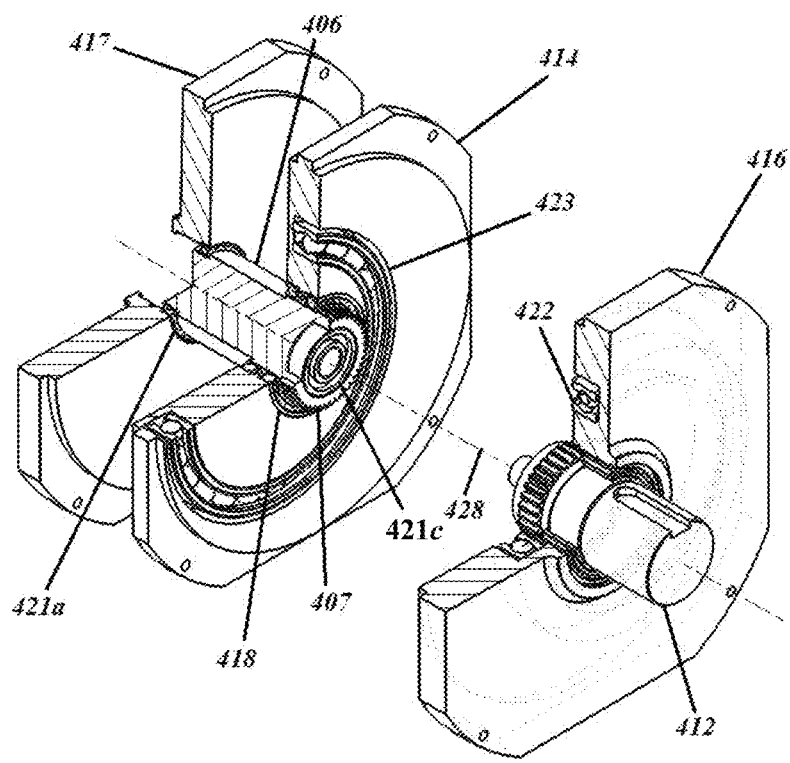
FIG. 4B illustrates an exploded view of a coaxial pericyclic gear reducer, consistent with one or more exemplary embodiments of the present disclosure.

FIG. 4B illustrates an exploded view of a coaxial pericyclic gear reducer 400', consistent with one or more exemplary embodiments of the present disclosure. In an exemplary embodiment, coaxial pericyclic gear reducer 400' may include an input shaft 406' disposed between parallel walls (414, 417) leaning on bearings (418, 421a). In an exemplary embodiment, a ball bearing 421c may be mounted at a first end of input shaft 406', where ball bearing 421c may be coaxial with central axis 428. In an exemplary embodiment, ball bearing 421c may be rotatably coupled input shaft 406' to output shaft 412, so that input shaft 406' may be coaxial with output shaft 412.

Figure 5A:
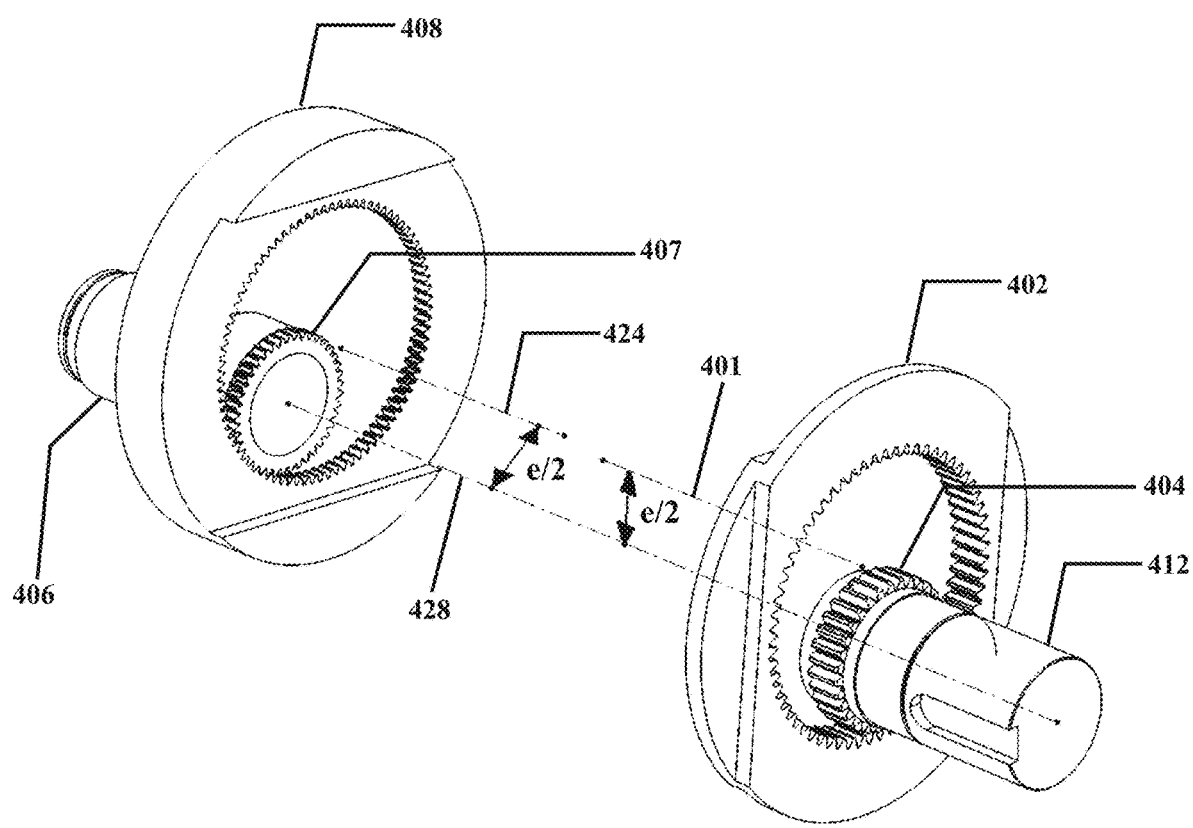
FIG. 5A illustrates a perspective exploded view of a driver ring gear meshed with input external-teeth gear and a middle planet ring gear meshed with output sun gear in a coaxial pericyclic gear reducer, consistent with one or more exemplary embodiments of the present disclosure.

FIG. 5A illustrates a perspective exploded view of a driver ring gear 408 meshed with input external-teeth gear 407 and a middle planet ring gear 402 meshed with output sun gear 404 in a coaxial pericyclic gear reducer, consistent with one or more exemplary embodiments of the present disclosure. As mentioned before, in an exemplary embodiment, coaxial pericyclic gear reducer 400 may include the pair of driver ring gear 408 and input external-teeth gear 407 and the pair of middle planet ring gear 402 and output sun gear 404. In an exemplary embodiment, middle planet ring gear 402 may be mounted with a misalignment relative to central axis 428 by a distance of e/2 and driver ring gear 408 may also be mounted with a misalignment relative to central axis 428 by a distance of e/2. As used herein with respect to FIG. 5A, the letter "e" may refer to the distance by which first rotational axis 424 and second rotational axis 426 are misaligned or offset. In an exemplary embodiment, the eccentricity of middle planet ring gear 402 and driver ring gear 408 with respect to central axis 428 may be described in terms of pitch diameters by equation (12) below:

$$\frac{e}{2} = \frac{d_{DR} - d_{IE}}{2} = \frac{d_P - d_S}{2} \quad \text{Equation (12)}$$

In equation (12) above, $d_{DR}$ denotes the pitch diameter of driver ring gear 408, $d_{IE}$ denotes the pitch diameter of input external-teeth gear 407, $d_P$ denotes the pitch diameter of middle planet ring gear 402, and $d_S$ denotes the pitch diameter of output sun gear 404. The equation (12) above may be described in terms of modulus (m) and teeth numbers (N) by equation (13) below:

$$m_P = m_{DR} \frac{N_{DR} - N_{IE}}{N_P - N_S} \quad \text{Equation (13)}$$

In equation (13) above, all gears are considered to be of spur type and $m_P$ denotes the module of middle planet ring gear 402, $N_{DR}$ denotes the teeth number of driver ring gear 408, $N_{IE}$ denotes the teeth number of input external-teeth gear 407, $N_P$ denotes the teeth number of middle planet ring gear 402, $N_S$ denotes the teeth number of output sun gear 404, and $m_{DR}$ denotes the module of driver ring gear 408.

In an exemplary embodiment, input external-teeth gear 407 and driver ring gear 408 may include helical gears, while output sun gear 404 and middle planet ring gear 402 may include spur gears. In an exemplary embodiment, for a helix angle of $\psi$ for helical gears, a transverse module may be defined as $m_t = m_n/\cos(\psi)$, where $m_n$ is a normal module selected from a standard table of modules. In an exemplary embodiment for helical input external-teeth gear 407 and driver ring gear 408, equation (13) may be rewritten as equation (14) below:

$$m_P = m_{nDR} \frac{N_{DR} - N_{IE}}{N_P - N_S} \sec(\psi) \quad \text{Equation (14)}$$

In equation (14) above, $m_{nDR}$ denotes a standard normal module selected for driver ring gear 408. As is evident from equation (14) above, if the helix angle $\psi$ is selected such that the factor $$\frac{N_{DR} - N_{IE}}{N_P - N_S} \sec(\psi)$$

becomes a proper coefficient, then $m_P$ and $m_{nDR}$ may be kept at standard values. In an exemplary embodiment, helix angle $\psi$ may be adjusted to any desired value in gear cutting apparatus, such as hobbing, power skiving, scudding, and some milling and shaping machines.

Equation (14) above is written for a configuration where input external-teeth gear 407 and driver ring gear 408 include helical gears while output sun gear 404 and middle planet ring gear 402 include spur gears. In an exemplary embodiment, input external-teeth gear 407, driver ring gear 408, output sun gear 404, and middle planet ring gear 402 may include helical gears and equation (14) may be rewritten as equation (15) below:

$$m_{nP} = m_{nDR} \frac{N_{DR} - N_{IE}}{N_P - N_S} \times \frac{\cos(\psi_P)}{\cos(\psi_{DR})} \quad \text{Equation (15)}$$

In equation (15) above, $m_{nP}$ denotes a standard normal module selected for middle planet ring gear 402, $\psi_{DR}$ denotes helix angle for driver ring gear 408, and $\psi_P$ denotes helix angle for middle planet ring gear 402.

In exemplary embodiments, input external-teeth gear 407 and driver ring gear 408 including helical gears may allow for eccentricity adjustments and noise reduction. Specifically, input external-teeth gear 407 and driver ring gear 408 may normally work at high speeds and consequently the noise generated by input external-teeth gear 407 and driver ring gear 408 may be relatively high. Utilizing helical gears in manufacturing input external-teeth gear 407 and driver ring gear 408 may considerably reduce the generated noise. Furthermore, utilizing helical gears in input side may allow designers to choose smaller teeth numbers for input external-teeth gear 407 without facing involute interference with teeth of driver ring gear 408, which may result in coarser teeth and increment of torque capacity in driver side.

As mentioned before, middle planet ring gear 402 may assume a combined rotational motion in response to the rotational movement of input shaft 406. Such combined rotational movement of middle planet ring gear 402 may include a spinning rotation of middle planet ring gear 402 about normal central axis of middle planet ring gear 402 and a revolving motion of middle planet ring gear 402 about central axis 428 around output sun gear 404.

Figure 5B:
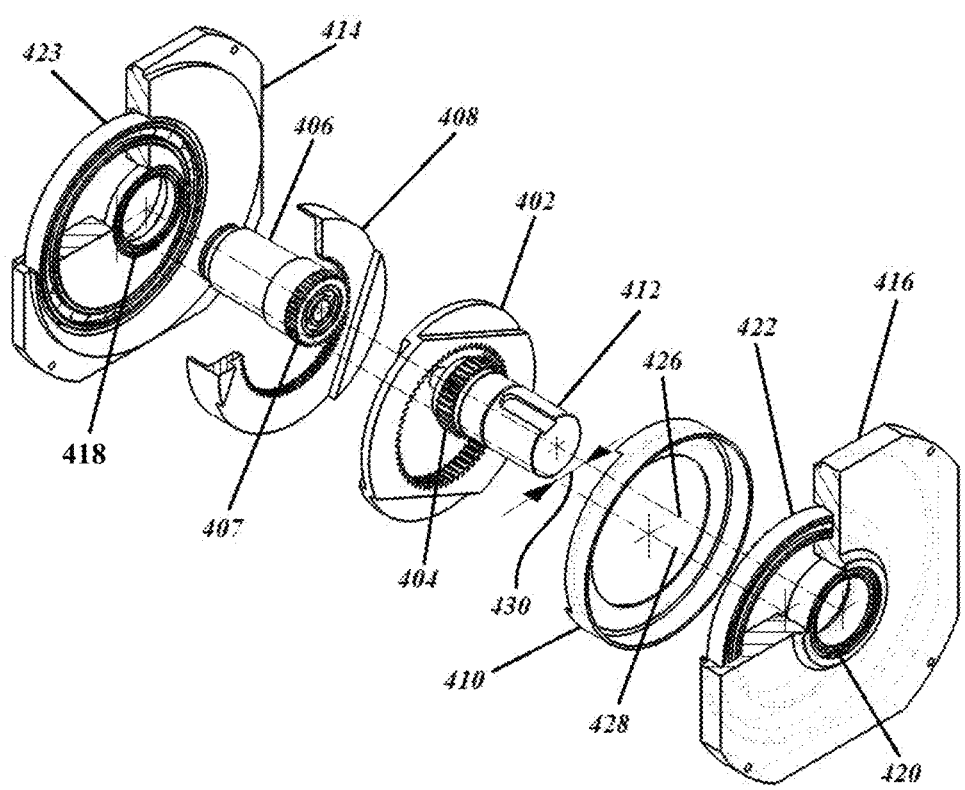
FIG. 5B illustrates a perspective exploded view of components of a coaxial pericyclic gear reducer with a middle planet ring gear and a driven wheel having offset on the same side of a central axis of the coaxial pericyclic gear reducer, consistent with one or more exemplary embodiments of the present disclosure.

FIG. 5B illustrates a perspective exploded view of components of a coaxial pericyclic gear reducer with driver ring gear 408 and driven wheel 410 having offset on the same side of a central axis 428 of the coaxial pericyclic gear reducer, consistent with one or more exemplary embodiments of the present disclosure; As used herein, such assembly may be referred to as a coaxial direct assembly hereinafter. Both the offsets are equal to e/2. In an exemplary embodiment, equations 12 to 15 may be valid for the coaxial direct assembly. To achieve this assembly from the coaxial pericyclic gear reducer 400, it is enough to rotate either the wall 416 or the wall 414 of coaxial pericyclic gear reducer 400, half a turn (180°) about the centerline of the gearbox 428 and then secure the walls to the gearbox shell (which is not shown in the figure for simplicity). Coaxial direct assembly can also be applied to pericyclic gear reducer 100 in a similar way. In the coaxial direct assembly, since the driver ring gear 408, the middle planet wheel 402 and the driven wheel 410 are inline, the revolutionary motion of the middle planet wheel 402 will vanish and hence the speed ratio of the coaxial direct assembly will be quite different than those of pericyclic gear reducer 100 and 400. In the coaxial direct assembly, the gear train from input external-teeth gear 407 to output shaft gear 404 may no longer be a cycloidal gear train. It will be just a simple train with fixed axes and hence it will not require balancing. Upholding the nomenclature used in equation (11), the velocity ratio from input shaft 406 to output shaft 412 in the coaxial direct assembly would be obtained as below:

$$i_{direct} = \frac{N_{IE}}{N_{DR}} \times \frac{N_P}{N_S} \qquad \text{Equation (16)}$$

In an exemplary embodiment, revolving motion of middle planet ring gear 402 may create a centrifugal force of a significant amount. Since, the generated centrifugal force may be proportional to the square of the angular velocity of revolutionary motion of middle planet ring gear 402 and considering the angular velocity of revolutionary motion of middle planet ring gear 402 being twice the angular velocity of driver ring gear 408, the order of the generated centrifugal force in middle planet ring gear 402 may be up to four times larger than the order of centrifugal forces generated in driver ring gear 408 and driven wheel 410. Considering such centrifugal forces within coaxial pericyclic gear reducer 400, balancing coaxial pericyclic gear reducer 400 may be considered crucial and if not balanced, coaxial pericyclic gear reducer 400 may experience damaging vibrations at high speeds.

In an exemplary embodiment, to address the balancing issue in coaxial pericyclic gear reducer 400, angular velocity ratio of driver ring gear 408 to input external-teeth gear 407 may be 1:2. In other words, angular velocity of input external-teeth gear 407 may be twice the angular velocity of driver ring gear 408 and therefore the angular velocity of input external-teeth gear 407 may be equal to the angular velocity of revolutionary motion of middle planet ring gear 402. This way, the rotational motion of input external-teeth gear 407 may become synchronous to the revolving motion of middle planet ring gear 402. Such synchronization between the rotational movements of input external-teeth gear 407 and middle planet ring gear 402 may allow for balancing coaxial pericyclic gear reducer 400 either by mounting counterweights or by digging cavities on input shaft 406 at precise locations on input shaft 406.

Figure 6A:
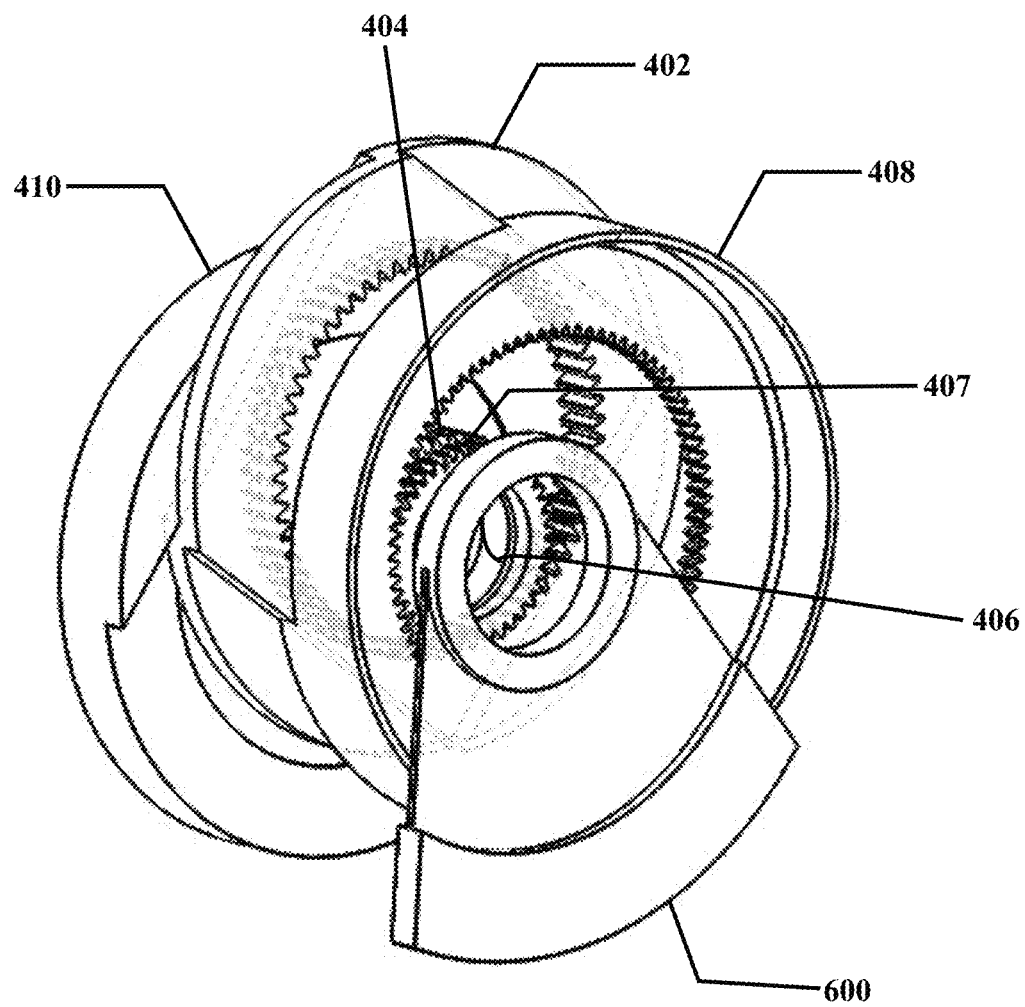
FIG. 6A illustrates a perspective view of a first counterweight mounted on an input shaft, consistent with one or more exemplary embodiments of the present disclosure.
Figure 6B:
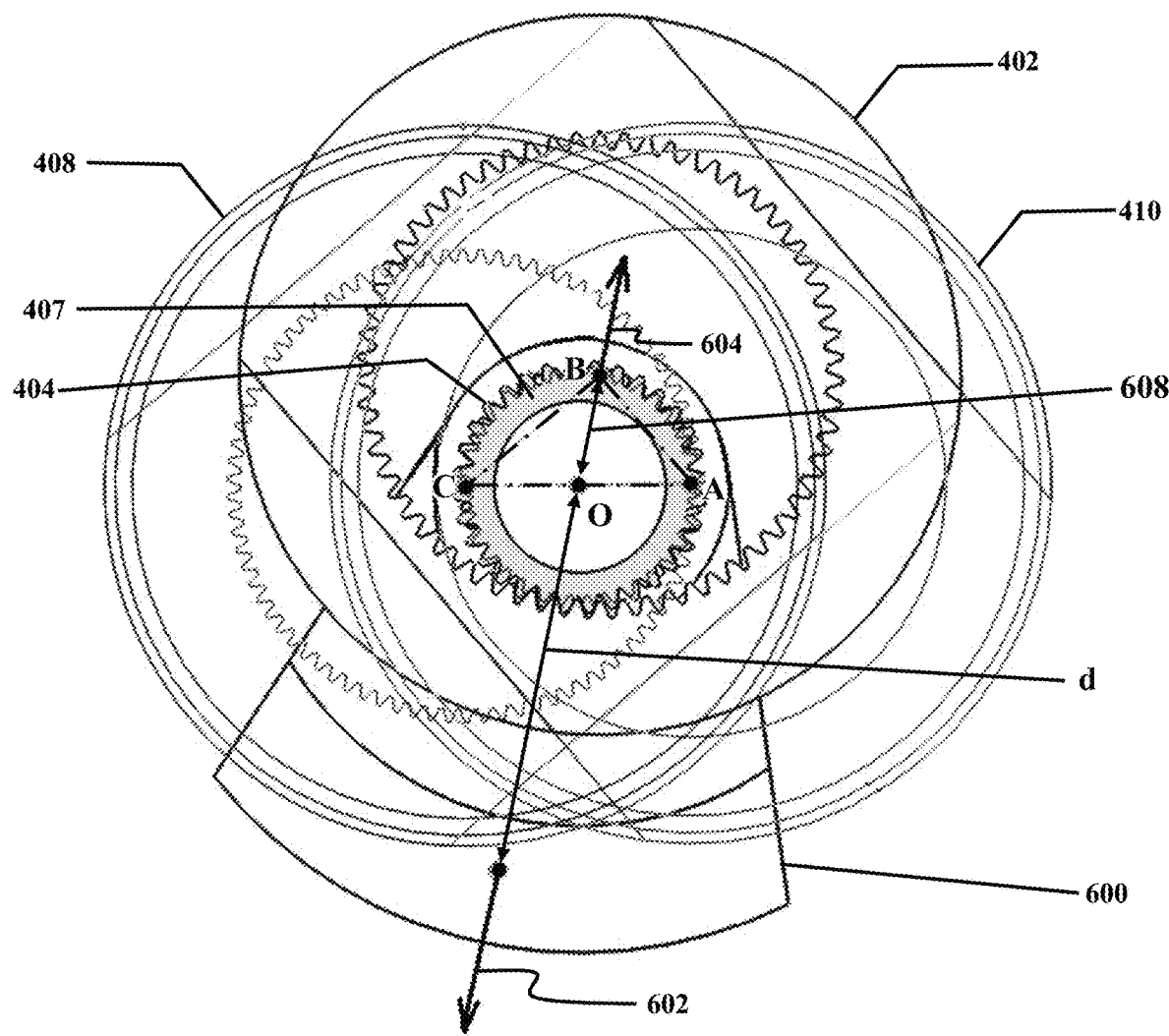
FIG. 6B illustrates a front view of a balancing weight mounted on an input shaft, consistent with one or more exemplary embodiments of the present disclosure.
Figure 6C:
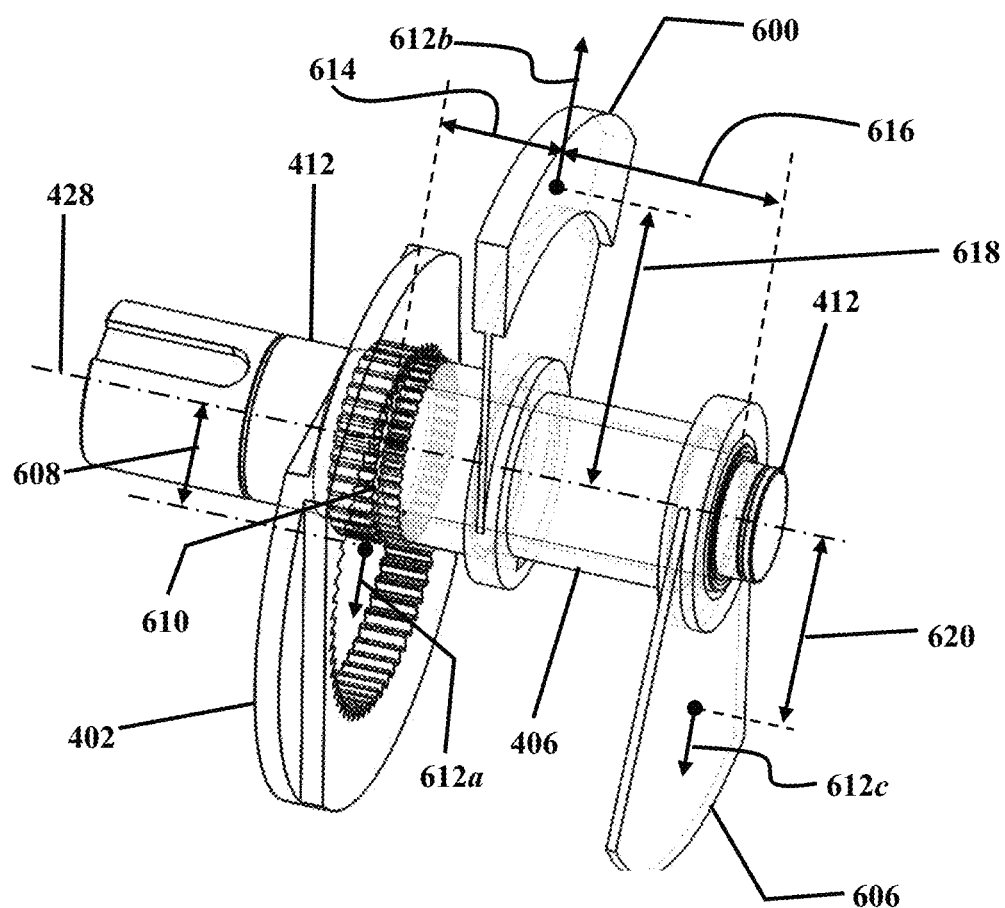
FIG. 6C illustrates a perspective view of a first counterweight and a second counterweight mounted on an input shaft, consistent with one or more exemplary embodiments of the present disclosure.

FIG. 6A illustrates a perspective view of a first counterweight 600 mounted on input shaft 406, consistent with one or more exemplary embodiments of the present disclosure. FIG. 6B illustrates a front view of balancing weight 600 mounted on input shaft 406, consistent with one or more exemplary embodiments of the present disclosure. FIG. 6C illustrates a perspective view of first counterweight 600 and a second counterweight 606 mounted on input shaft 406, consistent with one or more exemplary embodiments of the present disclosure.

In an exemplary embodiment, to achieve a static balance within coaxial pericyclic gear reducer 400, first counterweight 600 may be mounted on input shaft 406 on the opposite side of the eccentricity of middle planet ring gear 402. Specifically, if middle planet ring gear 402 has an eccentricity 608 of e/2 relative to central axis 428, first counterweight 600 may be mounted on input shaft 406 extending outward with respect to central axis 428 in the opposite direction with respect to eccentricity 608. Simply put, if output sun gear 404 is engaged with a lower portion of internal gear of middle planet ring gear 402, counterweight 600 may be mounted on a lower half of input shaft 406.

In an exemplary embodiment, for static balancing of coaxial pericyclic gear reducer 400, the following equation (17) must be satisfied:

$$M_{cw} d\omega^2 = M_P \left(\frac{e}{2}\right)\omega^2 \qquad \text{Equation (17)}$$

In equation (17) above, $M_{cw}$ denotes the mass of first counterweight 600, $M_P$ denotes the mass of middle planet ring gear 402, $\omega$ denotes angular velocity of the revolving motion of middle planet ring gear 402 (which is equal to angular velocity of input shaft), and e/2 may refer to the eccentricity of middle planet ring gear 402 with respect to central axis 428. Referring to FIG. 6B, d denotes a distance between center of mass of counterweight 600 and central axis 428.

In an exemplary embodiment, in addition to static balancing, for dynamic balancing of coaxial pericyclic gear reducer 400, a second counterweight 606 may be mounted on input shaft 406 on an opposite side of input shaft 406 with respect to first counterweight 600. In an exemplary embodiment, second counterweight 606 may be lighter than first counterweight 600.

In an exemplary embodiment, a first centrifugal force 612a may be exerted on middle planet ring gear 402, a second centrifugal force 612b may be exerted on first counterweight 600, and a third centrifugal force 612c may be exerted on second counterweight 606. In an exemplary embodiment, masses of first and second counterweights (600 and 606) as well as their eccentricity with respect to central axis 428 should satisfy the following equations (18) and (19) for both static and dynamic balancing:

$$F_P L_1 = F_{SC} L_2 \qquad \text{Equation (18)}$$

$$F_P + F_{SC} = F_{FC} \qquad \text{Equation (19)}$$

In equations (18) and (19) above, $F_P$ denotes first centrifugal force 612a, $F_{SC}$ denotes third centrifugal force 612c, $F_{FC}$ denotes second centrifugal force 612b, $L_1$ denotes a longitudinal distance 614 between first counterweight 600 and middle planet ring gear 402, and $L_2$ denotes a distance 616 between second counterweight 606 and first counterweight 600. In equations (18) and (19) above:

$$F_P = M_P \left(\frac{e}{2}\right) \omega^2 \qquad \text{Equation (20)}$$

$$F_{FC} = M_{FC} d_{FC} \omega^2 \qquad \text{Equation (21)}$$

$$F_{SC} = M_{SC} d_{SC} \omega^2 \qquad \text{Equation (22)}$$

In equations (20) to (22) above, $M_P$ denotes the mass of middle planet ring gear 402, $M_{FC}$ denotes the mass of first counterweight 600, $M_{SC}$ denotes the mass of second counterweight 606, $d_{FC}$ denotes eccentricity 618 of mass center of first counterweight 600, and $d_{SC}$ denotes eccentricity 620 of mass center of second counterweight 606.

In an exemplary embodiment, after static and dynamic balancing of coaxial pericyclic gear reducer 400, coaxial pericyclic gear reducer 400 may be utilized in various applications, such as robotics, automotive, household machines and aerospace. Furthermore, coaxial pericyclic gear reducer 400 may be utilized in wind turbines if it is applied in a back driving manner, that is, the input shaft side is swapped with the output shaft side and the pericyclic gearbox becomes a speed increaser, and a power generator takes the place of the driving motor.

Figure 6D:
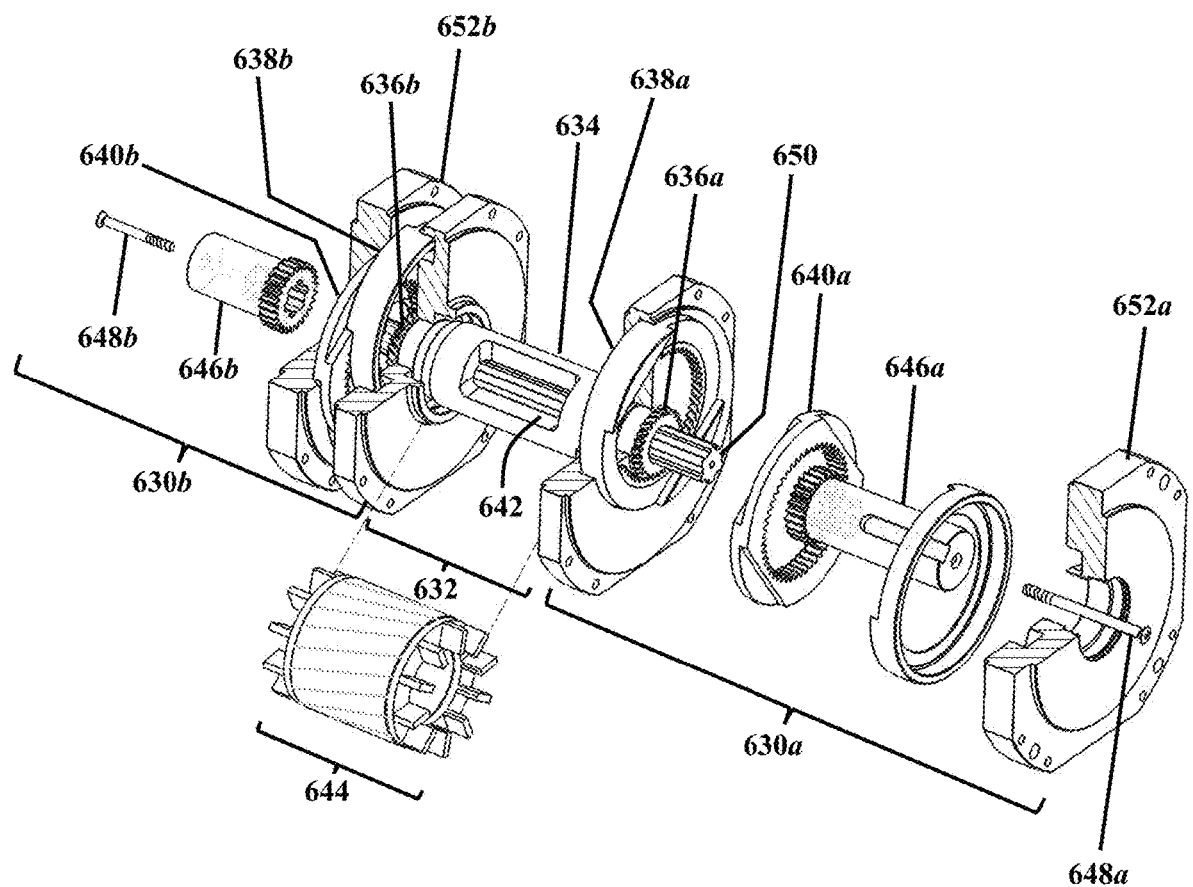
FIG. 6D illustrates an exploded perspective view of two coaxial pericyclic gear reducers coupled to an electric motor, consistent with one or more exemplary embodiments of the present disclosure.

FIG. 6D illustrates an exploded perspective view of two coaxial pericyclic gear reducers (630a and 630b) coupled to an electric motor 632, consistent with one or more exemplary embodiments of the present disclosure. In an exemplary embodiment, each coaxial pericyclic gear reducer of two coaxial pericyclic gear reducers (630a and 630b) may be structurally similar to coaxial pericyclic gear reducer 400. In an exemplary embodiment, two coaxial pericyclic gear reducers (630a and 630b) may be similar in shape but not necessarily in size. In other words, any of two coaxial pericyclic gear reducers (630a and 630b) may be larger than the other one, however, all corresponding gears utilized in two coaxial pericyclic gear reducers (630a and 630b) may have equal teeth numbers.

In an exemplary embodiment, motor shaft 634 may function as input shafts of both coaxial pericyclic gear reducers (630a and 630b). In an exemplary embodiment, motor shaft 634 may transmit its power via a first external-teeth gear 636a to a first driver ring gear 638a of first coaxial pericyclic gear reducer 630a of two coaxial pericyclic gear reducers (630a and 630b). In an exemplary embodiment, motor shaft 634 may further transmit its power via a second external-teeth gear 636b to a second driver ring gear 638b of second coaxial pericyclic gear reducer 630b of two coaxial pericyclic gear reducers (630a and 630b). In an exemplary embodiment, first external-teeth gear 636a and second external-teeth gear 636b may be unified or integrally formed with motor shaft 634. In an exemplary embodiment, first external-teeth gear 636a and second external-teeth gear 636b may have similar teeth numbers. In an exemplary embodiment, first external-teeth gear 636a and second external-teeth gear 636b may include helical gears and corresponding helix angles of first external-teeth gear 636a and second external-teeth gear 636b may be opposite each other to counterbalance respective axial forces of first external-teeth gear 636a and second external-teeth gear 636b.

In an exemplary embodiment, first driver ring gear 638a and second driver ring gear 638b may include internal-teeth ring gears and each external-teeth gear of first external-teeth gear 636a and second external-teeth gear 636b may mesh with a corresponding one of first driver ring gear 638a and second driver ring gear 638b. In an exemplary embodiment, velocity ratio of such meshing of each external-teeth gear of first external-teeth gear 636a and second external-teeth gear 636b with a corresponding one of first driver ring gear 638a and second driver ring gear 638b may be 1:2.

In an exemplary embodiment, driver ring gear 638a and driver ring gear 638b may be initially so mounted that middle planet ring gears 640a and 640b have misalignments relative to central longitudinal axis of motor shaft 634 in the same direction. Hence middle planet ring gears (640a and 640b) of both pericyclic gear reducers (630a and 630b) may have same-side offsets while middle planet ring gears (640a and 640b) may be revolving around the central longitudinal axis of motor shaft 634. Consequently, the centrifugal force of both middle planet ring gears (640a and 640b) may be in the same direction. For purpose of balancing, on one side of middle part of motor shaft 634, a cavity 642 may be cut out or dug so that cavity 642 may counterbalance the centrifugal forces of both driven ring gears (640a and 640b). In an exemplary embodiment, cavity 642 may be in the same side of the misalignment of middle planet ring gears (640a and 640b) with respect to central longitudinal axis of motor shaft 634 and volume and position of cavity 642 may be so determined to counterpoise the centrifugal forces of middle planet ring gears (640a and 640b). In an exemplary embodiment, motor 632 may further include a rotor 644 that may be press fitted on motor shaft 634.

For equally dividing output torque between two pericyclic gear reducers (630a and 630b), output shafts (646a and 646b) of corresponding two coaxial pericyclic gear reducers (630a and 630b) may be connected to each other by utilizing a central spline 650. In an exemplary embodiment, spline 650 may be centrally inserted from both ends of spline 650 into corresponding central spline holes on output shafts (646a and 646b) to a certain extent and may become fixed to output shafts (646a and 646b) utilizing two screws (648a and 648b). In an exemplary embodiment, motor shaft 634 may have a central hole that may be configured to allow spline 650 to pass through motor shaft 634, without touching motor shaft 634. In an exemplary embodiment, spline 650 and the two output shafts (646a and 646b) may act as an integrated shaft which is of simply-supported type lying on two central bearings on end walls (652a and 652b). For simplicity, bearings are not illustrated in FIG. 6D.

In an exemplary embodiment, such configuration of coaxial pericyclic gear reducers (630*a* and 630*b*) and motor 644 as an integrated drive train may allow for a complete balancing of the entire drive train. Furthermore, the integrated drive train has a single output shaft of simply-supported type that connects the output shafts of two coaxial pericyclic gear reducers (630*a* and 630*b*) to each other. Consequently, the output shaft may become very strong against bending loads. Such configuration of integrated drive train may also reduce the number of bearings of coaxial pericyclic gear reducers (630*a* and 630*b*) at both ends of the integrated drive train and consequently may lead to a compact longitudinal size for the integrated drive train.

In an exemplary embodiment, coaxial pericyclic gear reducers (630*a* and 630*b*) may be back driven, i.e. the power is transmitted from the output side toward the input side. In this case, motor 644 may be replaced by a generator and applied in wind turbine and similar requests. In an exemplary embodiment, motor 644 may include an internal combustion engine or a jet engine to be utilizable in "geared turbo fan engines" in aviation industry and similar applications. For simplicity, exemplary shells of motor 632 and pericyclic gear reducers 630*a* and 630*b* are not illustrated.

Specifically, a pericyclic gear reducer, such as coaxial pericyclic gear reducer 400 may be utilized in electrical linear actuators or jack screws. Electric linear actuator is a widely-used device that performs the function of a hydraulic or pneumatic linear actuators. The usual electrical linear actuators consist mainly of an external electric motor, a gearbox (which is usually a reducer) and a screw unit. The screw is driven by output shaft of the gearbox and pushes the main rod of the actuator. It has many advantages over hydraulic linear actuator except that it is much bigger and heavier than that for a given amount of load to be transmitted. In an exemplary embodiment, a pericyclic gear reducer, such as coaxial pericyclic gear reducer 400 may be utilized as the gearbox of an exemplary electrical linear actuator. Such utilization of coaxial pericyclic gear reducer 400 in an exemplary electric linear actuator may make it powerful while keeps its size compact with an internal electric motor. It will be comparable with hydraulic linear actuators regarding shape, size and load capacity.

In an exemplary embodiment, as mentioned before, in coaxial pericyclic gear reducer 400, a high-speed input shaft, such as input shaft 406 may surrounds a low-speed output shaft, such as output shaft 412 while both of input and output shafts (406, 412) are on the input side of coaxial pericyclic gear reducer 400. Such configuration of input shaft 406 and output shaft 412 may allow an exemplary electrical motor to be located in an exemplary cylindrical body of an exemplary electrical linear actuator. Consequently, a longitudinal space of an exemplary electrical linear actuator may be reduced by utilization of coaxial pericyclic gear reducer 400 since both an exemplary electric motor and an exemplary screw unit may be mounted on the same side of an exemplary electrical linear actuator. Furthermore, in an exemplary embodiment, due to relatively higher reduction ratios that may be achieved in coaxial pericyclic gear reducer 400 in comparison to other available reducers, high speed electrical motors may be utilized in an exemplary electrical linear actuator, which not only decreases the size and weight of an exemplary electrical linear actuator but also may increase the power density of an exemplary electrical linear actuator.

Figure 7:
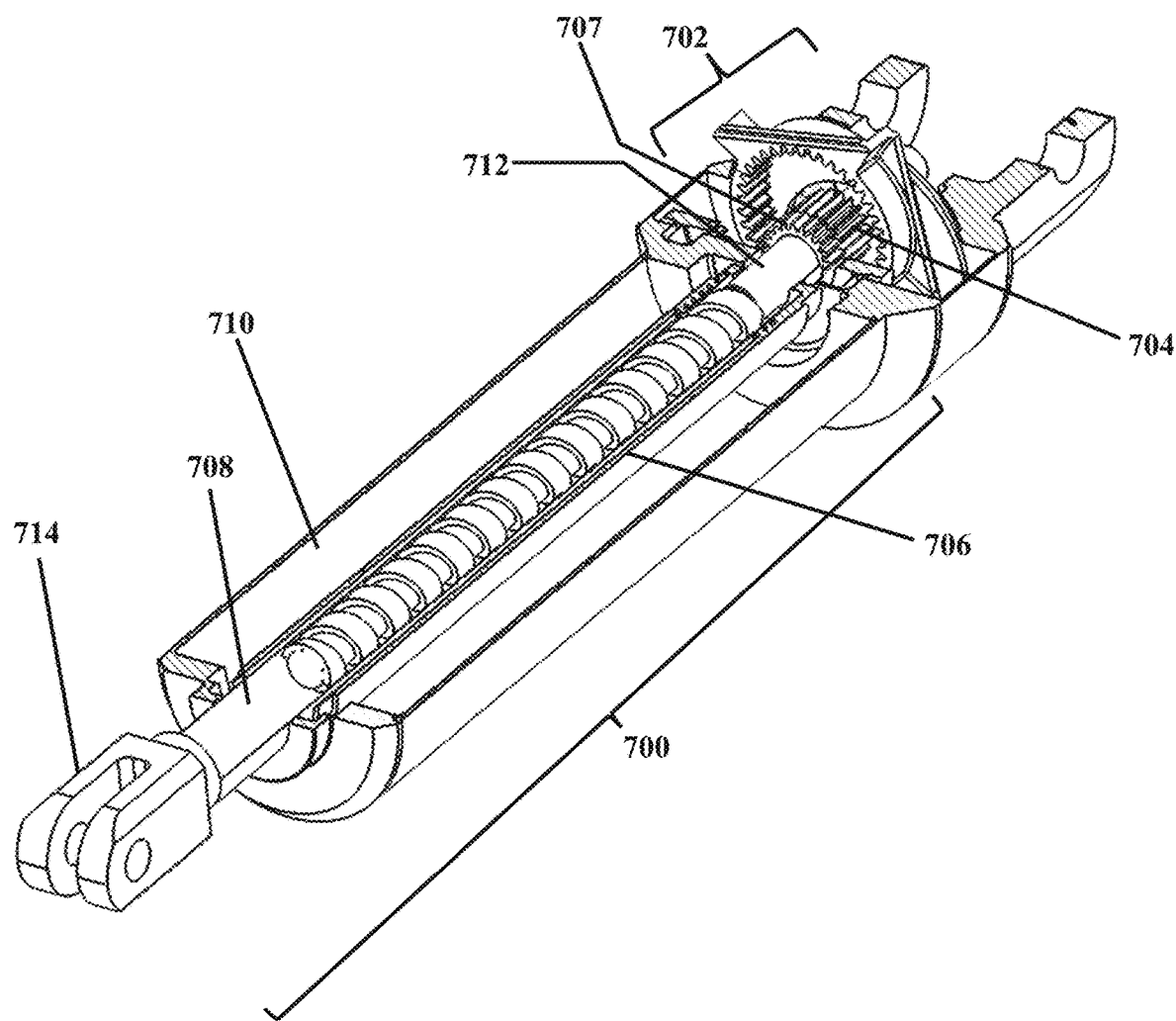
FIG. 7 illustrates a sectional perspective view of an electrical linear actuator coupled to a coaxial pericyclic gear reducer, consistent with one or more exemplary embodiments of the present disclosure.

FIG. 7 illustrates a sectional perspective view of an electrical linear actuator 700 coupled to a coaxial pericyclic gear reducer 702, consistent with one or more exemplary embodiments of the present disclosure. In an exemplary embodiment, coaxial pericyclic gear reducer 702 may be structurally similar to coaxial pericyclic gear reducer 400 and may be utilized as a gear reducer to transfer a rotational movement of a rotary actuator such as an electric motor to electrical linear actuator 700. In an exemplary embodiment, electrical linear actuator 700 may include a jack screw.

In an exemplary embodiment, coaxial pericyclic gear reducer 702 may include an output shaft 712 similar to output shaft 412. In an exemplary embodiment, output shaft 712 of coaxial pericyclic gear reducer 702 may be coupled to a central screw 704 of electrical linear actuator 700. In an exemplary embodiment, responsive to the rotation of central screw 704, a central rod 708 of electrical linear actuator 700 may be extended or retracted along a longitudinal axis of electrical linear actuator 700. As used herein, a longitudinal axis of an object may refer to an axis associated with the longest dimension of that object.

In an exemplary embodiment, an input shaft 706 of coaxial pericyclic gear reducer 702 may be configured as a hollow shaft similar to input shaft 406, through which output shaft 712 may pass. In an exemplary embodiment, input shaft 706 may be a hollow shaft of an electric motor that may be housed within an elongated cylindrical body 710 of electrical linear actuator 700. In an exemplary embodiment, central rod 708 may be coaxially disposed within input shaft 706 and input shaft 706 may be configured to guide the linear movement of central rod 708. In an exemplary embodiment, central rod 708 may be coupled to an end-effector, such as a hook 714. As mentioned before, such utilization of coaxial pericyclic gear reducer 702 may allow for a more compact design of electrical linear actuator 700, not to mention allowing a considerable increase in the power density of electrical linear actuator 700. In an exemplary embodiment, input shaft 706 is coupled to or integrally made with input external-teeth gear 707 so that input external-teeth gear 707 is driven by electrical motor 710 directly. There is a central hole in input shaft 706 as well as in input external-teeth gear 707 to let external output shaft 712, passes through that hole. external output shaft 712 is directly coupled to or integrally made with output sun gear 704 of the exemplary pericyclic gear reducer 702. In such a configuration of external output shaft 712, input shaft 706 and the output shaft 712 may be in same side and low-speed output shaft 712 may be surrounded by high-speed input shaft 706.

An exemplary pericyclic gear reducer such as pericyclic gear reducer 100 or coaxial pericyclic gear reducer 400 may have some advantages over classic gearboxes with common gear trains at the same power capacity and reduction ratio; such advantages may include compact structure, light weight, small moment of inertia, high power density, high torque density (due to utilization of internal-external gear meshing), high efficiency, and lower backlash.

An exemplary pericyclic gear reducer such as pericyclic gear reducer 100 or coaxial pericyclic gear reducer 400 may have some advantages over other gear reducers, such as planetary gear transmission (PGT), cycloidal speed reducers (CSR), worm and gear (WG) reducers, and harmonic drives (HD). Such advantages over the aforementioned gear reducers may include a wider range of reduction ratios, covering the most convenient range of reduction ratios in industry (i.e. 2.5:1 up to 50:1), more multiplicity in reduction ratios, capability of having both same direction and opposite direction input-output rotations, Both parallel and coaxial input/output shafts assembly, interference-free gear meshing for a wide range of gear ratios, full involute gear meshing (consequently, smooth running with low noise, high contact ratio and steady output velocity), high torque capacity, high efficiency, lower wear, lower cost, lower levels of noise, and maintaining high torque and power capacity in wide range of reduction ratios, excellent adaptability for modular production, high reliability and two alternatives in assembling components (i.e. pericyclic and direct assemblies). Table 1 below, summarizes a thorough comparison between an a single-stage coaxial pericyclic gear reducer such as coaxial pericyclic gear reducer 400 (referred to as "PGR") with other gear reducers, such as PGT, CSR, WG, and HD.

TABLE 1

| Relative Feature (per Stage) | Transmission Type | | | | |
|---|---|---|---|---|---|
| | PGT | CSR | WG | HD | PGR |
| Total Range of Reduction Ratio | 3:1-10:1 10:9-3:2 | 11:1-100:1 | 10:1-150:1 | 30:1-350:1 | 2.2:1-200:1 200:199-7:4 |
| Optimum Range of Reduction Ratio | 4:1-6:1 | 30:1-50:1 | 10:1-50:1 | 50:1-200:1 | 3:1-100:1 100:99-3:2 |
| Multiplicity in Ratio | good | moderate | moderate | moderate | excellent |
| Selection Weight | moderate | moderate | high | low | low |
| Longitudinal Compactness | moderate | excellent | moderate | weak | excellent |
| Radial Compactness | good | moderate | weak | moderate | good |
| Input-Output Shaft Arrangement | coaxial | coaxial | skew | Coaxial | coaxial & parallel |
| Hollow Shaft Configuration | conditionally possible | possible | possible | possible | possible |
| Backlash | moderate | low | high | Low | low |
| Equivalent Moment of Inertia on Input Shaft | low | moderate | moderate | Low | moderate |
| Number of Gears | 4-7 | 2-3 | 2 | 2 | 2 or 4 |
| Number of Bearings | 7-12 | 4-6 | 4 | 3-5 | 3-4 |
| Gear Profile | involute | special | special | special | involute |
| Type of Interference in Gears that should be Avoided | involute trochoid & trimming | — | — | trochoid & trimming | involute & trimming |
| Type of Bearings | ordinary | ordinary | ordinary | Special & Ordinary | ordinary |
| Efficiency | high | high | low | moderate | excellent |
| Pitch Line Velocity in Gears | low | low | high | very low | low |
| Operational Input Speed | high | moderate | low | moderate | high |
| Torque Capacity per Volume | high | high | moderate | moderate | high |
| Power Capacity per Volume | high | high | moderate | moderate | high |
| Resistance to Initial and Breaking Shock | moderate | high | low | moderate | moderate |
| Wear | moderate | moderate | very high | Moderate | low |
| Contact Stress on Gear's Teeth | high | low | low | high | low |
| Elastic Stress on Parts and Hysteresis Damping | moderate | moderate | moderate | high | low |
| Bending Stress on Gear's Teeth | moderate | very low | moderate | high | moderate |
| Number of Alternative Assemblies and Corresponding Ratios | 3 | 1 | 1 | 1 | 2 |
| Analysis of Internal Loads and Stresses | indeterminate | indeterminate | determinate | indeterminate | determinate |
| Complexity of Components' Shape | simple | complex | simple | Complex | simple |
| Tolerances in Manufacturing | tight | tight | moderate | tight | moderate |
| Materials and Alloys | ordinary | special | special | Special | ordinary |
| Relative Performance in Low Reduction Ratios (in range) | weak | weak | good | weak | good |
| Relative Performance in Medium Reduction Ratios | good | good | moderate | good | excellent |
| Relative Performance in High Reduction Ratios (in range) | weak | weak | week | weak | good |
| Cost | moderate | high | moderate | High | low |
| Endurance | moderate | high | low | Low | high |

TABLE 1-continued

| Relative Feature | Transmission Type | | | | |
|---|---|---|---|---|---|
| (per Stage) | PGT | CSR | WG | HD | PGR |
| Reliability | moderate | high | moderate | moderate | high |
| Back Driving (Opposite of Self Locking) | possible | impossible | impossible | Impossible | Possible |
| Sign of Output Direction (relative to Input) | positive | negative | positive | negative | Possible & negative |
| Balancing Requirement | moderately | highly | lowly | moderately | highly |
| Possibility of Static Balancing | yes | yes | yes | yes | yes |
| Possibility of Fully Dynamic Balancing | yes | no | yes | yes | yes |
| Output Speed Fluctuation | no | yes | no | yes | no |
| Rippling of Internal forces | no | yes | no | yes | no |
| Noise Level | moderate | moderate | low | moderate | low |
| Heat Exchange Density | moderate | high | low | moderate | high |
| Size Limitation | Not Limited | Not Limited | Not Limited | Limited | Not Limited |
| Possible Power Sequence in Multistage Assembly | series | Series & Parallel | series | series | Series & Parallel |
| Adaptability to Modular Production | moderate | moderate | moderate | good | excellent |

In an exemplary embodiment, as evident from equation (11), a coaxial pericyclic gear reducer, such as coaxial pericyclic gear reducer 400 may have no lower limit on the speed reduction ratio, theoretically. However, in practice, some restrictions may be encountered. First, $N_{DR}/N_{IE}$ in equation (11) must be chosen to be ½ for balancing purposes. The second limitation is that $N_P$ and $N_S$ are integers and hence the fraction $N_P/N_S$ cannot take any desirable value. The third limitation is the module limitation, which was thoroughly discussed in previous paragraphs in connection with FIG. 5A. Finally, the fourth limitation is related to the geometry of gears to avoid different kinds of interferences in gears. For example, for standard 20° pressure angle spur gears, the two conditions: $1.1 < N_P/N_S < 1.6$ and $N_{IE}, N_S > 21$ should be held concurrently to circumvent trimming and involute interferences, respectively[1]. Here, the lower and upper limits (1.1 and 1.6) may correspond to very large and very small teeth numbers, respectively. In an exemplary embodiment, $N_{IE}, N_S > 21$ may apply for spur gears and in case helical gears are utilized, this limit may decrease as the helix angle increases.

[1] The lower and upper limits (1.1 and 1.6) correspond to very large and very small teeth numbers respectively.

In spite of the four limitations mentioned above, there may be so many choices in practice for $N_P$ and $N_S$ with standard moduli to get a variety of reductive ratios. By varying $N_{IE}, N_{DR}, N_P$ and $N_S$ as well as proper selection of gears' moduli and helix angles, almost every desired ratio in ratio range may be achievable in an exemplary pericyclic gear reducer, such as coaxial pericyclic gear reducer 400.

In a single stage planetary gear transmission in a high reduction mode, where an exemplary ring gear of the single stage planetary gear transmission is fixed and the exemplary sun gear may act as the input. An exemplary carrier of planet gears is connected to an exemplary output shaft, an exemplary reduction ratio may be obtained by equation (23) below:

$$\text{Reduction ratio} = (1 + N_{Ring}/N_{Sun})^{-1} \qquad \text{Equation (23)}$$

In equation (23) above, $N_{Ring}$ stands for the teeth number of an exemplary ring gear and $N_{Sun}$ stands for the teeth number of an exemplary input sun gear of an exemplary planetary gear transmission. Comparing equation (23) with equation (11), it is evident that in both planetary gear transmission and pericyclic gear reducer 100, the upper limit of reduction ratio cannot approach ½ since the fractions $N_{Ring}/N_{Sun}$ and $N_P/N_S$ may approach to unity which would be impossible because the external gears should be as large as the internal gears in the exemplary reducers. In this regard, pericyclic gear reducer 100 may have a better condition than an equivalent planetary gear transmission, since in pericyclic gear reducer 100, only one external gear, such as output sun gear 104 is located within an internal gear, such as middle planet ring gear 102, while in an exemplary planetary gear transmission, a chain consisting of three external inline gears are located within the internal gear. In other words, in an exemplary planetary gear transmission the fraction $N_{Ring}/N_{Sun}$ should take the minimum value of 2 to allow for exemplary planet gears be disposed between an exemplary input sun gear and an exemplary ring gear. On the contrary, in pericyclic gear reducer 100, the fraction Np/Ns may take a minimum value of 1.1 or even less than 1.1 without encountering any interferences. Hence a minimum value of reduction ratios in pericyclic gear reducer 400 and an exemplary planetary gear transmission may be 2.2 and 3, respectively based on equations 11 and 23. However, the efficient reduction ratio of pericyclic gear reducer 400 may start from 3 instead of 2.2 since the ratios between 2.2 and 3 correspond to small size of teeth and hence low torque capacity. The efficient reduction ratio of an exemplary planetary gear transmission starts from 4 (instead of 3) since the ratios between 3 and 4 correspond to small size planet gears and hence low torque capacity. On the other side of the ratio spectrum, the upper bands of reduction ratio in an exemplary planetary gear transmission cannot exceed 10 since approaching this ratio results in an exceedingly small input sun gear and decrement of planet numbers, as well as very small teeth size to avoid involute interference between sun and planets. This significantly decreases the torque capacity of the transmission and should be avoided in practice, except in special cases. Pericyclic gear reducer 400, on the other hand, has no limitation on its upper band of ratio range except that the higher ratios yield to higher number of gear teeth and consequently the smaller size of teeth, if the overall size of the gearbox is kept to be unchanged. This is a common drawback of all speed reducers (including an exemplary planetary gear transmission, SCR, W&G HD and PGR) since it weakens the gears in torque transmission in high reduction ratios. Regardless of that, pericyclic gear reducer 400 may efficiently work in reduction ratios up to 100:1.

Another benefit of an exemplary pericyclic gear reducer, such as pericyclic gear reducer 100 or coaxial pericyclic gear reducer 400, in comparison with an exemplary planetary gear transmission is the multiplicity in available ratios. This may be achieved just by changing two parameters, i.e., the teeth numbers of middle planet ring gear 402 and output sun gear 404. Theoretically, infinite numbers of ratios may be found for both an exemplary pericyclic gear reducer and an exemplary planetary gear transmission in their reduction range but in an exemplary planetary gear transmission much more parameters should be adjusted to obtain desired ratios. A gear reduction ratio for an exemplary planetary gear transmission may depend on the relative sizes of an exemplary input sun gear, exemplary planetary gears, an exemplary ring gear, and an exemplary carrier arm of an exemplary planetary gear transmission. In an exemplary pericyclic gear reducer, such as pericyclic gear reducer 100 or coaxial pericyclic gear reducer 400, various reduction ratios may be achieved by adjusting the two parameters, namely, the teeth numbers of output sun gear (104, 404) and middle planet ring gear (102, 402). In exemplary embodiments, such configuration of pericyclic gear reducer 100 or coaxial pericyclic gear reducer 400 may offer excellent adaptability for modular production. In other words, in various pericyclic gearboxes of same power class, by having most of parts including shells, bearings, input shafts, driver ring gear and driven wheel to be the same, only by differing the output sun and planet gears (102, 104 or 402, 404) various gearboxes may be produced with different ratios.

In a comparative example, an exemplary pericyclic gear reducer and an exemplary planetary gear transmission with reduction ratios ranging from 3 to 10 may be compared. Since an exemplary pericyclic gear reducer such as coaxial pericyclic gear reducer 400 may take infinite numbers of available ratios between 3 and 10, for the sake of comparison, some restrictions may be applied on coaxial pericyclic gear reducer 400 as follows. In this comparative example, driver ring gear 408, input external-teeth gear 407, output sun gear 404, and middle planet ring gear 402 may fulfill the following limitations: $N_{DR}=38$, $N_{IE}=19$, normal pressure angles of driver ring gear 408, and input external-teeth gear 407 equal to 20°, helix angles of driver ring gear 408 and input external-teeth gear 407 equal to 18°, and normal modules of driver ring gear 408 and input external-teeth gear 407 equal to 0.9. In this comparative example, output sun gear 404 and middle planet ring gear 402 may include spur gears with pressure angles of 20°. In addition, moduli of output sun gear 404 and middle planet ring gear 402 may be of standard values between 0.3 and 3. Finally, no profile shift is permitted in any of the gears. Despite assuming these very curbing conditions, surprisingly, 268 different combinations of reduction ratios between 3 and 10 and standard moduli between 0.3 and 3 may be achieved just by varying the teeth number of sun gear 404 and middle planet gear 402.

A similar comparison may be made between an exemplary pericyclic gear reducer and CSR and HD. Although, CSRs and HDs have wider domain of available ratios in comparison with PGTs, they have fewer numbers of available ratios than those of PGTs and PGR. SCRs and WG may only have integer ratios and HDs may have pure integers and integers plus 0.5 ratios. The reduction range of SCRs and HDs may have a lower limit of 10 and 30, respectively while the ratio range of coaxial pericyclic gear reducer 400 may start from 2.2. The upper limits of reduction ratio range for CSR, HD and coaxial pericyclic gear reducer 400 have no restriction theoretically. However, they may take the operational values of 100:1, 320:1 and 200:1, respectively. For reduction ratios with larger values, the torque density will be decreased remarkably in CSR, HD and coaxial pericyclic gear reducer as well as WG since the gear teeth size in all of them decreases fatefully.

FIG. 8A illustrates a graphical chart of gear reduction ratio ranges of exemplary gear reducers, consistent with one or more exemplary embodiments of the present disclosure. As evident in FIG. 8A, an exemplary pericyclic gear reducer may cover most of the ratio ranges of PGT, CSR and HD and hence it may be utilized instead of those in most applications. There is a discontinuity in ratio range of an exemplary pericyclic gear reducer and an exemplary PGT in the vicinity of 2 since the fraction $N_P/N_S$ and $N_{Ring}/N_{Sun}$ in related ratio formula (equations 11 and 23) approaches to unity. It would be impossible since the internal and external gears in both PGT and an exemplary pericyclic gear reducer must encounter trimming and trochoid (or tip) interferences. The ratio ranges of exemplary planetary gear transmission and exemplary pericyclic gear reducer have two portions. The left-hand side portion is related to alternative assemblies of exemplary planetary gear transmission and exemplary pericyclic gear reducer (coaxial direct assembly for pericyclic gear reducer).

In an exemplary embodiment, an exemplary pericyclic gear reducer may inherently be capable to transmit high torques, similar to CSR and HD, due to the presence of a pair of internal-external gears in its structures. However, an exemplary pericyclic gear reducer may include big and coarse gear teeth in a wide range of reduction ratios that may guarantee the high torque capacity of an exemplary pericyclic gear reducer. While in SCR and HD, the gear teeth size is proportionally decreased with the increment of reduction ratio.

Internal to external gear meshing makes remarkably high resistance to contact stress between gears, since the contact takes place between a concave surface and a convex surface. In case of SCR and HD, the analysis of contact stress is somehow complicated because their gears' profile is not involute. However, in case of a PGT and an exemplary pericyclic gear reducer, which may have involute teeth profiles, the contact stress may be analyzed. The force capacity between two meshing involute gears is proportional to geometry factor, I, where $I=u/(u\pm1)$. In the geometry factor, u is the teeth number fraction of two meshing gears, which is defined as the ratio of the teeth number of the larger gear to that of smaller one. The + and − signs account for external-external and external-internal gear meshing, respectively. Since $u \geq 1$, the geometry factor, I for external-internal gear meshing would be much larger than the geometry factor for external-external gear meshing and consequently the force capacity of external-internal gear meshing will be much larger than the force capacity of external-external gear meshing regarding Hertzian contact stress (or pitting failure). An exemplary PGT may include both external-external and external-internal gear meshing between sun-planet and planet-ring gears, respectively. Hence the limiting factor in an exemplary PGT for load capacity of meshing gears would be related to geometry factor of sun-planet meshing which is significantly lesser than the geometry factor of planet-ring meshing. This becomes more severe in big reduction ratios of PGTs since their input sun gear becomes too small and consequently the geometry factor, "I" decreases. However, an exemplary pericyclic gear reducer may include only an external-internal gear pair and consequently the geometry factor, I for an exemplary pericyclic gear reducer may be much larger than the critical geometry factor of an exemplary PGT. Therefore, the corresponding load capacity of meshing gears in an exemplary pericyclic gear reducer may also be much larger than the load capacity of an exemplary PGT, considering Hertzian contact stress or pitting failure. It can be shown that an exemplary pericyclic gear reducer may have a geometry factor in a range of 2 to 5, while an exemplary PGT may have a geometry factor in a range of 0.5 to 0.8. It means that a gear meshing with same teeth size in an exemplary pericyclic gear reducer may have a load capacity that is averagely four times larger than the load capacity of a gear meshing in an exemplary PGT and such load capacity between two meshing gears directly affects the torque capacity. Therefore, an exemplary single pair of sun-planet gears in an exemplary pericyclic gear reducer, such as middle planet ring gear 402 and output sun gear 404 of coaxial pericyclic gear reducer 400 may handle the torque transmission of multiple pairs of sun-planet gears in an exemplary PGT. Such capability may significantly reduce the overall number of parts and simplify the manufacturing process and decrease the production cost of an exemplary pericyclic gear reducer in comparison with an equivalent PGT.

Other than the geometry factor, teeth size is another important factor that may directly affect the torque capacity of two meshing gears. In a gearbox, when the input power is constant, as the reduction ratio increases the output torque is proportionally multiplied. Consequently, stronger gears are required for high reduction ratios in final stages of a gear transmission. However, all the mentioned gear reducers, WG, PGT, CSR, HD and an exemplary pericyclic gear reducer may have an adverse behavior, meaning that when the ratio of the gearbox increases and its radial size is kept constant, the teeth size has to become smaller. One benefit of an exemplary pericyclic gear reducer may be that an exemplary pericyclic gear reducer may be less sensitive to such undesirable effect. It may be shown that the exemplary pericyclic reducer, such as the coaxial pericyclic gear reducer 400 may maintain its big teeth sizes in ratio ranges 1:3 down to 1:50.

Specifically, in an exemplary pericyclic gear reducer, such as the coaxial pericyclic gear reducer 400 within the effective reduction ratio range of 2.5:1 up to 150:1, an exemplary middle planet ring gear to an exemplary output sun gear size ratio ($N_P/N_S$) may vary between ⅔ and ½. Most ratios within this range may be considered as golden ratios, since both extremities of this range are far away from interference margins. In addition, $N_S/N_P > ½$ may cause a significant increase in the geometry factor, which consequently increases the teeth strength. In other words, an exemplary pericyclic gear reducer may have a much wider range of effective reduction ratios and a much higher torque capacity in that range of reduction ratio, in comparison with equivalent exemplary planetary gear reducer.

Figure 8B:
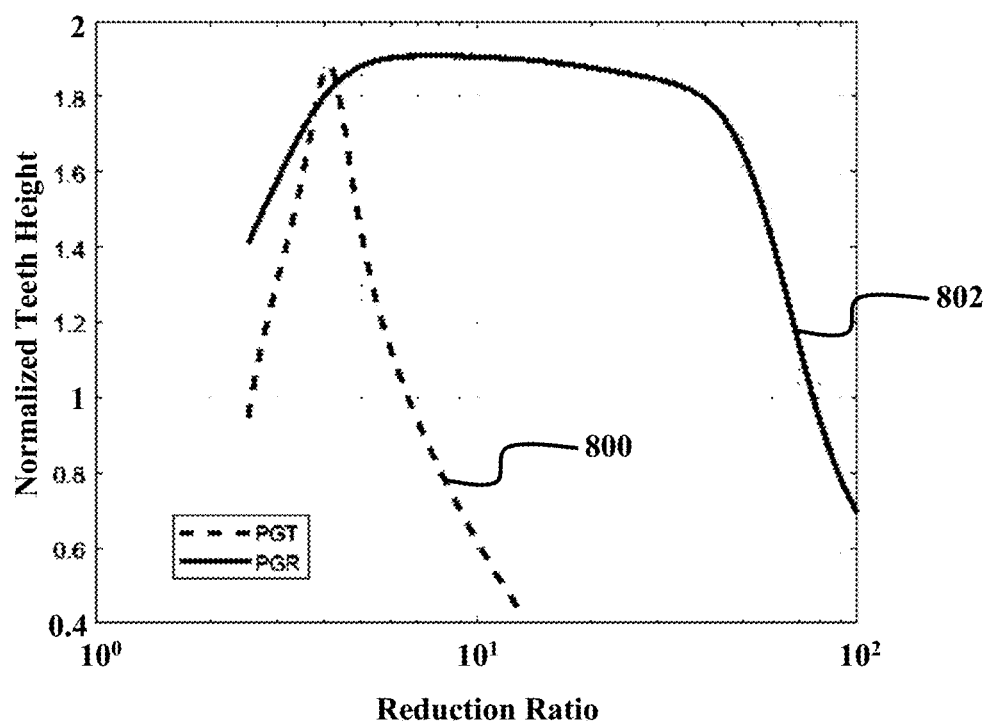
FIG. 8B illustrates a graph of maximum normalized height of teeth in a single-stage PGT and a graph of maximum normalized height of teeth in an equivalent pericyclic gear reducer, consistent with one or more exemplary embodiments of the present disclosure.

FIG. 8B illustrates a graph 800 of maximum normalized height of teeth in a single-stage PGT and a graph 802 of maximum normalized height of teeth in a coaxial pericyclic gear reducer, consistent with one or more exemplary embodiments of the present disclosure. In an exemplary embodiment, graph 802 is obtained for a pericyclic gear reducer that may be structurally similar to pericyclic gear reducer 400 and graph 800 is obtained for a single-stage PGT that may have the same radial size with the pericyclic gear reducer. In an exemplary embodiment, both the single-stage PGT and the pericyclic gear reducer may include 20° pressure angle spur gears. In an exemplary embodiment, graphs 800 and 802 may be continuous enveloping curves which pass from the points representing maximum possible teeth height which is equivalent to minimum number of teeth. As evident from graph 800, the gear teeth of the PGT becomes smaller and smaller beyond the ratio 5:1. As evident from graph 802, the pericyclic gear reducer holds its teeth coarseness in a wide range of ratio range i.e., from 3:1 to 50:1, which implies that the gear teeth of pericyclic gear reducer keeps its high stiffness against bending loads in that wide range and hence it may be of high torque capacity within that range. Fortunately, the above-mentioned ratio range (i.e., 3:1 to 50:1) is a golden range since it matches with most of industrial applications. On the other hand, the torque capacity of the PGT decreases intensively at reduction ratios more than 6:1 due to having very small and tiny gear teeth.

Figure 8C:
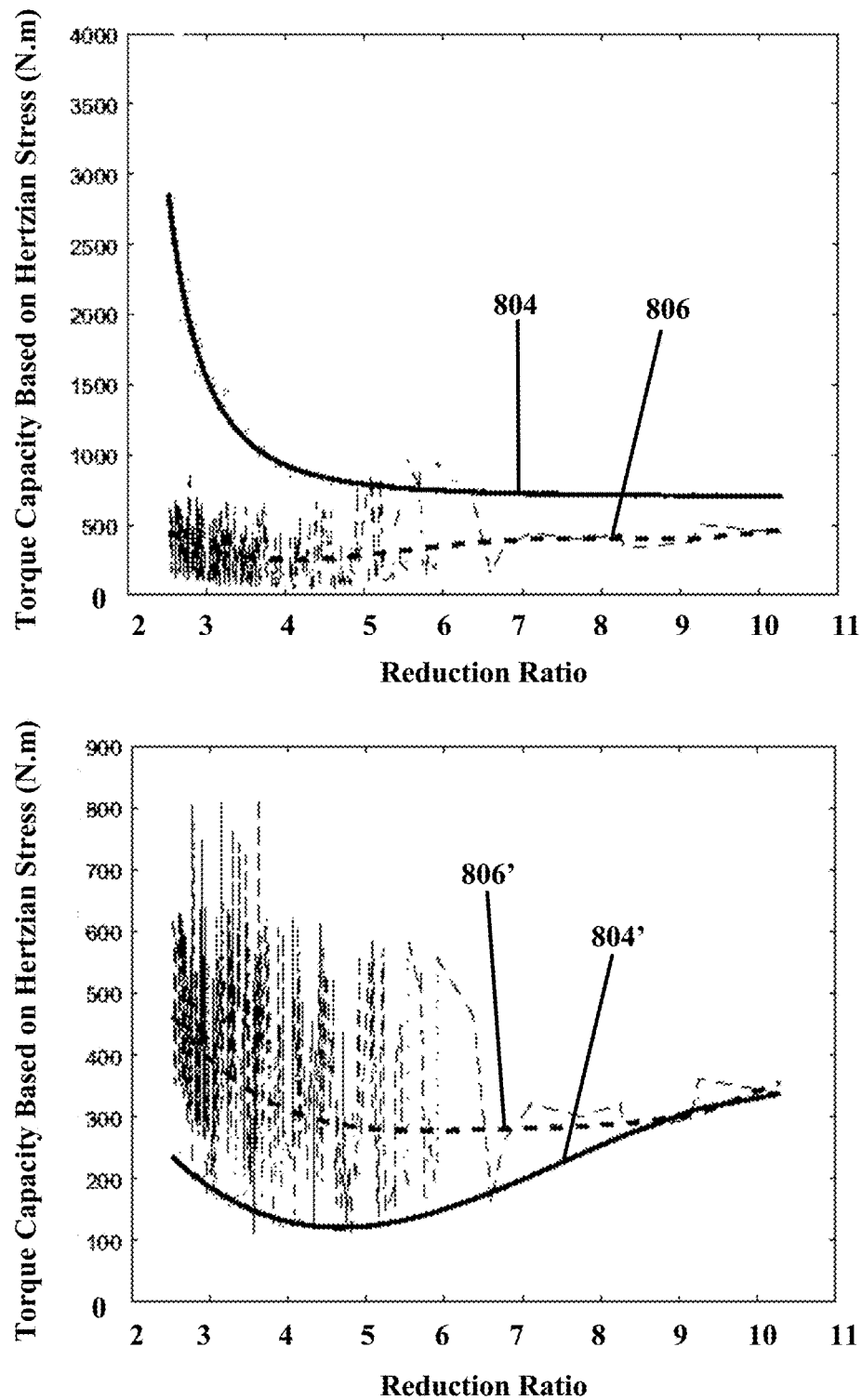
FIG. 8C illustrates a graph of torque capacity of a pericyclic gear reducer and a graph of an equivalent PGT, consistent with one or more exemplary embodiments of the present disclosure.

FIG. 8C illustrates a graph (804, 804') of torque capacity of a pericyclic gear reducer and a graph (806, 806') of an equivalent PGT, consistent with one or more exemplary embodiments of the present disclosure. In an exemplary embodiment, the PGT is assumed to have maximum number of planets to have its maximum torque capacity. The torque capacity of gears is obtained from AGMA procedure which is based on two criteria: teeth bending resistance criterion (designated by 804' and 806') and teeth pitting resistance criterion (designated by 804 and 806). The comparison is performed in reduction ratio range 2.5 up to 10. It is obvious that the torque capacity of pericyclic gear reducer is absolutely higher than its counterpart PGT in regards of pitting resistance (or Hertzian stress) criterion. But in regards of teeth bending criterion, the pericyclic gear reducer is a little weaker than its counterpart PGT in torque transmission in reduction ratios between 2.5 and 9. This comparative weakness of the pericyclic gear reducer is due to lack of multiple planets instead of single and also its shorter arm of output gear. Advantageously, increasing the bending resistance of gear teeth is much easier than increasing the pitting resistance of those. Hence the pericyclic gear reduced will fit in with high torque applications if some modifications is made on its teeth to heighten their bending resistance. In reduction ratios over 10:1 the pericyclic gear reducer, dominantly has higher torque capacity than its counterpart PGT.

In an exemplary embodiment, an exemplary pericyclic gear reducer, such as pericyclic gear reducer 100 or coaxial pericyclic gear reducer 400 may be configured as a multistage pericyclic reducer. An exemplary multistage pericyclic reducer may be a combination of two or more single stage pericyclic reducers such as pericyclic gear reducer 100 or coaxial pericyclic gear reducer 400. For example, an exemplary multistage pericyclic reducer may be a combination of at least one of pericyclic gear reducer 100 and coaxial pericyclic gear reducer 400 with another gear reducer that may be structured similar to pericyclic gear reducer 100.

Figure 9:
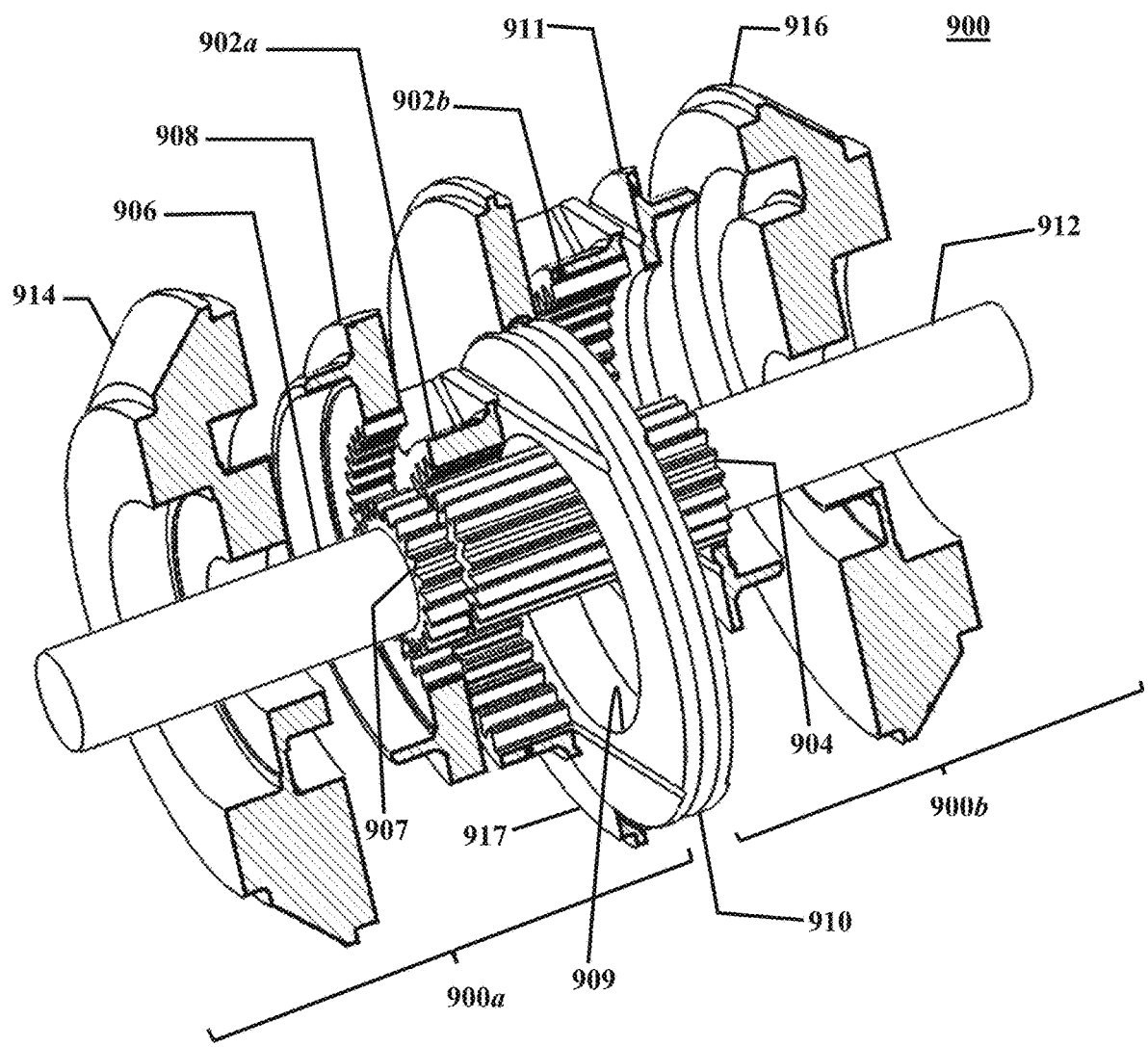
FIG. 9 illustrates a two-stage pericyclic gear reducer, consistent with one or more exemplary embodiments of the present disclosure.

FIG. 9 illustrates a two-stage pericyclic gear reducer 900, consistent with one or more exemplary embodiments of the present disclosure. In an exemplary embodiment, two-stage pericyclic gear reducer 900 may include a first stage 900a and a second stage 900b. In an exemplary embodiment, first stage 900a may be an exemplary coaxial pericyclic gear reducer structurally similar to coaxial pericyclic gear reducer 400. In an exemplary embodiment, second stage 900b may be an exemplary pericyclic gear reducer structurally similar to pericyclic gear reducer 100.

In an exemplary embodiment, first stage 900a may include an input shaft 906 that may be coupled to a driver ring gear 908 via an input external-teeth gear 907. In an exemplary embodiment, driver ring gear 908 may be similar to driver ring gear 408 and may be structured as an internal gear, in which input external-teeth gear 907 may be disposed. In an exemplary embodiment, input external teeth gear 907 may be similar to input external-teeth gear 407 and may be coupled to and mesh with driver ring gear 908. In an exemplary embodiment, first stage 900a may further include a first middle planet ring gear 902a that may be coupled to driver ring gear 908 via a prismatic joint. In an exemplary embodiment, a coupler wheel 910 of first stage 900a may be a driven wheel similar to driven wheel 410, since an exemplary driven wheel of first stage 900a may further function as a coupling member utilized for coupling first stage 900a and second stage 900b, as will be discussed.

In an exemplary embodiment, coupler wheel 910 may be coupled to an opposing side of first middle planet ring gear 902a with respect to driver ring gear 908, such that first middle planet ring gear 902a may be disposed longitudinally between coupler wheel 910 and driver ring gear 908. In an exemplary embodiment, driver ring gear 908 and coupler wheel 910 may be mounted eccentric with an offset between a rotational axis of driver ring gear 908 and a rotational axis of coupler wheel 910 similar to what was described in connection with driver ring gear 408 and driven wheel 410. In an exemplary embodiment, first stage 900a may further include an output sun gear 904 similar to output sun gear 404. In an exemplary embodiment, output sun gear 904 may be an external-teeth gear that may mesh with first middle planet ring gear 902a.

In an exemplary embodiment, second stage 900b may include a second middle planet ring gear 902b that may be coupled between coupler wheel 910 and driven wheel 911. In an exemplary embodiment, second middle planet ring gear 902b may be similar to first middle planet ring gear 901a regarding teeth number and teeth moduli. In an exemplary embodiment, coupler wheel 910 may be configured to function as a driver ring gear similar to driver ring gear 108 that may be coupled to second middle planet ring gear 902b with a prismatic joint. Specifically, in an exemplary embodiment, coupler wheel 910 may include at least one of a protuberance and slot of a prismatic joint on one side and at least one of a protuberance and a slot of another prismatic joint on the other opposing side. In an exemplary embodiment, these two protuberances and slots may be perpendicular to each other for purpose of balancing which will be discussed. In an exemplary embodiment, coupler wheel 910 may be rotatably coupled to intermediate wall 917. In an exemplary embodiment, intermediate wall 917 may be parallel and concentric with input-wall 914 and output-wall 916. In an exemplary embodiment, three walls (914, 916 and 917) may be fixed and secured with respect to each other by a gearbox shell (which is not illustrated in FIG. 9 for simplicity). In an exemplary embodiment, the aforementioned gearbox shell may house multi-stage pericyclic gear reducer 900. Such configuration of protuberances and slots on either side of coupler wheel 910 may allow for connecting coupler wheel 910 with first middle planet ring gear 902a from one side and with second middle planet ring gear 902b from the other opposing side.

In an exemplary embodiment, output sun gear 904 may be extended along a central axis of multistage pericyclic gear reducer 900 through a central hole 909 of coupler wheel 910 into second stage 900b. In an exemplary embodiment, output sun gear 904 may not contact with internal surface of central hole 909. In other words, output sun gear 904 may be coupled to and meshed with both first middle planet ring gear 902a and second middle planet ring gear 902b and may be configured to transfer the rotational movement of first middle ring gear 902a and second middle ring gear 902b to a central output shaft 912. Hence, first and second middle planet wheels (902a and 902b) may have same number of teeth because first and second middle planet wheels (902a and 902b) may be meshed with a common output sun gear 904.

In an exemplary embodiment, first middle planet ring gear 902a and second middle planet ring gear 902b may be mounted with an offset between first middle planet ring gear 902a and second middle planet ring gear 902b, such that, output sun gear 904 may engage a top portion of first middle planet ring gear 902a and an opposing bottom portion of second middle planet ring gear 902b, which is why coupler wheel 910 should have a pair of perpendicular prismatic joints on both sides of coupler wheel 910. In an exemplary embodiment, such configuration of output sun gear 904, first middle planet ring gear 902a, and second middle planet ring gear 902b may eliminate the need for static balancing of double-stage pericyclic gear reducer 900, since two middle wheels 902a and 902b negate their centrifugal forces.

In an exemplary embodiment, other augmentations of single stage pericyclic gear reducers, such as pericyclic gear reducer 100 to the right-hand side of double-stage pericyclic gear reducer 900 is also possible to attain a multi-stage pericyclic gear reducer. An exemplary multistage pericyclic gear reducer, such as multistage pericyclic gear reducer 900 may allow for further increasing the torque and power capacity in comparison with single stage pericyclic gear reducers. As mentioned before, an exemplary multistage pericyclic gear reducer, such as multistage pericyclic gear reducer 900 may further eliminate the need for balancing, since a multistage pericyclic gear reducer, such as multistage pericyclic gear reducer 900 may inherently be balanced.

In an exemplary embodiment, since such a multistage pericyclic gear reducer will be characteristically balanced, there is no need to keep $N_{DR}/N_{IE}$ in equation 11 equal to 2:1. This will offer more varieties in determining both the teeth size and ratio of the driver annular gear pair (407 and 408). Not keeping $N_{DR}/N_{IE}$ in equation 11 equal to 2:1 in an exemplary multi-stage pericyclic gear reducer may also extend the lower limit of reduction ratio of the pericyclic gear reducer from 2.2:1 down to 2:1.

Figure 10A:
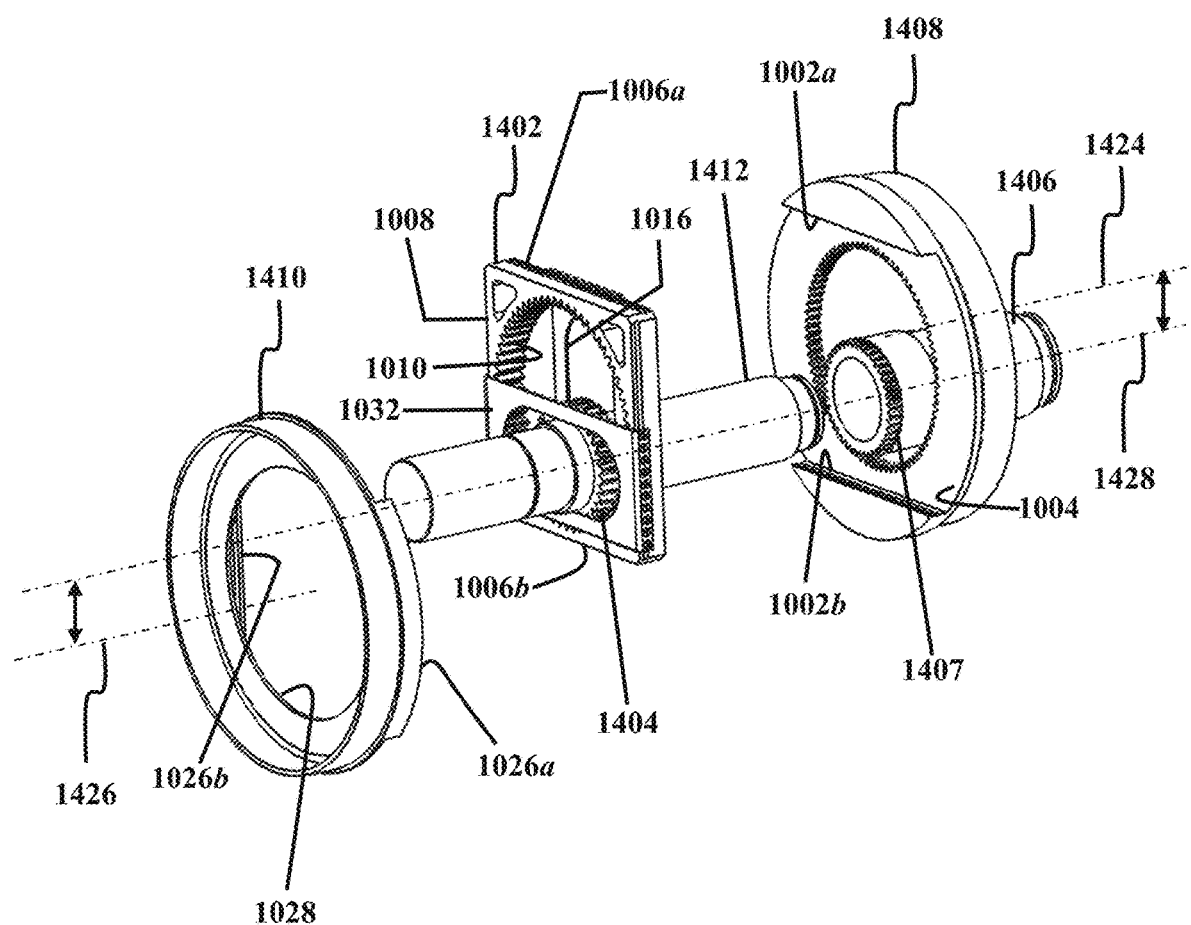
FIG. 10A illustrates an exploded view of a coaxial pericyclic gear reducer, consistent with one or more exemplary embodiments of the present disclosure.

FIG. 10A illustrates an exploded view of a coaxial pericyclic gear reducer 1000, consistent with one or more exemplary embodiments of the present disclosure. In an exemplary embodiment, coaxial pericyclic gear reducer 1000 may be similar to coaxial pericyclic gear reducer 400 and may include an input shaft 1406 similar to input shaft 406 that may be rotatable about a central axis 1428, a middle planet ring gear 1402 that may include an annular internal-teeth gear 1010 similar to middle planet ring gear 402, an output sun gear 1404 similar to output sun gear 404 that may be an external-teeth gear positioned inside and meshed with middle planet ring gear 1402.

In an exemplary embodiment, coaxial pericyclic gear reducer 1000 may further include a driver ring gear 1408 similar to driver ring gear 408 that may be configured to be coupled to input shaft 1406 via an input external-teeth gear 1407 similar to input external-teeth gear 407. In an exemplary embodiment, input shaft 1406 may be coupled to or integrally formed with input external-teeth gear 1407. In an exemplary embodiment, input external-teeth gear 1407 may be disposed within driver ring gear 1408 and may mesh with driver ring gear 1408. In an exemplary embodiment, such coupling of input external-teeth gear 1407 and driver ring gear 1408 may allow for converting the rotational movement of input shaft 1406 about central axis 1428 to a rotational movement of driver ring gear 1408 about a first rotational axis 1424. In an exemplary embodiment, driver ring gear 1408 may be coupled to middle planet ring gear 1402 from a first side of middle planet ring gear 1402 utilizing a first prismatic joint. In an exemplary embodiment, driver ring gear 1408 may be configured to drive a rotational movement of middle planet ring gear 1402.

In an exemplary embodiment, coaxial pericyclic gear reducer 1000 may further include a driven wheel 1410 structurally similar to driven wheel 410 that may be a flange coupled to middle planet ring gear 1402 from a second side of middle planet ring gear 1402 utilizing a second prismatic joint. In an exemplary embodiment, driven wheel 1410 may be rotatable with middle planet ring gear 1402 about a second rotational axis 1426.

In an exemplary embodiment, coaxial pericyclic gear reducer 1000 may further include an output shaft 412 similar to output shaft 412 that may be coupled or integrally formed with output sun gear 1404. In an exemplary embodiment, output shaft 1412 may be rotatable with output sun gear 1404 about central axis 1428 of coaxial pericyclic gear reducer 1000.

In an exemplary embodiment, the first prismatic joint may include a pair of parallel grooves (1002a, 1002b) attached to or integrally formed on driver ring gear 1408. In an exemplary embodiment, each groove of pair of parallel grooves (1002a, 1002b) may be extended along a longitudinal plane that may be perpendicular to a front face 1004 of driver ring gear 1408. In an exemplary embodiment, front face 1004 may include an annular surface of driver ring gear 1408 perpendicular to central axis 1428 and facing middle planet ring gear 1402. As used herein, a longitudinal plane of an object is a plane associated with the longest dimension of that object. In an exemplary embodiment, pair of parallel grooves (1002a, 1002b) may face each other and towards a center of driver ring gear 1408. In other words, pair of parallel grooves (1002a, 1002b) may be opposite each other and disposed on driver ring gear 1408 with respect to central line 1428. In an exemplary embodiment, each groove of pair of parallel grooves (1002a, 1002b) may be a straight groove that may either have an arc section or a rectangular cross-section to allow balls or rollers to moveably fit inside.

Figure 10B:
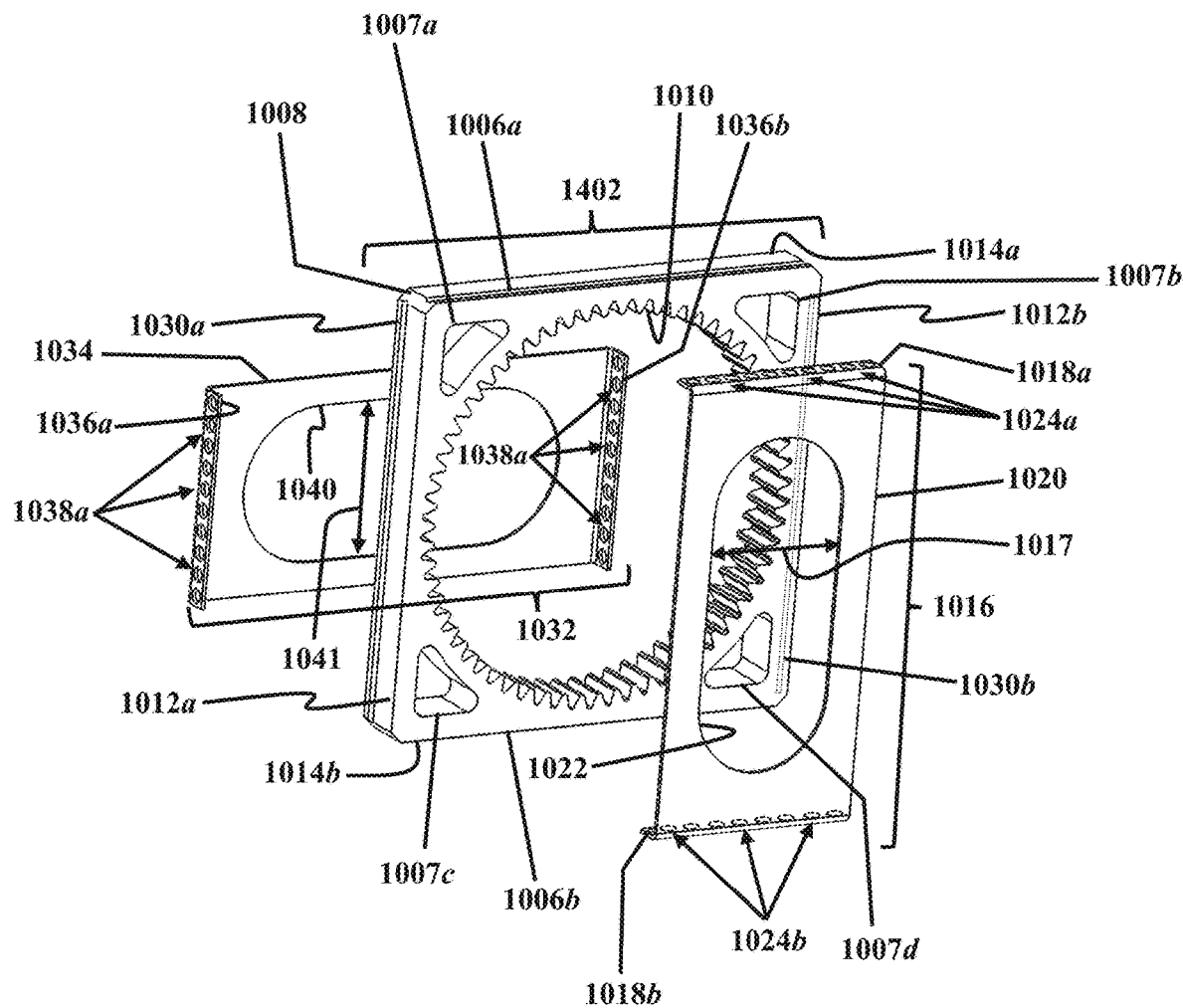
FIG. 10B illustrates an exploded view of a middle planet ring gear and cages, consistent with one or more exemplary embodiments of the present disclosure.

FIG. 10B illustrates an exploded view of middle planet ring gear 1402 and cages (1016, 1032), consistent with one or more exemplary embodiments of the present disclosure. In an exemplary embodiment, the first prismatic joint may further include a corresponding first pair of parallel grooves (1006a, 1006b) on middle planet ring gear 1402. In an exemplary embodiment, middle planet ring gear 1402 may be configured to have a rectangular body 1008, where a normal axis of rectangular body 1008 may be parallel with central axis 1428. In an exemplary embodiment, middle planet ring gear 1402 may further include a cylindrical internal-teeth gear 1010 similar to middle planet ring gear 402 cut in the middle of rectangular body 1008 of middle planet ring gear 1402.

In an exemplary embodiment, such rectangular shape of middle planet ring gear 1402 may allow for lightening the weight of middle planet ring gear 1402, which may result in less centrifugal force exerted on middle planet ring gear 1402 in motion. In an exemplary embodiment, rectangular body 1008 may further include cut out portions or cavities (1007a-1007d) that may allow for further decreasing the weight of middle planet ring gear 1402.

In an exemplary embodiment, rectangular body 1008 may include a pair of parallel lateral sides (1012a, 1012b) and a pair of parallel top and bottom sides (1014a, 1014b), where parallel lateral sides (1012a, 1012b) are perpendicular to parallel top and bottom sides (1014a, 1014b). In an exemplary embodiment, first pair of parallel grooves (1006a, 1006b) may be formed on top lateral side 1014a and bottom lateral side 1014b of middle planet ring gear 1402 and each groove of first pair of parallel grooves (1006a, 1006b) may correspond to each groove of pair of parallel grooves (1002a, 1002b). For example, groove 1006a may be formed on top lateral side 1014a of rectangular body 1008 and may correspond to groove 1002a, meaning that groove 1006a may face and extend parallel with groove 1002a. In an exemplary embodiment, a plurality of balls or rollers may be disposed and sandwiched between groove 1006a and groove 1002a, such that the plurality of balls or rollers may be moveably contained between groove 1006a and groove 1002a. Similarly, groove 1006b may correspond to groove 1002b, meaning that groove 1006b may face and extend parallel with groove 1002b. In an exemplary embodiment, a plurality of balls or rollers may be disposed and sandwiched between groove 1006b and groove 1002b, such that the plurality of balls or rollers may be moveably contained between groove 1006b and groove 1002b. In other words, the first prismatic joint between middle planet ring gear 1402 and driver ring gear 1408 may include a rolling-contact prismatic joint made up of pair of parallel grooves (1002a, 1002b) on driver ring gear 1408, corresponding first pair of parallel grooves (1006a, 1006b) on middle planet ring gear 1402, and a plurality of balls or rollers disposed between each corresponding pair of grooves.

In an exemplary embodiment, as middle planet ring gear 1402 moves with respect to driver ring gear 1408, balls or rollers disposed between groove 1002a and groove 1006a, and balls or rollers disposed between groove 1002b and groove 1006b may facilitate a sliding movement of middle planet ring gear 1402 relative to driver ring gear 1408 with less friction, lower backlash, and higher speed compared to what a tongue-and-slit prismatic joint could have allowed as discussed in connection with FIG. 4.

In an exemplary embodiment, the first prismatic joint may further include a first cage 1016 that may include a first plate 1020 extended perpendicular to central axis 1428 and parallel with rectangular body 1008. In an exemplary embodiment, first cage 1016 may be disposed within a small gap between middle planet ring gear 1402 and driver ring gear 1408. In an exemplary embodiment, such disposal of first cage 1016 within the small gap may allow for first cage 1016 to be slidable within the gap relative to middle planet ring gear 1402 and driver ring gear 1408 without friction. In an exemplary embodiment, first cage 1016 may further include a pair of extended lips (1018a, 1018b), where each extended lip of pair of extended lips (1018a, 1018b) may extend from a respective edge of first plate 1020 perpendicular to a plane of first plate 1020 and parallel with central axis 1428. In an exemplary embodiment, extended lip 1018a may be positioned between grooves 1002a and 1006a, and extended lip 1018b may be positioned between grooves 1002b and 1006b.

In an exemplary embodiment, each extended lip of pair of extended lips (1018a, 1018b) may include a plurality of holes that may be configured to encompass the plurality of balls or rollers of the first prismatic joint. For example, extended lip 1018a may include holes 1024a that may be configured to encompass the plurality of balls or rollers disposed between grooves 1002a and 1006a, and extended lip 1018b may include holes 1024b that may be configured to encompass the plurality of balls or rollers disposed between grooves 1002b and 1006b. In an exemplary embodiment, each hole of holes 1024a and 1024b may have a little larger diameter compared to each ball or roller of the plurality of balls or rollers disposed between the corresponding grooves (1002a, 1002b, 1006a, 1006b) to allow the plurality of balls or rollers to freely role inside holes 1024a and 1024b.

In an exemplary embodiment, first cage 1016 may further include a first oblong oval hole 1022 that may extend on first plate 1020 perpendicular to central axis 1428 between pair of extended lips (1018a, 1018b) and parallel with the second pair of parallel grooves (1030a, 1030b). In an exemplary embodiment, first oblong oval hole 1022 may be configured to allow for output shaft 1412 to pass through first cage 1016. In an exemplary embodiment, first oblong oval hole 1022 may have a width 1017 equal to the diameter of output shaft 1412, such that lateral edges of first oblong oval hole 1022 may be tangential to an outer surface of output shaft 1412. Such configuration of first oblong oval hole 1022 may prevent any lateral movements of first cage 1016 relative to output shaft 1412.

In an exemplary embodiment, the second prismatic joint may include a pair of parallel grooves (1026a, 1026b) attached to or integrally formed on of driven wheel 1410. In an exemplary embodiment, each groove of pair of parallel grooves (1026a, 1026b) may be extended along a longitudinal plane that may be perpendicular to a front face 1028 of driven wheel 1410. In an exemplary embodiment, front face 1028 may include an annular surface of driven wheel 1410 perpendicular to central axis 1428 and facing middle planet ring gear 1402. In an exemplary embodiment, pair of parallel grooves (1026a, 1026b) may face each other and towards a center of driven wheel 1410. In an exemplary embodiment, each groove of pair of parallel grooves (1026a, 1026b) may be a straight groove that may either have an arc section or a rectangular cross-section to allow balls or rollers to moveably fit inside.

In an exemplary embodiment, the second prismatic joint may further include a corresponding second pair of parallel grooves (1030a, 1030b) on respective pair of parallel lateral sides (1012a, 1012b) of middle planet ring gear 1402. In an exemplary embodiment, each groove of second pair of parallel grooves (1030a, 1030b) may correspond to each groove of pair of parallel grooves (1026a, 1026b). For example, groove 1030a may be formed on first lateral side 1012a of rectangular body 1008 and may correspond to groove 1026a, meaning that groove 1030a may face and extend parallel with groove 1026a. In an exemplary embodiment, a plurality of balls or rollers may be disposed and sandwiched between groove 1030a and groove 1026a, such that the plurality of balls or rollers may be moveably contained between groove 1030a and groove 1026a. Similarly, groove 1030b may correspond to groove 1026b, meaning that groove 1030b may face and extend parallel with groove 1026b. In an exemplary embodiment, a plurality of balls or rollers may be disposed and sandwiched between groove 1030b and groove 1026b, such that the plurality of balls or rollers may be moveably contained between groove 1030b and groove 1026b. In other words, the second prismatic joint between middle planet ring gear 1402 and driven wheel 1410 may include a rolling-contact prismatic joint made up of pair of parallel grooves (1026a, 1026b) on driven wheel 1410, corresponding second pair of parallel grooves (1030a, 1030b) on middle planet ring gear 1402, and a plurality of balls or rollers disposed between each corresponding pair of grooves.

In an exemplary embodiment, as middle planet ring gear 1402 moves with respect to driven wheel 1410, balls or rollers disposed between groove 1026a and groove 1030a, and balls or rollers disposed between groove 1026b and groove 1030b may facilitate a sliding movement of middle planet ring gear 1402 relative to driven wheel 1410 with less friction and lower backlash compared to what a tongue-and-slit prismatic joint could have allowed as discussed in connection with FIG. 4.

In an exemplary embodiment, the second prismatic joint may further include a second cage 1032 that may include a second plate 1034 extended perpendicular to central axis 1428 and parallel with rectangular body 1008 of middle planet ring gear 1402. In an exemplary embodiment, second cage 1032 may be disposed within a small gap between middle planet ring gear 1402 and driven wheel 1410. In an exemplary embodiment, such disposal of second cage 1032 within the small gap may allow for second cage 1032 to be slidable within the gap relative to middle planet ring gear 1402 and driven wheel 1410 without friction. In an exemplary embodiment, second cage 1032 may further include a pair of extended lips (1036a, 1036b), where each extended lip of pair of extended lips (1036a, 1036b) may extend from respective edges of second plate 1034 perpendicular to a plane of second plate 1034 and parallel with central axis 1428. In an exemplary embodiment, extended lip 1036a may be positioned between grooves 1026a and 1030a, and extended lip 1036b may be positioned between grooves 1026b and 1030b.

In an exemplary embodiment, each extended lip of pair of extended lips (1036a, 1036b) may include a plurality of holes that may be configured to encompass the plurality of balls or rollers of the second prismatic joint. For example, extended lip 1036a may include holes 1038a that may be configured to encompass the plurality of balls or rollers disposed between grooves 1026a and 1030a, and extended lip 1036b may include holes 1038b that may be configured to encompass the plurality of balls or rollers disposed between grooves 1026b and 1030b.

In an exemplary embodiment, second cage 1032 may further include a second oblong oval hole 1040 that may extend on second plate 1034 perpendicular to central axis 1428 between pair of extended lips (1036a, 1036b) and parallel with the first pair of grooves (1006a and 1006b). In an exemplary embodiment, second oblong oval hole 1040 may be configured to allow for output shaft 1412 to pass through second cage 1032. In an exemplary embodiment, second oblong oval hole 1040 may have a width 1041 equal to the diameter of output shaft 1412, such that lateral edges of second oblong oval hole 1040 may be tangential to an outer surface of output shaft 1412. Such configuration of second oblong oval hole 1040 may prevent any lateral movements of second cage 1032 relative to output shaft 1412.

In an exemplary embodiment, the first prismatic joint and the second prismatic joint are perpendicular to each other. In other words, pair of parallel grooves (1002a, 1002b) may be perpendicular to pair of parallel grooves (1026a, 1026b) and first pair of parallel grooves (1006a, 1006b) may be perpendicular to second pair of parallel grooves (1030a, 1030b). Furthermore, the largest diameter of first oblong oval hole 1022 may be perpendicular to the largest diameter of second oblong oval hole 1040, while a plane of first oblong oval hole 1022 may be parallel with a plane of second oblong oval hole 1040.

In exemplary embodiments, utilization of such rolling-contact prismatic joints to couple driver ring gear 1408 and driven wheel 1410 to either side of middle planet ring gear 1402, where instead of protrusions that may slide within corresponding grooves, a combination of rollers/balls and grooves are utilized, may allow for making coaxial pericyclic gear reducer 1000 with less friction, lower backlash, and capable of operation at high speeds. However, in the embodiments illustrated in FIGS. 10A and 10B such utilization of grooves (1006a and 1006b) on the edges of middle planet ring gear 1402 may lead to a slight increase in the radial size of coaxial pericyclic gear reducer 1000, which may be addressed by forming the grooves on the faces of middle planet ring gear 1402, which will be discussed in the following paragraphs.

Figure 11A:
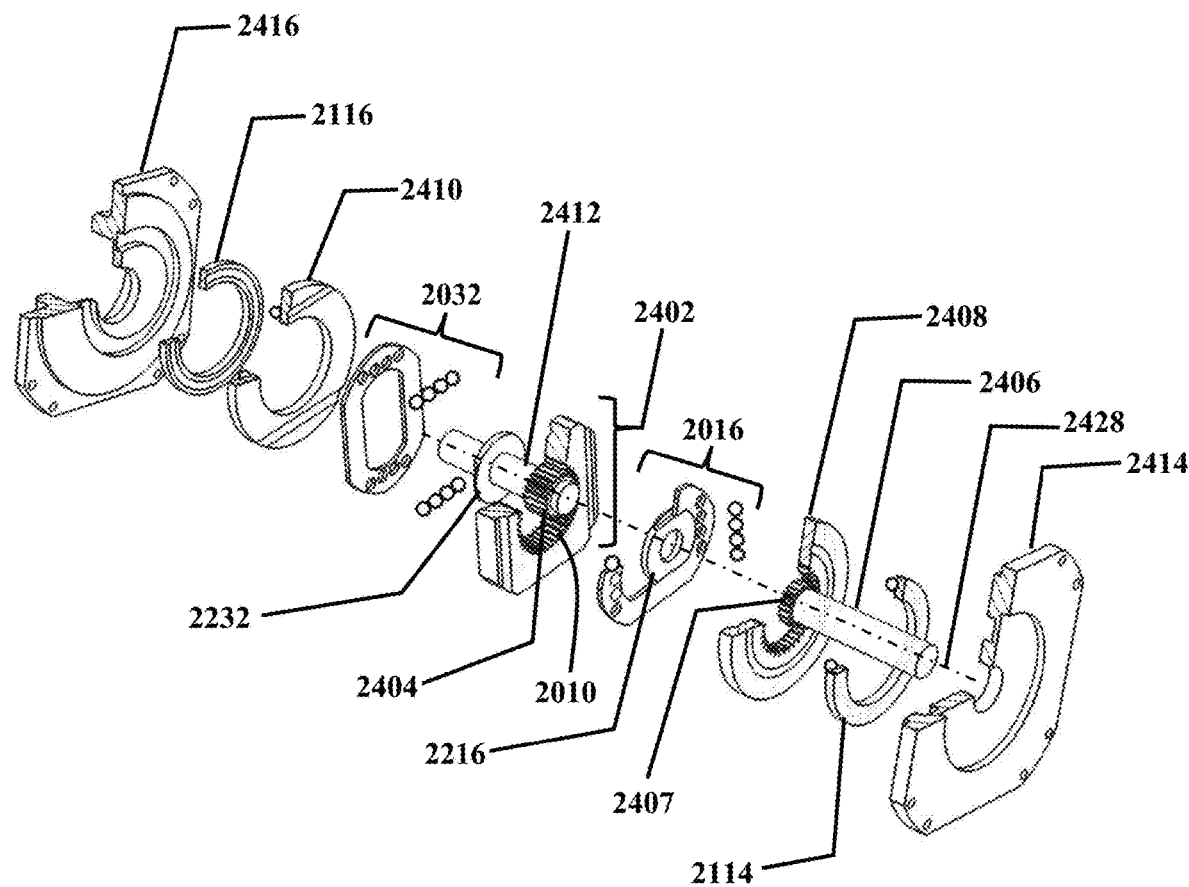
FIG. 11A illustrates an exploded view of a coaxial pericyclic gear reducer, consistent with one or more exemplary embodiments of the present disclosure.
Figure 11B:
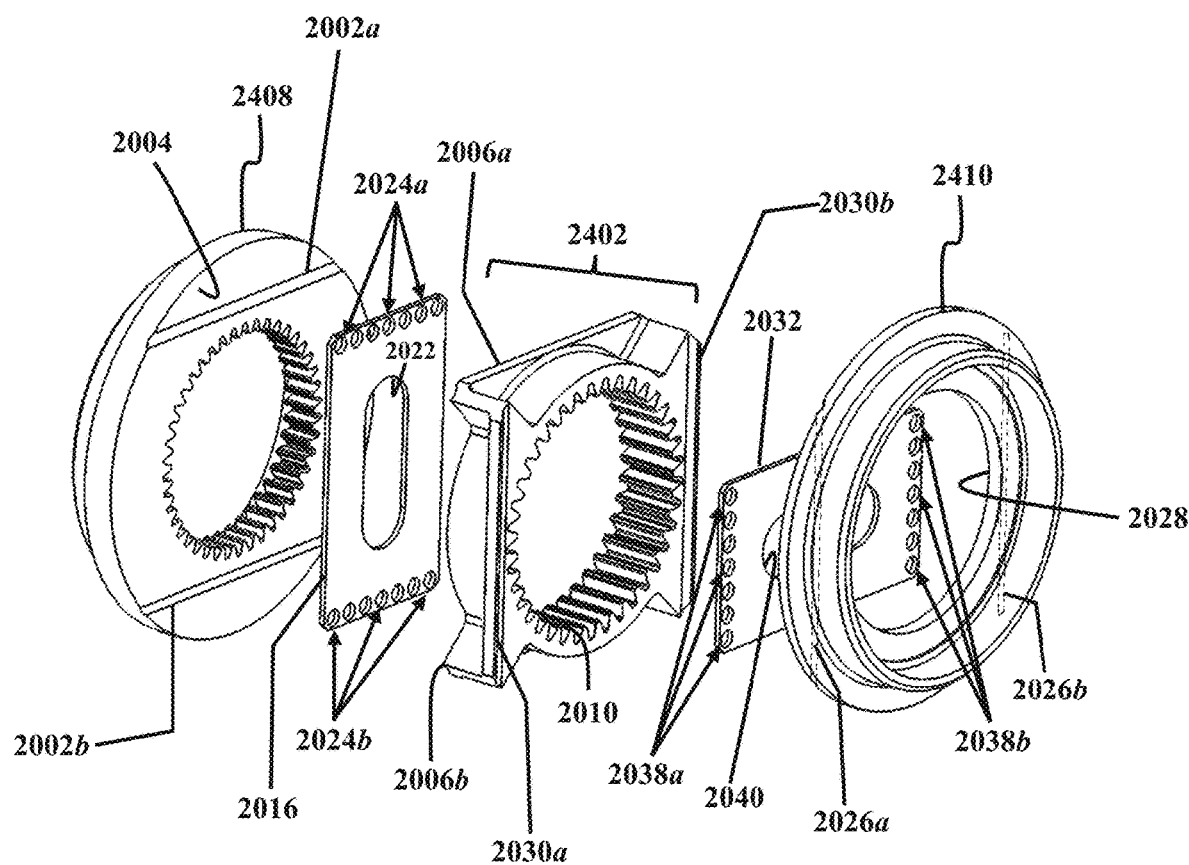
FIG. 11B illustrates an exploded view of a middle planet ring gear mounted between a driver ring gear and a driven wheel, consistent with one or more exemplary embodiments of the present disclosure.

FIG. 11A illustrates an exploded view of a coaxial pericyclic gear reducer 2000, consistent with one or more exemplary embodiments of the present disclosure. FIG. 11B illustrates an exploded view of a middle planet ring gear 2402 mounted between a driver ring gear 2408 and a driven wheel 2410, consistent with one or more exemplary embodiments of the present disclosure. In an exemplary embodiment, coaxial pericyclic gear reducer 2000 may be similar to pericyclic gear reducer (1000 and 400). In an exemplary embodiment, coaxial pericyclic gear reducer 2000 may include an input shaft 2406 similar to input shaft 406 that may be coupled to or integrally formed with an input external-teeth gear 2407 similar to input external-teeth gear 407. In an exemplary embodiment, input external-teeth gear 2407 may mesh with an annular internal-teeth gear of a driver ring gear 2408 similar to driver ring gear 408. In an exemplary embodiment, coaxial pericyclic gear reducer 2000 may further include a middle planet ring gear 2402 similar to middle planet ring gear 402 that may include an annular internal-teeth gear that may mesh with an output sun gear 2404 similar to output sun gear 404. In an exemplary embodiment, output sun gear 404 may further be coupled to or integrally formed with an output shaft 2412 similar to output shaft 412. In an exemplary embodiment, coaxial pericyclic gear reducer 2000 may further include a driven wheel 2410 similar to driven wheel 410 that may be coupled to and rotatable with middle planet ring gear 2402.

In an exemplary embodiment, driver ring gear 2408 may be coupled to a first side wall 2414 of coaxial pericyclic gear reducer 2000 from one side utilizing a first thrust bearing 2114 and driver ring gear 2408 may further be coupled to middle planet ring gear 2402 form the other opposing side. In an exemplary embodiment, driven wheel 2410 may further be coupled to a second side wall 2416 of coaxial pericyclic gear reducer 2000 utilizing a second thrust bearing 2116. In an exemplary embodiment, such utilization of thrust bearings (2114 and 2116) instead of ordinary ball bearings may allow for a more radially compact design of coaxial pericyclic gear reducer 2000.

In an exemplary embodiment, driver ring gear 2408 may be coupled to a first side of middle planet ring gear 2402 utilizing a first prismatic joint and driven wheel 2410 may be coupled to an opposing second side of middle planet ring gear 2402 utilizing a second prismatic joint. In an exemplary embodiment, middle planet ring gear 2402 may include a central annular internal-teeth gear 2010 similar to annular internal-teeth gear 1010 of middle planet ring gear 1402.

In an exemplary embodiment, middle planet ring gear 2402 may further include a pair of parallel lateral grooves (2030a, 2030b) on the first face of middle planet wheel 2402, and a pair of upper and lower parallel grooves (2006a, 2006b) on the second face of the middle planet wheel 2402 opposite to the first face of the middle planet wheel 2402. In an exemplary embodiment, pair of parallel lateral grooves (2030a, 2030b) and pair of parallel upper and lower grooves (2006a, 2006b) may either be attached to planetary ring gear 2402 or may be integrally formed with internal-teeth gear 2010.

In an exemplary embodiment, driver ring gear 2408 may include a pair of parallel grooves (2002a, 2002b) that may be formed on a front annular surface 2004 of driver ring gear 2408. Each groove of pair of grooves (2002a, 2002b) may be aligned with a corresponding groove of pair of parallel upper and lower grooves (2006a, 2006b). In an exemplary embodiment, a first cage 2016 may be disposed between driver ring gear 2408 and middle planet ring gear 2402. In an exemplary embodiment, each pair of corresponding grooves, for example, grooves 2002a and 2006a may be configured to allow for a plurality of balls or rollers to be disposed between grooves 2002a and 2006a. Responsive to the plurality of balls or roller being disposed or sandwiched between grooves 2002a and 2006a, a gap may be formed between driver ring gear 2408 and middle planet ring gear 2402. In an exemplary embodiment, first cage 2016 may have a thickness less than the aforementioned gap between driver ring gear 2408 and middle planet ring gear 2402, which may allow for sandwiching first cage 2016 between driver ring gear 2408 and middle planet ring gear 2402. Such configuration of first cage 2016 may allow for first cage to freely slide between driver ring gear 2408 and middle planet ring gear 2402 and all the axial force may be exerted on the balls or rollers within grooves 2002a and 2006a and not on first cage 2016.

In an exemplary embodiment, first cage 2016 may include two parallel rows of holes (2024a, 2024b) in upper and lower portions of first cage 2016, where an upper row of holes 2024a may be aligned with groove 2002a and groove 2006a, and a lower row of holes 2024b may be aligned with groove 2002b and groove 2006b. In an exemplary embodiment, a plurality of balls or rollers may be disposed between groove 2002a and groove 2006a and encircled by upper row of holes 2024a, and another plurality of balls or rollers may be disposed between groove 2002b and groove 2006b and encircled by lower row of holes 2024b. In an exemplary embodiment, holes 2024a and 2024b may have a little larger diameter compared to the balls or rollers to allow the balls or rollers to freely role within corresponding holes 2024a and 2024b. In an exemplary embodiment, upper row of holes 2024a may be configured to retain and guide the plurality of balls or rollers between groove 2002a and groove 2006a, while lower row of holes 2024b may be configured to retain and guide the plurality of balls or rollers between groove 2002b and groove 2006b.

In an exemplary embodiment, first cage 2016 may further include a first oblong oval hole 2022 similar to first oblong oval hole 1022 of first cage 1016. In an exemplary embodiment, first oblong oval hole 2022 may be fitted with a first journal bearing 2216. In an exemplary embodiment, first journal bearing 2216 may include a central hole that may be rotatably coupled to output shaft 2412. In an exemplary embodiment, first journal bearing 2216 may be rotatable about a central axis 2428. In an exemplary embodiment, first journal bearing 2216 may further include two flat surfaces symmetrically disposed on lateral sides of the central hole of first journal bearing 2216. In an exemplary embodiment, inner edges of first oblong oval hole 2022 may contact respective flat surfaces of first journal bearing 2216 and may have prismatic sliding movements relative to first journal bearing 2216. Such configuration of first journal bearing 2216 may allow for output shaft 2412 to rotatably pass through first oblong oval hole 2022 without the outer surface of output shaft 2412 being in direct contact with the inner edges of first oblong oval hole 2022, which may prevent wearing of the inner edges of first oblong oval hole 2022.

In an exemplary embodiment, driven wheel 2410 may include a pair of parallel grooves (2026*a*, 2026*b*) formed on a front surface 2028 of driven wheel 2410. In an exemplary embodiment, each groove of parallel grooves (2026*a*, 2026*b*) may be aligned with a corresponding groove of pair of parallel lateral grooves (2030*a*, 2030*b*). In an exemplary embodiment, a second cage 2032 may be disposed between middle planet ring gear 2402 and driven wheel 2410. In an exemplary embodiment, each pair of corresponding grooves, for example, grooves 2026*a* and 2030*a* may be configured to allow for a plurality of balls or rollers to be disposed between grooves 2026*a* and 2030*a*. Responsive to the plurality of balls or roller being disposed or sandwiched between grooves 2026*a* and 2030*a*, a gap may be formed between front surface 2028 and middle planet ring gear 2402. In an exemplary embodiment, second cage 2032 may have a thickness less than the aforementioned gap between middle planet ring gear 2402 and driven wheel 2410, which may allow for sandwiching second cage 2032 between middle planet ring gear 2402 and driven wheel 2410. Such configuration of second cage 2032 may allow for second cage 2032 to freely slide between middle planet ring gear 2402 and driven wheel 2410 and all the axial force may be exerted on the balls or rollers within grooves 2026*a* and 2030*a* and not on second cage 2032.

In an exemplary embodiment, second cage 2032 may include a first series of lateral holes 2038*a* aligned with groove 2026*a* and groove 2030*a*, and a second series of lateral holes 2038*b* aligned with groove 2026*b* and groove 2030*b*. In an exemplary embodiment, a plurality of balls or rollers may be disposed between groove 2026*a* and groove 2030*a* and encircled by first series of lateral holes 2038*a*. In an exemplary embodiment, a plurality of balls or rollers may further be disposed between groove 2026*b* and groove 2030*b* and encircled by second series of lateral holes 2038*b*. In an exemplary embodiment, first series of lateral holes 2038*a* may be configured to retain and guide the plurality of balls or rollers between groove 2026*a* and groove 2030*a*, while second series of lateral holes 2038*b* may be configured to retain and guide the plurality of balls or rollers between groove 2026*b* and groove 2030*b*. In an exemplary embodiment, second cage 2032 may further include a second oblong oval hole 2040 similar to second oblong oval hole 1040 of second cage 1032. In an exemplary embodiment, second oblong oval hole 2040 may be fitted with a second journal bearing 2232. In an exemplary embodiment, second journal bearing 2232 may be configured to allow for output shaft 2412 to rotatably pass through second oblong oval hole 2040, while facilitating a relative sliding motion between second cage 2032 and output shaft 2412 along second oblong oval hole 2040. In an exemplary embodiment, second journal bearing 2232 may include a central hole that may be rotatably coupled to output shaft 2412. In an exemplary embodiment, second journal bearing 2232 may be rotatable about a central axis 2428. In an exemplary embodiment, second journal bearing 2232 may further include two flat surfaces symmetrically disposed on lateral sides of the central hole of second journal bearing 2232. In an exemplary embodiment, inner edges of second oblong oval hole 2040 may contact respective flat surfaces of second journal bearing 2232 and may have prismatic sliding movements relative to second journal bearing 2232. Such configuration of second journal bearing 2232 may allow for output shaft 2412 to rotatably pass through second oblong oval hole 2040 without the outer surface of output shaft 2412 being in direct contact with the inner edges of second oblong oval hole 2040, which may prevent wearing of the inner edges of second oblong oval hole 2040. In an exemplary embodiment, first oblong oval hole 2022 may be perpendicular to second oblong oval hole 2040.

In an exemplary embodiment, first journal bearing 2216 and second journal bearing 2232 may be made of brass to reduce the friction while journal bearings (2216, 2232) are rotating on steel output shaft 2412. Consequently, first journal bearing 2216 and second journal bearing 2232 may lean on output shaft 2412 and the cages 2016 and 2032 may lean on journal bearings 2216 and 2232. Hence the cages 2016 and 2032 may not be in direct contact with output shaft 2412 and may be worn to much less degree in comparison with two cages 1416 and 1432 due to their larger surface of contact with the journal bearings 2216 and 2232.

In an exemplary embodiment, pair of parallel upper and lower grooves (2006*a*, 2006*b*) may be perpendicular to pair of parallel lateral grooves (2030*a*, 2030*b*), and parallel grooves (2002*a*, 2002*b*) on driver ring gear 2408 may be perpendicular to pair of parallel grooves (2026*a*, 2026*b*) on driven wheel 2410. In an exemplary embodiment, front surface 2004 of driver ring gear 2408 may refer to an annular surface of driver ring gear 2408 facing middle planet ring gear 2402 and a front annular surface 2028 of driven wheel 2410 may refer to an annular surface of driven wheel 2410 facing middle planet ring gear 2402. In an exemplary embodiment, pair of parallel grooves (2002*a*, 2002*b*) on driver ring gear 2408 may extend on a plane parallel with a plane of rotation of driver ring gear 2408, and pair of parallel grooves (2026*a*, 2026*b*) on driven wheel 2410 may extend on a plane parallel with a plane of rotation of driven wheel 2410.

Figure 12:
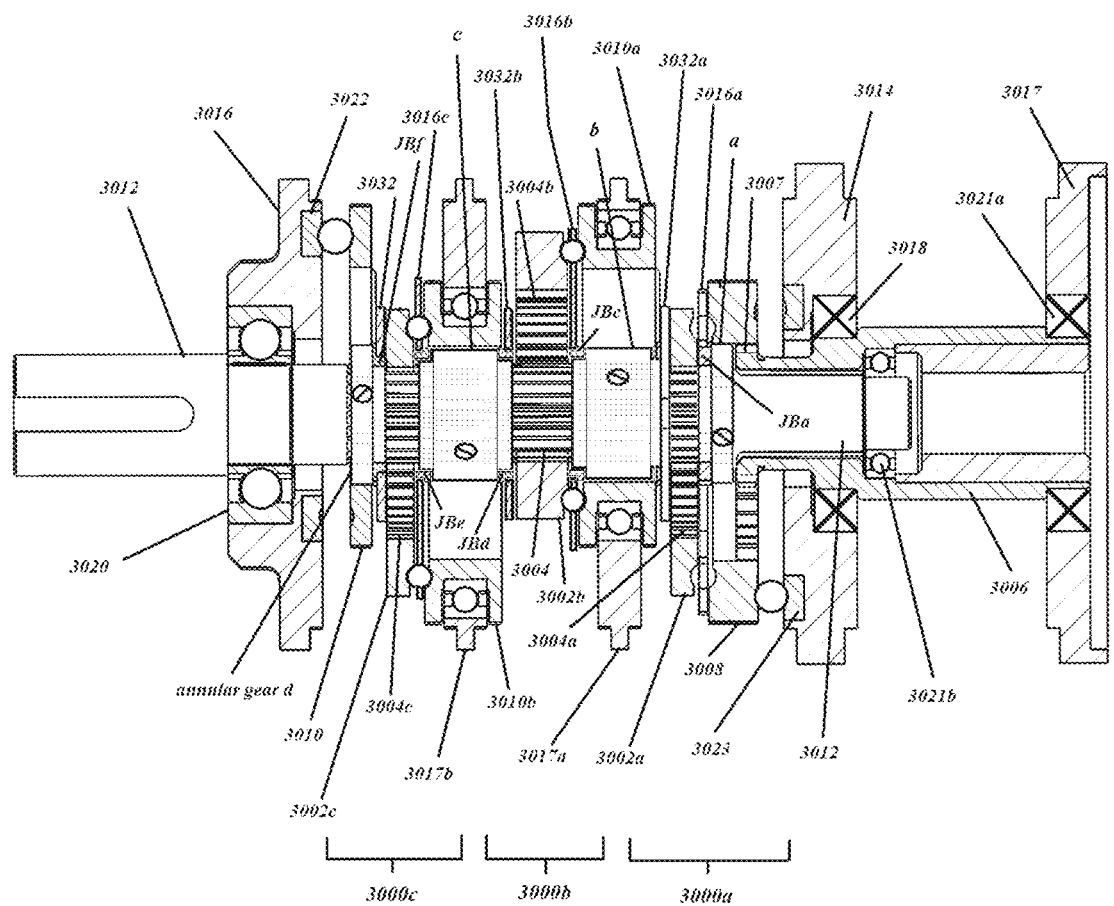
FIG. 12 illustrates a sectional side-view of a three-stage pericyclic gear reducer, consistent with one or more exemplary embodiments of the present disclosure.

FIG. 12 illustrates a sectional side-view of a three-stage pericyclic gear reducer 3000, consistent with one or more exemplary embodiments of the present disclosure. In an exemplary embodiment, three-stage pericyclic gear reducer 3000 may include three stages (3000*a*, 3000*b*, and 3000*c*) that may be structurally similar to pericyclic gear reducer 2000. In an exemplary embodiment, thrust bearings 3023 and 3022 may be utilized for coupling driver ring gear 3008 to wall 3014 and driven wheel 3010 to wall 3016 respectively to reduce radial dimensions of three-stage pericyclic gear reducer 3000. In an exemplary embodiment, an input shaft 3006 may transfer the rotational movement of an electromotor to driver ring gear 3008 by utilizing an external-teeth input gear 3007 meshed with driver ring gear 3008. In an exemplary embodiment, input shaft 3006 may be rotatably coupled to wall 3014 utilizing bearing 3018 and to wall 3017 utilizing bearing 3021*a*. In an exemplary embodiment, all walls (3014, 3016, 3017, 3017*a*, 3017*b*) may be secured in position parallel with and at predetermined distances from each other utilizing shells that encompasses all walls (3014, 3016, 3017, 3017*a*, 3017*b*). For simplicity the aforementioned shells are not illustrated.

In an exemplary embodiment, driver ring gear 3008 may be rotatably coupled to wall 3014 utilizing a thrust bearing 3023. In an exemplary embodiment, driver ring gear 3008 may have an offset equal to e/2 from the central axis of three-stage pericyclic gear reducer 3000. In an exemplary embodiment, a first stage 3000*a* of three stages (3000*a*, 3000*b*, and 3000*c*) may include driver ring gear 3008 similar to driver ring gear 2408, a coupler wheel 3010*a* and a middle planet ring gear 3002*a* similar to middle planet ring gear 2402. In an exemplary embodiment, a second stage 3000*b* of three stages (3000*a*, 3000*b*, and 3000*c*) may include middle planet gear 3002*b* and a coupler wheel 3010*b*. In an exemplary embodiment, coupler wheel 3010*a* may be configured to function as a driver ring gear similar to driver ring gear 2408 for second stage 3000*b* and coupler wheel 3010*b* may be configured to function as a driven wheel similar to driven wheel 2410 for second stage 3000*b*. In an exemplary embodiment, a third stage 3000*c* of three stages (3000*a*, 3000*b*, and 3000*c*) may include middle planet ring gear 3002*c* and a driven wheel 3010 similar to driven wheel 2410. In an exemplary embodiment, coupler wheel 3010*b* may be configured to function as a driver ring gear for third stage 3000*c*.

In an exemplary embodiment, three-stage pericyclic gear reducer 3000 may further include an output shaft 3012. In an exemplary embodiment, output shaft 3012 may include an elongated output sun gear 3004 that may be coupled to or integrally made with external shaft 3012. In an exemplary embodiment, output sun gear 3004 may be extended through the central holes of the coupler wheels 3010*a* and 3010*b* and may be meshed with middle planet ring gears (3002*a*, 3002*b*, and 3002*c*). In an exemplary embodiment, output shaft 3012 may lean on bearing 3020 from a first end of output shaft 3012 and may lean on bearing 3021*b* that may be centrally disposed within input shaft 3006. In an exemplary embodiment, the offsets of middle planet ring gears 3002*a* and 3002*c* from the central axis may be opposite the offset of middle planet ring gear 3002*b* with respect to the central axis. In an exemplary embodiment, the thickness or the mass of middle planet ring gear 3002*b* may be twice as the thickness and mass of middle planet ring gears 3002*a* and 3002*c*. Consequently, the centrifugal force of middle planet ring gear 3002*b* may be twice as the centrifugal forces of middle planet ring gears 3002*a* and 3002*c*. In an exemplary embodiment, the centrifugal force of middle planet ring gear 3002*b* may have an opposite direction with respect to the centrifugal forces of middle planet ring gears 3002*a* and 3002*c* and these centrifugal forces may be considered as vectors, that may be exerted along axes perpendicular to central axis of the exemplary tree-stage pericyclic gear reducer. The centrifugal force vector of middle planet ring gear 3002*b* may be in the middle of the centrifugal force vectors of middle planet ring gears 3002*a* and 3002*c* and in opposite direction of centrifugal forces of middle planet ring gears 3002*a* and 3002*c*. As a result, three-stage pericyclic gear reducer 3000 may have a complete static and dynamic balance.

In an exemplary embodiment, three-stage pericyclic gear reducer 3000 may offer more multiplicity in overall reduction ratios compared to a single-stage coaxial pericyclic gear reducer, such as coaxial pericyclic gear reducer 400, since there is no need to keep the gear ratio of 2:1 between external-teeth input gear 3007 and driver ring gear 3008 for balancing purposes. Furthermore, selection of teeth size and module of gears in external-teeth input gear 3007 and driver ring gear 3008 may not be as limited as those for a single-stage coaxial pericyclic gear reducer, such as coaxial pericyclic gear reducer 400.

In an exemplary embodiment, all three stages (3000*a*, 3000*b*, and 3000*c*) may include pairs of cages (3032*a*, 3016*a*, 3032*b*, 3016*b*, 3032*c*, and 3016*c*) for holding balls or rollers of their respective rolling-contact prismatic joints on either side of respective middle planet ring gears (3002*a*, 3002*b*, and 3002*c*) structurally similar to pair of cages 2016 and 2032. In an exemplary embodiment, cages (3032*a*, 3016*a*, 3032*b*, 3016*b*, 3032*c*, and 3016*c*) may be mounted on journal bearings (JBa, JBb, JBc, JBd, JBe and JBf) structurally similar to journal bearings 2216 and 2232. (Journal bearing JBb is hidden under the cage 3032*a*). In an exemplary embodiment, journal bearings (JBa, JBb, JBc, JBd, JBe and JBf) may be mounted on output shaft 3012 utilizing annular gears (a, b, c, and d). In an exemplary embodiment, annular gears (a, b, c, and d) may have internal teeth conforming to external teeth of output sun gear 3004 and may be fitted on it like a sheath. Such annular gears (a, b, c, and d) may be moveable on output sun gear 3004 along the main central axis and may be fixed in place by screws or other fastening members. In an exemplary embodiment, journal bearings (JBa, JBb, JBc, JBd, JBe and JBf) may freely rotate about the central axis on outer surface of annular gears (a, b, c, and d). The annular gears (a, b, c, and d) may have shoulders on their outer surface to prevent axial movement of journal bearings (JBa, JBb, JBc, JBd, JBe and JBf). Utilization of such fastened annular gears (a, b, c, and d) on output sun gear 3004 may significantly increase the bending strength of teeth of output sun gear 3004.

In an exemplary embodiment, a multistage coaxial pericyclic gear reducer may have three stages, such as three-stage pericyclic gear reducer 3000 or a two-stage pericyclic gear reducer, such as two-stage pericyclic gear reducer 900. A pericyclic gear reducer with two stages, such as two-stage pericyclic gear reducer 900 may only be statically balanced, however, a multistage coaxial pericyclic gear reducer with at least three stages may be statically and dynamically balanced. In an exemplary embodiment, a multistage coaxial pericyclic gear reducer may have more than three stages.

According to one or more exemplary embodiments, the present disclosure is directed to a multistage pericyclic gear reducer, such as two-stage pericyclic gear reducer 900 or three-stage pericyclic gear reducer 3000. An exemplary multistage pericyclic gear reducer may include an input shaft that may be rotatable about a longitudinal axis of an exemplary input shaft, an input external-teeth gear that may be coaxially coupled to and rotatable with an exemplary input shaft, a first middle planet ring gear, and a first driver ring gear that may be meshed with an exemplary input external-teeth gear and rotatable with an exemplary input shaft about a first rotational axis coinciding with an exemplary longitudinal axis of an exemplary input shaft.

An exemplary first driver ring gear may be coupled to an exemplary first middle planet ring gear from a first side of an exemplary first middle planet ring gear utilizing a first prismatic joint. An exemplary first rotational axis may be parallel with a first central normal axis of an exemplary first middle planet ring gear. An exemplary first prismatic joint may be disposed on a plane perpendicular to an exemplary first rotational axis. An exemplary first driver ring gear may be configured to transfer the rotational movement of an exemplary input shaft to an exemplary first middle planet ring gear.

An exemplary multistage pericyclic gear reducer may further include a first driven wheel, where a first side of the first driven wheel may be coupled to an exemplary first middle planet ring gear from a second side of an exemplary first middle planet ring gear utilizing a second prismatic joint. An exemplary second prismatic joint may be disposed on a plane perpendicular to an exemplary first rotational axis. An exemplary second prismatic joint may be perpendicular to an exemplary first prismatic joint. An exemplary first driven wheel may be rotatable about a second rotational axis, where an exemplary second rotational axis may be parallel with an exemplary first rotational axis.

An exemplary multistage pericyclic gear reducer may further include a second middle planet ring gear, where a first side of the second middle planet ring gear may be coupled to a second side of an exemplary first driven wheel utilizing a third prismatic joint. An exemplary third prismatic joint may be disposed on a plane perpendicular to an exemplary first rotational axis. An exemplary multistage pericyclic gear reducer may further include a second driven wheel that may be coupled from a first side of an exemplary second driven wheel to a second side of an exemplary second middle planet ring gear utilizing a fourth prismatic joint. An exemplary fourth prismatic joint may be disposed on a plane perpendicular to an exemplary first rotational axis. An exemplary fourth prismatic joint may be perpendicular to an exemplary third prismatic joint. An exemplary second driven wheel may be rotatable about a third rotational axis, where an exemplary third rotational axis may be parallel with an exemplary second rotational axis.

An exemplary multistage pericyclic gear reducer may further include an output external-teeth gear that may extend through and mesh with both an exemplary first middle planet ring gear and an exemplary second middle planet ring gear, and a central output shaft that may be coupled to an exemplary output external-teeth gear. An exemplary central output shaft may be rotatable with an exemplary output external-teeth gear about a central axis. An exemplary central axis may be along and parallel with a longitudinal axis of an exemplary central output shaft, where an exemplary output external-teeth gear may be extended along an exemplary central axis.

An exemplary multistage pericyclic gear reducer may further include a third middle planet ring gear, where a first side of the third middle planet ring gear may be coupled to a second side of an exemplary second driven wheel utilizing a fifth prismatic joint. An exemplary fifth prismatic joint may be disposed on a plane perpendicular to an exemplary first rotational axis. An exemplary multistage pericyclic gear reducer may further include a third driven wheel that may be coupled to a second side of an exemplary third middle planet ring gear utilizing a sixth prismatic joint. An exemplary sixth prismatic joint may be disposed on a plane perpendicular to an exemplary first rotational axis. An exemplary sixth prismatic joint may be perpendicular to an exemplary fifth prismatic joint. An exemplary third driven wheel may be rotatable about a fourth rotational axis, where an exemplary fourth rotational axis may be parallel with an exemplary third rotational axis. An exemplary output external-teeth gear may further extend through and mesh with an exemplary third middle planet ring gear.

An exemplary first side of the first middle planet gear may be opposite an exemplary second side of an exemplary first middle planet gear along an exemplary central axis. An exemplary first side of an exemplary second middle planet gear may be opposite an exemplary second side of an exemplary second middle planet gear along an exemplary central axis. An exemplary first side of an exemplary third middle planet gear may be opposite the second side of an exemplary third middle planet gear along an exemplary central axis.

An exemplary first side of an exemplary first driven wheel may be opposite an exemplary second side of an exemplary first driven along an exemplary central axis. An exemplary first side of an exemplary second driven wheel may be opposite an exemplary second side of an exemplary second driven wheel along an exemplary central axis.

An exemplary first rotational axis, an exemplary second rotational axis, and an exemplary central axis may be parallel with each other and laid on a single plane. An exemplary first rotational axis and an exemplary second rotational axis may be misaligned and are symmetrically disposed on either side of an exemplary central axis with equal respective distances from an exemplary central axis.

An exemplary second rotational axis, an exemplary third rotational axis, and an exemplary central axis may be parallel with each other and laid on a single plane. An exemplary second rotational axis and an exemplary third rotational axis may be misaligned and symmetrically disposed on either side of an exemplary central axis with equal respective distances from an exemplary central axis.

An exemplary third rotational axis, an exemplary fourth rotational axis, and an exemplary central axis may be parallel with each other and laid on a single plane. An exemplary third rotational axis and an exemplary fourth rotational axis may be misaligned and symmetrically disposed on either side of an exemplary central axis with equal respective distances from an exemplary central axis.

An exemplary first prismatic joint may include a first tongue and a first groove, where one of an exemplary first tongue and an exemplary first groove may be formed on an exemplary first side of an exemplary middle planet ring gear and the other corresponding one of an exemplary first tongue and an exemplary first groove may be formed on an exemplary first driver ring gear. An exemplary first tongue may be engaged with and slidably moveable within an exemplary first groove along a first direction.

An exemplary second prismatic joint may include a second tongue and a second groove, where one of an exemplary second tongue and an exemplary second groove formed on an exemplary second side of an exemplary first middle planet ring gear and the other corresponding one of an exemplary second tongue and an exemplary second groove formed on an exemplary first side of an exemplary first driven wheel. An exemplary second tongue may be engaged with and slidably moveable within an exemplary second groove along a second direction, where an exemplary second direction may be perpendicular to an exemplary first direction.

An exemplary third prismatic joint may include a third tongue and a third groove, where one of an exemplary third tongue and an exemplary third groove may be formed on the first side of an exemplary second middle planet ring gear and the other corresponding one of an exemplary third tongue and an exemplary third groove may be formed on the second side of an exemplary first driven wheel. An exemplary third tongue may be engaged with and slidably moveable within an exemplary third groove along a third direction.

An exemplary fourth prismatic joint may include a fourth tongue and a fourth groove, where one of an exemplary fourth tongue and an exemplary fourth groove may be formed on an exemplary second side of an exemplary second middle planet ring gear and the other corresponding one of an exemplary fourth tongue and an exemplary fourth groove may be formed on an exemplary first side of an exemplary second driven wheel. An exemplary fourth tongue may be engaged with and slidably moveable within an exemplary fourth groove along a fourth direction, where an exemplary fourth direction may be perpendicular to an exemplary third direction.

An exemplary fifth prismatic joint may include a fifth tongue and a fifth groove, where one of an exemplary fifth tongue and an exemplary fifth groove may be formed on an exemplary first side of an exemplary third middle planet ring gear and the other corresponding one of an exemplary fifth tongue and an exemplary fifth groove may be formed on an exemplary second side of an exemplary second driven wheel. An exemplary fifth tongue may be engaged with and slidably moveable within an exemplary fifth groove along a fifth direction.

An exemplary sixth prismatic joint may include a sixth tongue and a sixth groove, where one of an exemplary sixth tongue and an exemplary sixth groove may be formed on an exemplary second side of an exemplary third middle planet ring gear and the other corresponding one of an exemplary sixth tongue and an exemplary sixth groove formed on an exemplary third driven wheel. An exemplary sixth tongue may be engaged with and slidably moveable within an exemplary sixth groove along a sixth direction, where an exemplary sixth direction may be perpendicular to an exemplary fifth direction.

Figure 13A:
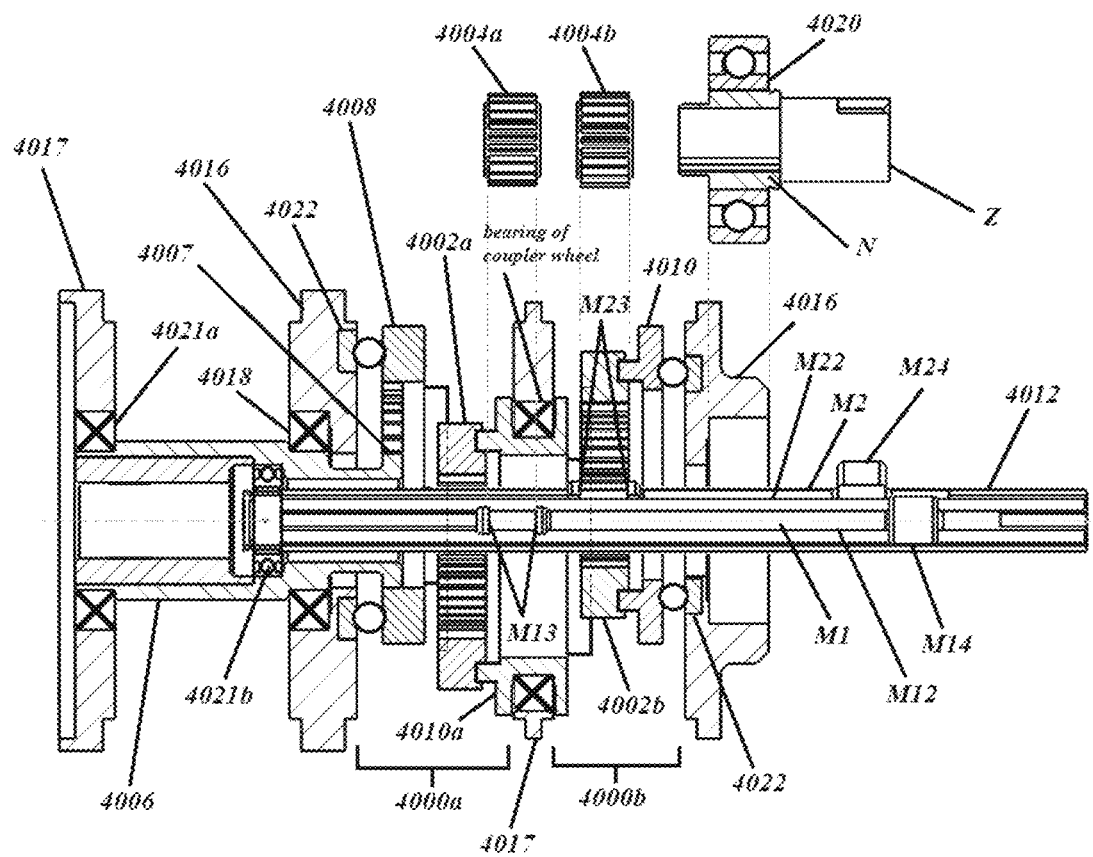
FIG. 13A illustrates a dual-speed pericyclic gearbox, consistent with one or more exemplary embodiments of the present disclosure.

FIG. 13A illustrates a dual-speed pericyclic gearbox 4000, consistent with one or more exemplary embodiments of the present disclosure. In an exemplary embodiment, dual-speed pericyclic gearbox 4000 may include a first stage 4000a that may be similar to coaxial pericyclic gear reducer 400 coupled to a second stage 4000b that may be similar to pericyclic gear reducer 100. In an exemplary embodiment, a driver ring gear 4008 of first stage 4000a may be structurally similar to driver ring gear 408 and may be rotatably coupled to a wall 4016 of first stage 4000a by utilizing a thrust bearing 4022. In an exemplary embodiment, such coupling of driver ring gear 4008 to wall 4016 utilizing thrust bearing 4022 may allow for reducing radial size of dual-speed pericyclic gearbox 4000 in contrast with when a driver ring gear such as driver ring gear 408 may be coupled to a wall, such as sidewall 414 utilizing a radial rolling contact bearing, such as fourth rolling contact bearing 423.

In an exemplary embodiment, a middle planet ring gear 4002a of first stage 4000a and a middle planet ring gear 4002b of second stage 4000b may have different teeth numbers and modules. In an exemplary embodiment, middle planet ring gear 4002a may be coupled to a corresponding output sun gear 4004a and middle planet ring gear 4002b may be coupled to a corresponding output sun gear 4004b. In an exemplary embodiment, dual-speed pericyclic gearbox 4000 may further include an output shaft 4012 that may be configured as a spline, on which output sun gears (4004a, 4004b) may be mounted and may be slidably moveable along a longitudinal axis of output shaft 4012.

Figure 13B:
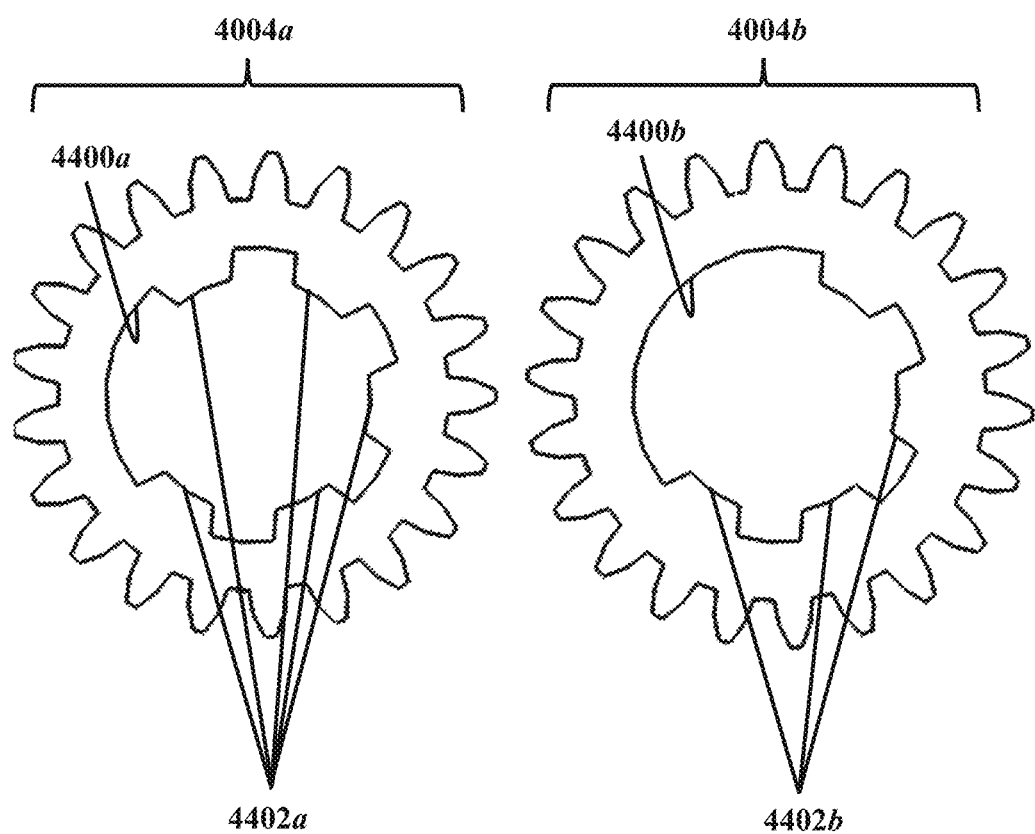
FIG. 13B illustrates front views of output sun gears of a dual-speed pericyclic gearbox, consistent with one or more exemplary embodiments of the present disclosure.

FIG. 13B illustrates front views of output sun gears (4004a, 4004b) of dual-speed pericyclic gearbox 4000, consistent with one or more exemplary embodiments of the present disclosure. In an exemplary embodiment, output sun gear 4004a may include a spline hole 4400a that may include a plurality of teeth 4402a that may conform to teeth of output shaft 4012. In an exemplary embodiment, number of plurality of teeth 4402a may be less than the number of teeth or grooves on output shaft 4012. In an exemplary embodiment, plurality of teeth 4402a may be meshed or interlocked with the teeth of output shaft 4012, such that output sun gear 4004a may be rotatable with output shaft 4012 and thereby may transfer the torque to output shaft 4012. In an exemplary embodiment, output sun gear 4004b may include a spline hole 4400b that may include a plurality of teeth 4402b that may conform to teeth of output shaft 4012. In an exemplary embodiment, number of plurality of teeth 4402b may be less than the number of teeth or grooves on output shaft 4012. In an exemplary embodiment, plurality of teeth 4402b may be meshed or interlocked with the teeth of output shaft 4012, such that output sun gear 4004b may be rotatable with output shaft 4012 and thereby may transfer the torque to output shaft 4012.

In an exemplary embodiment, output shaft 4012 may lean on rolling contact bearing 4020 form one end and may lean on rolling contact bearing 4021b from the other opposing end. In an exemplary embodiment, rolling contact bearing 4021b may be coaxially disposed within an input shaft 4006 of dual-speed pericyclic gearbox 4000.

In an exemplary embodiment, dual-speed pericyclic gearbox 4000 may further include shift forks (M1 and M2). In an exemplary embodiment, shift fork M1 may include an elongated portion that may be configured as an elongated cylindrical sector M12 disposable within one of spline grooves on output shaft 4012 and a protruded portion M14 that may radially protrude from elongated cylindrical sector M12 and a yoke M13 on its left hand side radially protrude from elongated cylindrical sector. In an exemplary embodiment, yoke M13 may be configured to selectively engage an internal portion 4404a of output sun gear 4004a and to selectively move output sun gear 4004a along longitudinal axis of output shaft 4012. In an exemplary embodiment, shift fork M2 may include an elongated portion that may be configured as an elongated cylindrical sector M22 disposable within one of spline grooves on output shaft 4012 and a protruded portion M24 that may radially protrude from elongated cylindrical sector M22 and a yoke M23 on its left hand side radially protrude from elongated cylindrical sector. In an exemplary embodiment, yoke M23 may be configured to selectively engage an internal portion 4404b of output sun gear 4004b and to selectively move output sun gear 4004b along longitudinal axis of output shaft 4012. In an exemplary embodiment, shift forks (M1 and M2) may be configured such that at any given instant, only one of output sun gears (4004a, 4004b) may be engaged with a respective middle planet ring gear of middle planet ring gears (4002a, 4002b). Consequently, for each output sun gear of output sun gears (4004a, 4004b) engaged with each respective middle planet ring gear of middle planet ring gears (4002a, 4002b), a different conversion ratio may be obtained from dual-speed pericyclic gearbox 4000.

In an exemplary embodiment, rolling contact bearing 4020 may either be directly coupled with output shaft 4012 or rolling contact bearing 4020 may be mounted on an outer surface of a sheath N. In an exemplary embodiment, sheath N may be coaxially engaged and rotatable with output shaft 4012. In an exemplary embodiment, sheath N may be configured to allow shift forks (M1 and M2) to pass through sheath N. In an exemplary embodiment, shift forks (M1 and M2) may pass through sheath N and may be coupled to respective output sun gears (4004a, 4004b) by utilizing end yokes (M13 and M23). In an exemplary embodiment, shift forks (M1 and M2) may be axially slidable within respective spline grooves of output shaft 4012 and thereby move their corresponding output sun gear of output sun gears (4004a, 4004b) along output shaft 4012. In an exemplary embodiment, each shift fork of shift forks (M1 and M2) may be configured to engage or disengage each output sun gear of respective output sun gears (4004a, 4004b) with a corresponding middle planet ring gear of middle planet ring gears (4002a, 4002b) by moving each output sun gear of respective output sun gears (4004a, 4004b) along output shaft 4012. In an exemplary embodiment, responsive to each one of output sun gears (4004a, 4004b) being engage with a corresponding one of middle planet ring gears (4002a, 4002b), the other output sun gear of output sun gears (4004a, 4004b) may be disengaged from the other corresponding one of middle planet ring gears (4002a, 4002b). For example, when output sun gear 4004a needs to be engaged with middle planet ring gear 4004a to obtain a first gear ratio, shift fork M1 may be utilized to move output sun gear 4004a into a position where output sun gear 4004a may mesh with middle planet ring gear 4002a, and shift fork M2 may be utilized to move output sun gear 4004b to a position where output sun gear 4004b may be disengaged from middle planet ring gear 4002b. similarly, when output sun gear 4004b needs to be engaged with middle planet ring gear 4004b to obtain a second gear ratio, shift fork M2 may be utilized to move output sun gear 4004b into a position where output sun gear 4004b may mesh with middle planet ring gear 4002b, and shift fork M1 may be utilized to move output sun gear 4004a to a position where output sun gear 4004a may be disengaged from middle planet ring gear 4002a.

In an exemplary embodiment, to prevent the risk of both output sun gears (4004a, 4004b) being simultaneously engaged with corresponding middle planet ring gears (4002a, 4002b), an index cylinder Z may be mounted on the spline of output shaft 4012 to one side of sheath N and bearing 4020. In an exemplary embodiment, index cylinder Z may not have any internal teeth and consequently, index cylinder Z may be rotatable about the longitudinal axis of output shaft 4012 relative to output shaft 4012. In an exemplary embodiment, index cylinder Z may include a slit which is a section cut that may be configured to conform with protruded portions M14 and M24. In an exemplary embodiment, the slit on index cylinder Z may be configured to allow only one of protruded portions M14 or M24 to longitudinally move inside the slit and hence only one of shift forks M1 and M2 may move along output shaft 4012 and engage corresponding output sun gear to corresponding middle planet gear.

In an exemplary embodiment, a pericyclic gearbox may be configured as a multi-speed pericyclic gear box that may have several output sun gears engageable with several corresponding middle planet gears to provide multiple gear ratios. In an exemplary embodiment, dual-speed pericyclic gearbox 4000 is just an example of a multi-speed pericyclic gearbox and as mentioned before, an exemplary multi-speed pericyclic gearbox may include more than two stages.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic, e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed is:

1. A multistage pericyclic gear reducer, comprising:
an input shaft rotatable about a longitudinal axis of the input shaft;
an input external-teeth gear coaxially coupled to and rotatable with the input shaft;
a first middle planet ring gear;
a first driver ring gear meshed with the input external-teeth gear and rotatable with the input shaft about a first rotational axis coinciding with the longitudinal axis of the input shaft, the first driver ring gear coupled to the first middle planet ring gear from a first side of the first middle planet ring gear utilizing a first prismatic joint, the first rotational axis parallel with a first central normal axis of the first middle planet ring gear, the first prismatic joint disposed on a plane perpendicular to the first rotational axis, the first driver ring gear configured to transfer the rotational movement of the input shaft to the first middle planet ring gear;
a first driven wheel, a first side of the first driven wheel coupled to the first middle planet ring gear from a second side of the first middle planet ring gear utilizing a second prismatic joint, the second prismatic joint disposed on a plane perpendicular to the first rotational axis, the second prismatic joint perpendicular to the first prismatic joint, the first driven wheel rotatable about a second rotational axis, the second rotational axis parallel with the first rotational axis;
a second middle planet ring gear, a first side of the second middle planet ring gear coupled to a second side of the first driven wheel utilizing a third prismatic joint, the third prismatic joint disposed on a plane perpendicular to the first rotational axis;
a second driven wheel coupled from a first side of the second driven wheel to a second side of the second middle planet ring gear utilizing a fourth prismatic joint, the fourth prismatic joint disposed on a plane perpendicular to the first rotational axis, the fourth prismatic joint perpendicular to the third prismatic joint, the second driven wheel rotatable about a third rotational axis, the third rotational axis parallel with the second rotational axis;

an output external-teeth gear extended through and meshed with both the first middle planet ring gear and the second middle planet ring gear; and a central output shaft coupled to the output external-teeth gear, the central output shaft rotatable with the output external-teeth gear about a central axis, the central axis along and parallel with a longitudinal axis of the central output shaft, the output external-teeth gear extended along the central axis.

2. The multistage pericyclic gear reducer of claim 1, further comprising:

a third middle planet ring gear, a first side of the third middle planet ring gear coupled to a second side of the second driven wheel utilizing a fifth prismatic joint, the fifth prismatic joint disposed on a plane perpendicular to the first rotational axis; and a third driven wheel coupled to a second side of the third middle planet ring gear utilizing a sixth prismatic joint, the sixth prismatic joint disposed on a plane perpendicular to the first rotational axis, the sixth prismatic joint perpendicular to the fifth prismatic joint, the third driven wheel rotatable about a fourth rotational axis, the fourth rotational axis parallel with the third rotational axis, wherein the output external-teeth gear is further extended through and meshed with the third middle planet ring gear.

3. The pericyclic gear reducer of claim 2, wherein the first side of the first middle planet gear is opposite the second side of the first middle planet gear along the central axis, the first side of the second middle planet gear is opposite the second side of the second middle planet gear along the central axis, and the first side of the third middle planet gear is opposite the second side of the third middle planet gear along the central axis.

4. The pericyclic gear reducer of claim 3, wherein the first side of the first driven wheel is opposite the second side of the first driven along the central axis, the first side of the second driven wheel is opposite the second side of the second driven wheel along the central axis.

5. The pericyclic gear reducer of claim 4, wherein the first rotational axis, the second rotational axis, and the central axis are parallel with each other and laid on a single plane, the first rotational axis and the second rotational axis are misaligned and are symmetrically disposed on either side of the central axis with equal respective distances from the central axis.

6. The pericyclic gear reducer of claim 5, wherein the second rotational axis, the third rotational axis, and the central axis are parallel with each other and laid on a single plane, the second rotational axis and the third rotational axis are misaligned and are symmetrically disposed on either side of the central axis with equal respective distances from the central axis.

7. The pericyclic gear reducer of claim 6, wherein the third rotational axis, the fourth rotational axis, and the central axis are parallel with each other and laid on a single plane, the third rotational axis and the fourth rotational axis are misaligned and are symmetrically disposed on either side of the central axis with equal respective distances from the central axis.

8. The pericyclic reducer of claim 7, wherein the first prismatic joint comprises a first tongue and a first groove, one of the first tongue and the first groove formed on the first side of the middle planet ring gear and the other corresponding one of the first tongue and the first groove formed on the first driver ring gear, the first tongue engaged with and slidably moveable within the first groove along a first direction.

9. The pericyclic reducer of claim 8, wherein the second prismatic joint comprises a second tongue and a second groove, one of the second tongue and the second groove formed on the second side of the first middle planet ring gear and the other corresponding one of the second tongue and the second groove formed on the first side of the first driven wheel, the second tongue engaged with and slidably moveable within the second groove along a second direction, the second direction perpendicular to the first direction.

10. The pericyclic reducer of claim 9, wherein the third prismatic joint comprises a third tongue and a third groove, one of the third tongue and the third groove formed on the first side of the second middle planet ring gear and the other corresponding one of the third tongue and the third groove formed on the second side of the first driven wheel, the third tongue engaged with and slidably moveable within the third groove along a third direction.

11. The pericyclic reducer of claim 10, wherein the fourth prismatic joint comprises a fourth tongue and a fourth groove, one of the fourth tongue and the fourth groove formed on the second side of the second middle planet ring gear and the other corresponding one of the fourth tongue and the fourth groove formed on the first side of the second driven wheel, the fourth tongue engaged with and slidably moveable within the fourth groove along a fourth direction, the fourth direction perpendicular to the third direction.

12. The pericyclic reducer of claim 11, wherein the fifth prismatic joint comprises a fifth tongue and a fifth groove, one of the fifth tongue and the fifth groove formed on the first side of the third middle planet ring gear and the other corresponding one of the fifth tongue and the fifth groove formed on the second side of the second driven wheel, the fifth tongue engaged with and slidably moveable within the fifth groove along a fifth direction.

13. The pericyclic reducer of claim 12, wherein the sixth prismatic joint comprises a sixth tongue and a sixth groove, one of the sixth tongue and the sixth groove formed on the second side of the third middle planet ring gear and the other corresponding one of the sixth tongue and the sixth groove formed on the third driven wheel, the sixth tongue engaged with and slidably moveable within the sixth groove along a sixth direction, the sixth direction perpendicular to the fifth direction.

* * * * *